US005818385A

United States Patent [19]

Bartholomew

[11] Patent Number: 5,818,385

[45] Date of Patent: Oct. 6, 1998

[54] ANTENNA SYSTEM AND METHOD

[76] Inventor: Darin E. Bartholomew, 1411 S. Algonquin Dr., Schaumburg, Ill. 60193

[21] Appl. No.: 689,560

[22] Filed: Aug. 12, 1996

Related U.S. Application Data

[63] Continuation of Ser. No. 258,256, Jun. 10, 1994, abandoned.

[51] Int. Cl.[6] .............................. H01Q 3/22; H04B 7/26

[52] U.S. Cl. .......................... 342/372; 455/419; 455/440; 455/456

[58] Field of Search .................................... 342/359, 354, 342/372; 455/419, 440, 456, 560, 562, 92

[56] References Cited

U.S. PATENT DOCUMENTS

| | | | |
|---|---|---|---|
| 3,577,080 | 5/1971 | Cannalte | 455/92 |
| 3,713,167 | 1/1973 | David | 343/797 |
| 3,922,685 | 11/1975 | Opas | 342/368 |
| 4,128,740 | 12/1978 | Graziano . | |
| 4,249,181 | 2/1981 | Lee | 343/100 |
| 4,260,994 | 4/1981 | Parker | 342/368 |
| 4,298,873 | 11/1981 | Roberts | 342/372 |
| 4,334,230 | 6/1982 | Kane | 343/797 |
| 4,458,219 | 7/1984 | Vorhaus | 333/164 |
| 4,704,734 | 11/1987 | Menich et al. | 455/33 |
| 4,933,680 | 6/1990 | Shapiro et al. | 343/700 MS |
| 4,983,981 | 1/1991 | Feldman | 342/372 |
| 5,027,125 | 6/1991 | Tang | 342/368 |
| 5,034,752 | 7/1991 | Pouraílly et al. | 342/373 |
| 5,038,148 | 8/1991 | Aoki et al. | 342/372 |
| 5,079,557 | 1/1992 | Hopwood et al. | 342/373 |
| 5,093,923 | 3/1992 | Leslie | 455/9 |
| 5,093,924 | 3/1992 | Toshiyuki et al. | 455/33 |
| 5,093,927 | 3/1992 | Shanley | 455/34 |
| 5,107,273 | 4/1992 | Roberts | 342/417 |
| 5,134,709 | 7/1992 | Bi et al. | 455/33.1 |
| 5,175,878 | 12/1992 | Davis et al. | 455/103 |
| 5,193,101 | 3/1993 | McDonald et al. | 375/1 |
| 5,193,109 | 3/1993 | Lee | 379/60 |
| 5,214,364 | 5/1993 | Perdue et al. | 342/357 |
| 5,214,789 | 5/1993 | George | 455/440 |
| 5,218,367 | 6/1993 | Sheffer et al. | 342/457 |
| 5,235,633 | 8/1993 | Dennison et al. | 379/60 |
| 5,247,701 | 9/1993 | Comroe et al. | 455/33.4 |
| 5,257,030 | 10/1993 | Aoki et al. | 342/368 |
| 5,264,862 | 11/1993 | Kumpfbeck | 343/853 |
| 5,434,973 | 7/1995 | Lu | 379/102 |
| 5,603,089 | 2/1997 | Searle et al. | 455/507 |

*Primary Examiner*—Gregory C. Issing
*Attorney, Agent, or Firm*—Darin E. Bartholomew

[57] ABSTRACT

The antenna system and method for dynamically controlling radiation patterns provides an assortment of radiation patterns to increase the performance of communication systems, such as trunking communication systems and cellular communication systems. One embodiment of the antenna system permits a user to manually select a desired radiation pattern from the assortment of radiation patterns. For example, the user may manually select a desired radiation pattern via a graphical user interface of a general purpose computer, or via a conventional telephone. Another embodiment of the antenna system and method tailors radiation patterns in response to factors such as the locations of mobile units, the channel assignments of mobile units, and the transmissions of particular mobile units.

36 Claims, 28 Drawing Sheets

VERTICAL PLANE

MAXIMUM GAIN 2 dBd

VERTICAL PLANE

MAXIMUM GAIN 4 dBd

HORIZONTAL PLANE

MAXIMUM GAIN 4 dBd

PHASE LAG 0 °

HORIZONTAL PLANE

MAXIMUM GAIN 3 dBd

PHASE LAG 90 °

NOTE: ALL POLAR GRAPHS HAVE RIM VALUES OF 0 dB AND RADIAL DIVISIONS OF -3 dB. ALL ARRAY ANTENNAS ARE ORIENTED ALONG THE 0° - 180° AXIS. PHASE LAG REFERS TO THE AMOUNT THE O° ELEMENT LAGS BEHIND THE 180° ELEMENT.

FIG. 3E

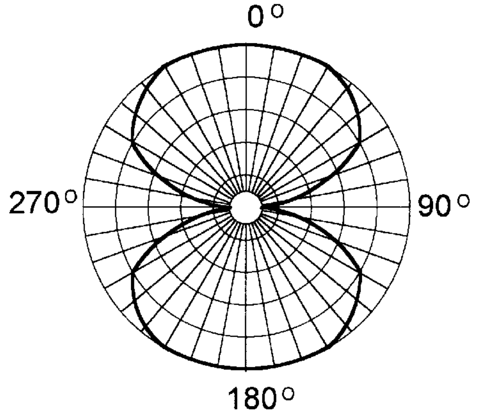

HORIZONTAL PLANE
MAXIMUM GAIN 2 dBd
PHASE LAG 180°

FIG. 3F

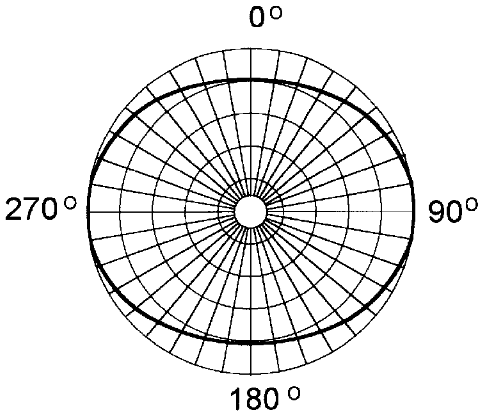

HORIZONTAL PLANE
MAXIMUM GAIN 1 dBd
PHASE LAG 0°

FIG. 3G

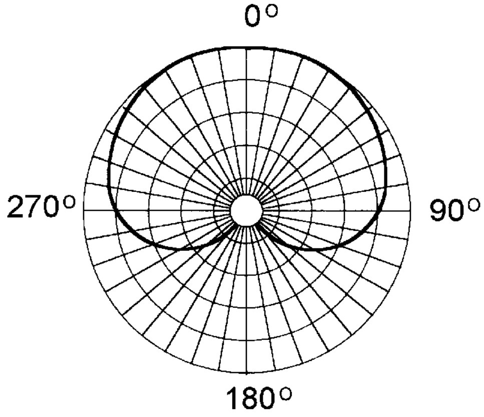

HORIZONTAL PLANE
MAXIMUM GAIN 3 dBd
PHASE LAG 90°

FIG. 3H

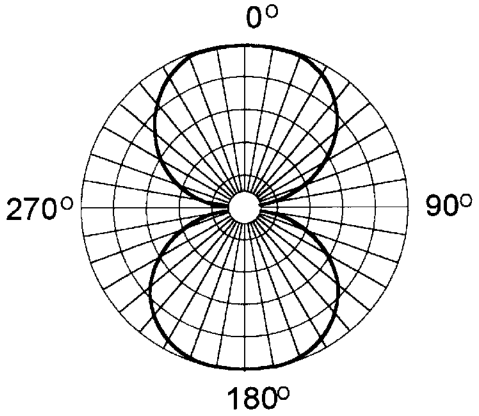

HORIZONTAL PLANE
MAXIMUM GAIN 4 dBd
PHASE LAG 180°

NOTE: ALL POLAR GRAPHS HAVE RIM VALUES OF 0 dB AND RADIAL DIVISIONS OF -3 dB. ALL ARRAY ANTENNAS ARE ORIENTED ALONG THE 0° - 180° AXIS. PHASE LAG REFERS TO THE AMOUNT THE O° ELEMENT LAGS BEHIND THE 180° ELEMENT.

ANTENNA SYSTEM AND METHOD

This is a continuation of application Ser. No. 08/258,256 filed Jun. 10, 1994, now abandoned.

BACKGROUND ART

The present invention is directed to an antenna system and a method for dynamically controlling radiation patterns and, more specifically, to an antenna system having dynamically controllable radiation patterns for use in cellular, trunking, and other mobile communication systems.

State of the art cellular communication systems generally use antennas with fixed, inflexible radiation patterns that inhibit the rapid, economical expansion of cellular networks. In addition, the actual geographic coverage of background art antennas may significantly depart from the theoretically predicted geographic coverage, resulting in diminished communication systems reliability.

State of the art cellular, trunking, and mobile communication systems generally use antennas with fixed, inflexible radiation patterns. Background art antennas include omnidirectional collinear array antennas, directional corner reflector antennas, and directional Yagi antennas. In general, the radiation patterns of background art antennas may be changed only with the expense and difficulty involved with climbing a tower, adding cable phasing harnesses, changing the physical orientation of the antennas, or changing the types of antennas.

The background art antennas utilized in cellular networks generally have inflexible coverage patterns. As a result, increasing channel density in a cellular network frequently dictates the onerous replacement of one type of background art antenna with another type of background art antenna. In particular, when channel density is increased through sectorization or channel splitting, preexisting omnidirectional collinear array antenna are removed and replaced with corner reflector antennas, often at great expense to various cellular carriers. Cellular network capacity is further reduced by downtime during the installation of new antennas.

The inflexible geographic coverage of background art antennas reduces the potential reliability and potential channel capacity of cellular networks employing microcells. Microcells, for Personal Communication Networks (PCN) and Personal Communication Systems (PCS), may have a radius as small as 400 meters in urban areas. To avoid interference with adjacent microcells precise, time-consuming adjustment of background art antennas may be necessary.

The actual geographic coverage of background art antennas may significantly depart from the theoretically predicted geographic coverage because of atmospheric conditions, seasonal variations, and other propagation factors. Atmospheric and seasonal variations affect propagation of radio frequency signals primarily by attenuation or refraction of the radio frequency signals. For example, UHF and microwave radio frequency signals are subject to significant attenuation from the growth of deciduous vegetation during the spring, summer, and fall. Microwave radio frequency signals are refracted by differences between the air and ground temperature and by differences in air humidity at various altitudes. Propagation factors, such as natural topography and physical obstructions, in effect, may attenuate radio frequency coverage more in certain geographic sectors than in other geographic sectors. In addition, the antenna mounting configuration may significantly distort the predicted geographic coverage.

Communication systems using background art antennas may fail to produce the desired geographic coverage in various geographic sectors. For example, omnidirectional background art antennas, with uniform gain in all geographic sectors of the coverage pattern, frequently yield noncircular, irregular shaped geographic coverage under actual operating conditions. Although some existing antenna designs provide directional operation to compensate for actual operating conditions, the fixed directional patterns of background art antennas generally cannot be changed with sufficient expediency or precision to appreciably increase communication system reliability. Hence, communication systems using background art antennas may lack reliability because of reduced signal strength in various geographic sectors of the desired coverage area.

In cellular networks, for example, some cell sites with background art antennas invariably will produce irregular shaped geographic coverage which may reduce the signal strength in various sectors of the cells. Moreover, background art antennas, with irregular shaped geographic coverage, yield more co-channel interference than the theoretical possible minimum levels of co-channel interference. Consequently, the background art antennas yield less channel density per unit area because cell sites must often be spaced further apart to avoid co-channel interference. As a practical matter, when the cell site density is increased the availability of the ideally located site also decreases, further compounding the problem of uniform coverage. Thus, the need for an antenna system and a method for dynamically controlling radiation patterns exists.

SUMMARY OF THE INVENTION

The present invention is directed to an improved antenna system. In addition, the present invention is directed to a method for increasing the performance of communication systems. The antenna system is structured to generate an assortment of radiation patterns. The assortment of radiation patterns includes, for example, narrow beam patterns, cardioid patterns, overlapping cardioid patterns, figure-eight patterns, omnidirectional patterns, pseudo-omnidirectional patterns, and variations of the foregoing patterns.

The antenna system may have provisions, but need not have provisions, which allow a user to manually select a desired radiation pattern from the assortment of radiation patterns. For instance, the user is permitted to manually select a desired radiation pattern via a general purpose computer and/or via a telephone. In addition, the antenna system may have provisions, but need not have provisions, which automatically select a desired radiation pattern, from the assortment of radiation patterns, based upon user preferences and/or operating conditions within a communications system.

According to a preferred embodiment disclosed herein, the antenna system includes 1) an array antenna and 2) an antenna control system. The array antenna comprises radiating elements, a plurality of signal transmission media, means for splitting a signal, and means for processing a signal. The radiating elements have various respective horizontal and vertical separations to produce an assortment of radiation patterns; alternatively, the radiating elements have one or more conductive reflectors oriented in proximity to the radiating elements to produce the assortment of radiation patterns.

The plurality of signal transmission media may be coupled to the radiating elements. In particular, respective ones of the signal transmission media may be coupled to corresponding ones of the radiating elements. The plurality of signal transmission media may be coupled to means for splitting a signal.

The means for processing a signal, such as a phase shifter, has RF signal terminals. At least one RF signal terminal is coupled to the means for splitting a signal. Specifically, one RF signal terminal is coupled immediately to the means for splitting a signal, or one RF signal terminal is coupled to the means for splitting a signal via one signal transmission media. If the means for processing a signal comprises a phase shifter, then the phase shifter shifts the phase of the radio frequency signals induced in one or more radiating elements, thereby altering the directive characteristics of the array antenna's radiation patterns. If the means for processing a signal comprises means for attenuating, then the means for attenuating, in effect, switches radiating elements on or off, thereby altering the directive characteristics of the array antenna's radiation patterns.

According to a preferred embodiment, the antenna control system is coupled to the means for processing a signal. The antenna control system controls the means for processing a signal and the resultant radiation patterns. The antenna control system is, for example, embodied as a general purpose computer, or as the combination of an encoder and decoder. The antenna control system may allow a user to manually alter antenna coverage patterns via a user interface such as a graphical user interface of a personal computer, or via a conventional telephone. Manual user selection is preferably complemented by the graphical representations or verbal descriptions of the assortment of radiation patterns. The graphical representations or verbal descriptions assist the user in a prudent selection of a desired radiation pattern.

The antenna system may also include, but need not include, provisions which permit the automatic alteration of antenna coverage patterns in response to an external input data from one or more external input sources. An external input source refers to a mobile transceiver, a base station, a base station controller, a location determining receiver (i.e. global positioning receiver) an additional antenna control system, a mobile switching center, a mobile telecommunications switching office, a signal quality determining receiver, or the like.

External input data includes data ordinarily generated by various communication systems, for instance, mobile unit identifiers and channel assignment data. External input data also includes data generated by a location determining receiver, an additional antenna control system, and/or signal quality determining receivers. Signal quality determining receivers measure parameters of a received signal transmitted from a mobile radio unit. Parameters of the received signal include, for example, amplitude level, signal-to-noise ratio, and/or arrival time of mobile radio unit identifiers.

Generally, the antenna system and method for dynamically controlling radiation patterns increases the uniformity of radio frequency coverage, the flexibility of radio frequency coverage, and the reliability of mobile communications systems. Specifically with respect to cellular networks, the antenna system increases the permissible channel density per cell in cellular networks, reduces co-channel interference in cellular networks, and permits the flexible expansion of cellular networks.

The antenna system and method for dynamically controlling radiation patterns permits the user to alter the radiation pattern of the array antenna to produce a more uniform coverage pattern than possible with background art antennas. The antenna system allows the user to select a desired radiation pattern via the antenna control system. Specifically, in one embodiment, the antenna control system allows the user to select a desired radiation pattern via a graphical user interface. The array antenna is adapted to produce a wide variety of omnidirectional and directive antenna patterns to compensate for terrain variation, atmospheric conditions and seasonal variations. The desired radiation pattern may be instantaneously selected from this wide variety of antenna patterns.

The antenna system's coverage patterns are more flexible than the coverage patterns of the background art antennas. The antenna system's coverage patterns can be dynamically altered to facilitate rapid expansion of cellular phone systems. For example, the antenna system will allow the user to instantaneously shift from an omnidirectional coverage pattern to a cardioid coverage pattern. Such a pattern change is desirable, for example, to facilitate cell sectorization expansion, and to optimize coverage in areas where cell usage is highest at a given time.

The antenna system and method for dynamically controlling radiation patterns increases the reliability of mobile communications. The use of a location determining receiver or a plurality of signal quality determining receivers can be used to direct the radiation patterns only to those geographic areas in which there is mobile radio user activity. Consequently, the reliability of the communications system is increased when mobile radio users are concentrated in a particular area and the array antenna's directional coverage pattern is focused on the area. The antenna system increases communication system reliability because the array antenna can generate directional coverage patterns with higher gains than typical omnidirectional antennae and many directional antennas. In particular, the antenna system facilitates the use of highly directional antennas, which are typically used for point-to-point communication system applications, in the environment of a mobile communication system.

In a cellular network, the antenna system and method for dynamically controlling radiation patterns reduces the potential for co-channel interference between cells and increases the possible channel density per cell. Co-channel interference is reduced by generating radiation patterns to limit radio frequency signals to particular geographic portions of cells. Channel density of the cellular network is increased, for example, by allowing substantially adjacent cells, or proximate cells, to simultaneously reuse the same frequency. One embodiment of the method for dynamically controlling the radiation patterns increases permissible channel density based upon a comparison of the radiation patterns of two substantially proximate cells among other factors.

BRIEF DESCRIPTION OF THE DRAWINGS

FIG. 3C through FIG. 3E, inclusive, illustrate examples of horizontal plane radiation patterns achieved with the simple array where the dipole elements are fed with various phase differences and where the dipole elements have a primary horizontal separation of approximately one-half wavelength.

FIG. 3F through FIG. 3H, inclusive, illustrate examples of horizontal plane radiation patterns achieved with the simple array where the dipole elements are fed with various phase differences and where the dipole elements have a primary horizontal separation of approximately one-quarter wavelength.

DETAILED DESCRIPTION

Throughout the specification and claims the terms “couples, coupled, and coupling” appear. “Couples, coupled, or coupling” signifies the association of two or more electrical devices by any method such that power may be transferred from one electrical device to another. Here, “power” refers to direct current, alternating current, voltage, radio frequency power, electromagnetic energy, light, and/or any other forms of electrical energy. “Couples, coupled, or coupling” also includes power transferred by any means from a source device, through one or more intermediate devices, to a destination device. That is, the source device and the destination device are “coupled” notwithstanding the intermediate device.

“Couples, coupled, or coupling” includes all methods of coupling two or more circuits or circuit components. In other words, “couples, coupled, or coupling” includes capacitive coupling, inductive coupling, resistive coupling, electromagnetic coupling, electrical connections, or any combination of the foregoing coupling techniques. Electromagnetic coupling refers to the relationship between two separate conductors where the magnetic field and/or electrical field of one conductor induces a voltage in the other conductor. For example, electromagnetically coupling includes optical coupling at infrared, light-wave frequencies.

In general, the antenna system comprises an array antenna. Alternatively, the antenna system may comprise, but need not comprise, an array antenna and an antenna control system. In addition, the antenna system may, but need not include, an external input source.

Array Antenna

Figure 1A:
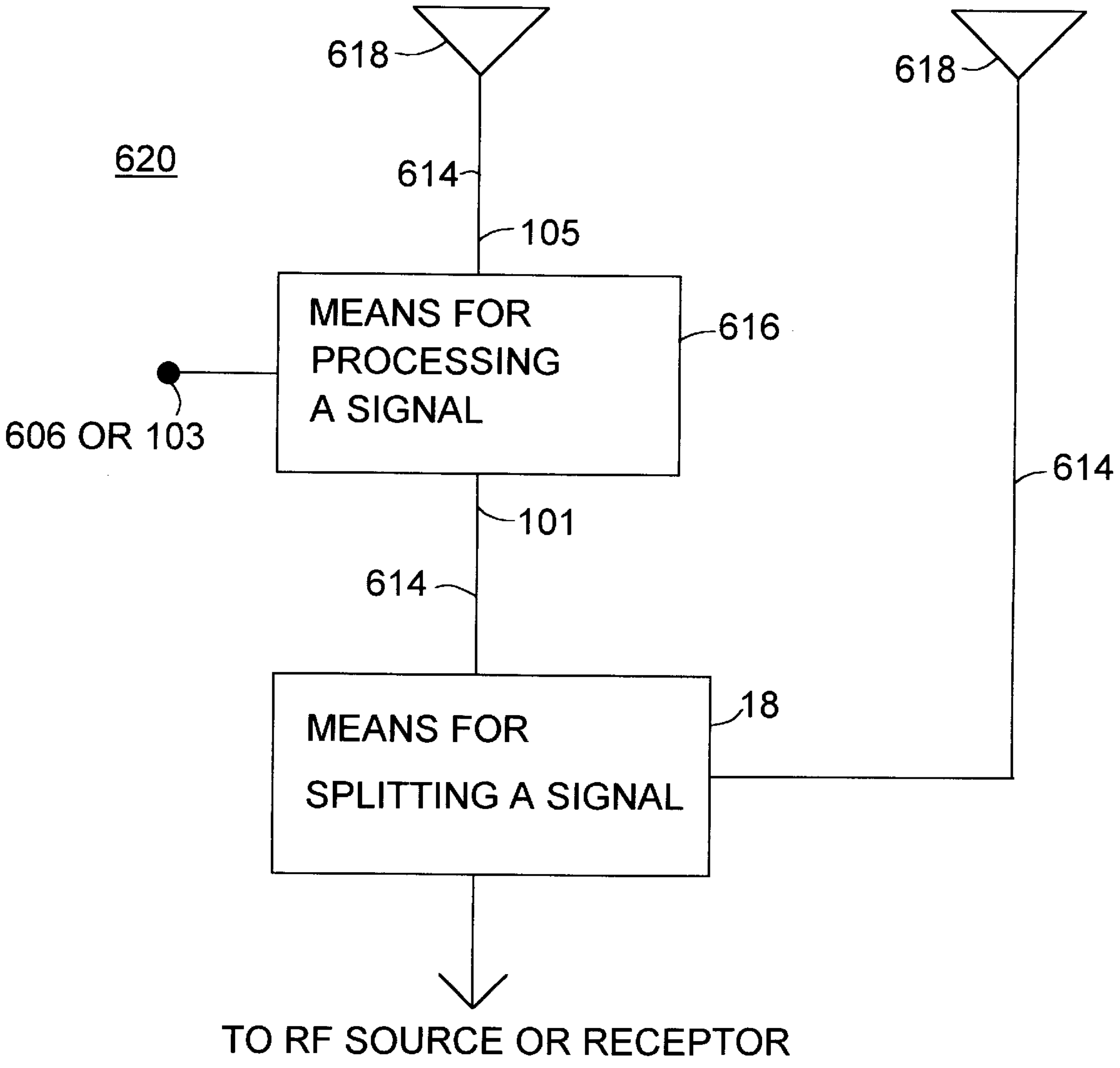
FIG. 1A is a block diagram of the general array.
Figure 1B:
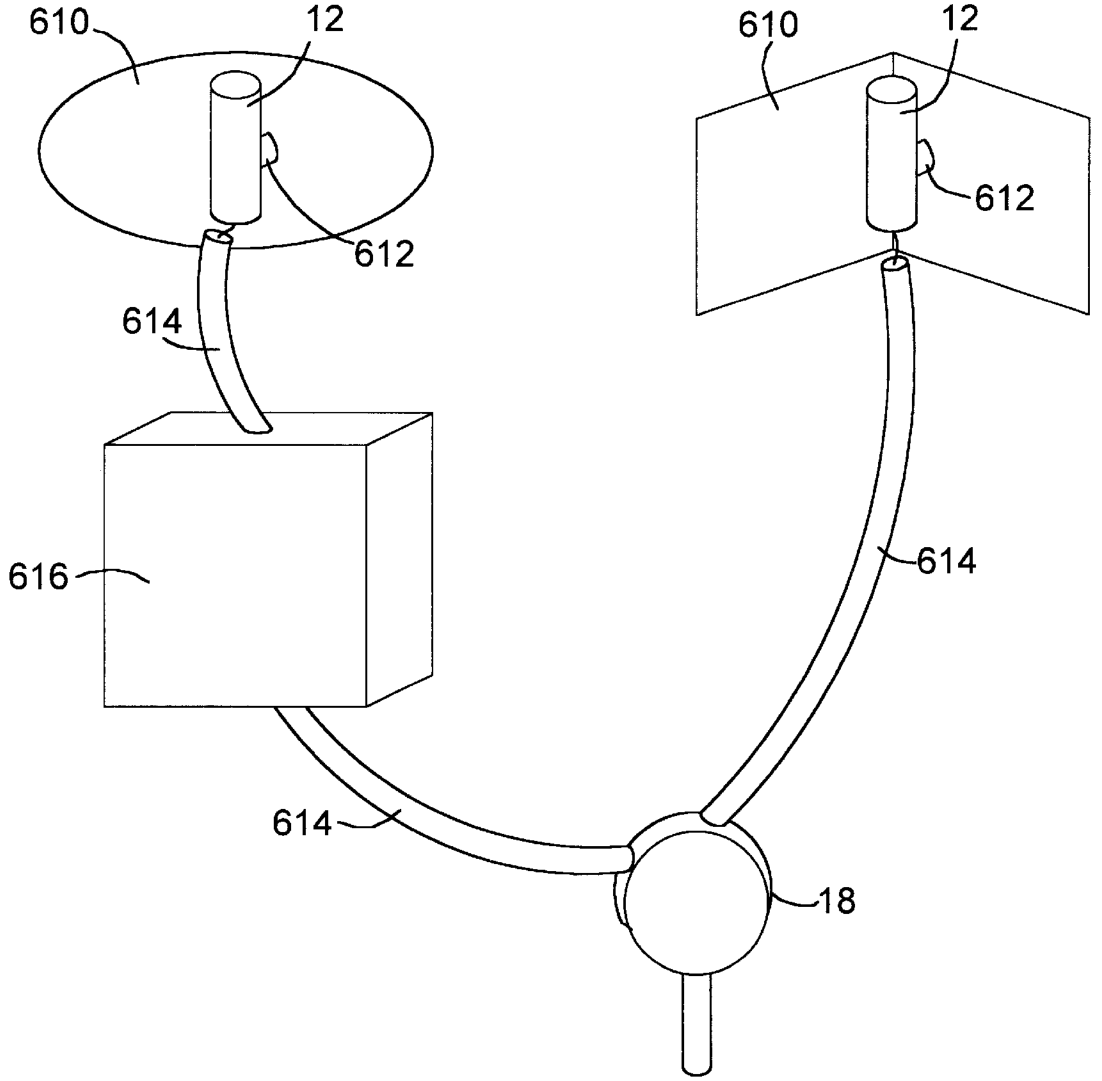
FIG. 1B shows a perspective side view of one embodiment of the general array.
Figure 5:
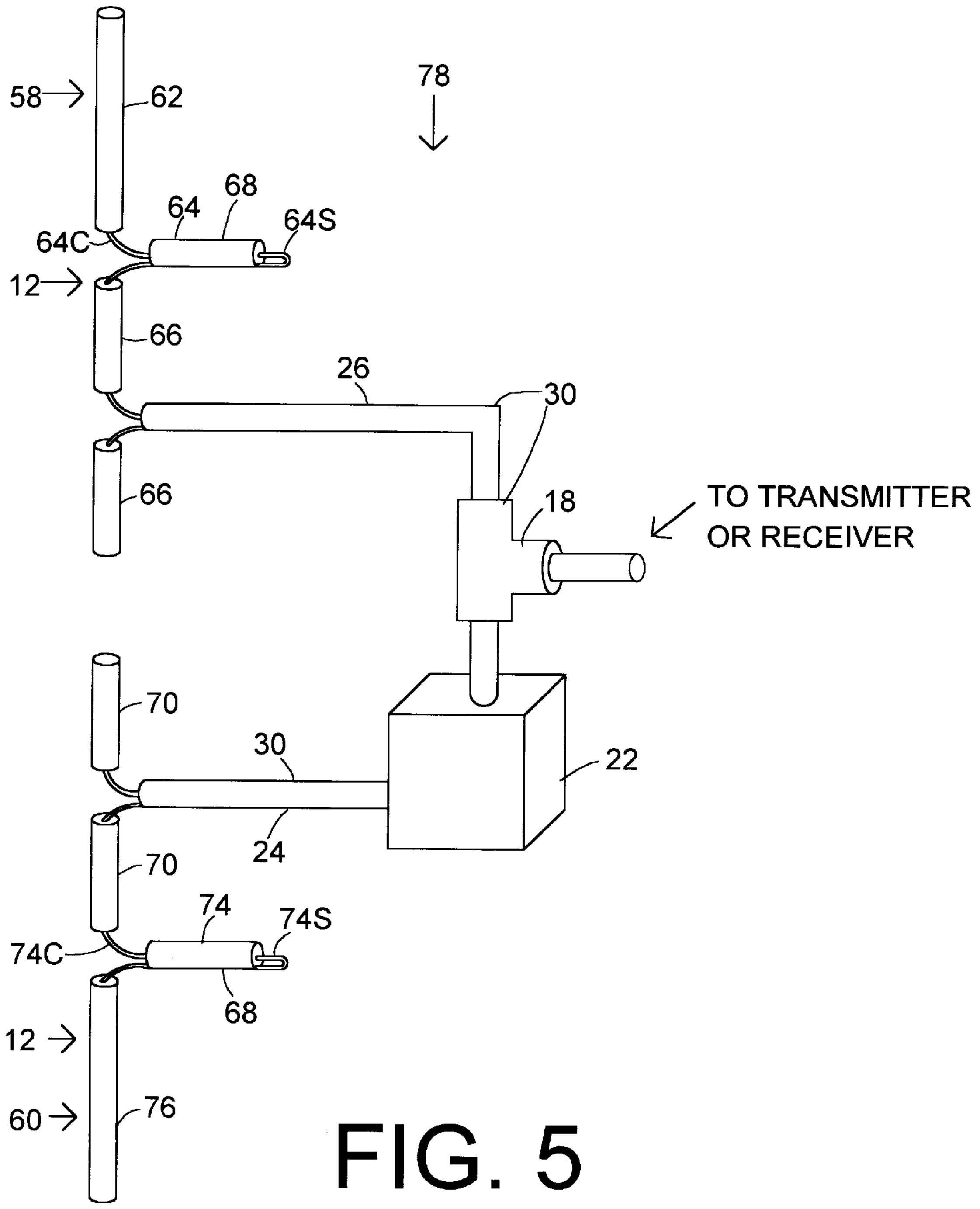
FIG. 5 shows a perspective side view of the down-tilt array.

The array antenna takes different forms according to the particular application. The array antennas illustrated in FIG. 1A, FIG. 1B, FIG. 2A, FIG. 2B, FIG. 2C, and FIG. 5 exemplify array antennas which may be utilized, for example, in the operational environments of trunking, cellular, and/or other mobile communications systems. The array antenna shown in FIG. 1A and FIG. 1B is designated as the general array 620. The array antenna shown in FIG. 2A will be referred to as the simple array 10. In contrast, the array antenna shown in FIG. 2B will be referred to as the complex array 56 because the complex array 56 uses a greater number of dipole elements 12 than the simple array 10. The array antenna in FIG. 2C is designated as an alternate complex array. The array antenna illustrated in FIG. 5 is designated as a down-tilt array 78. The down-tilt array 78 is primarily useful in the context of microcellular configurations, umbrella cellular configurations, and/or where the antenna sites are in excess of 200 feet above average terrain.

Figure 2A:
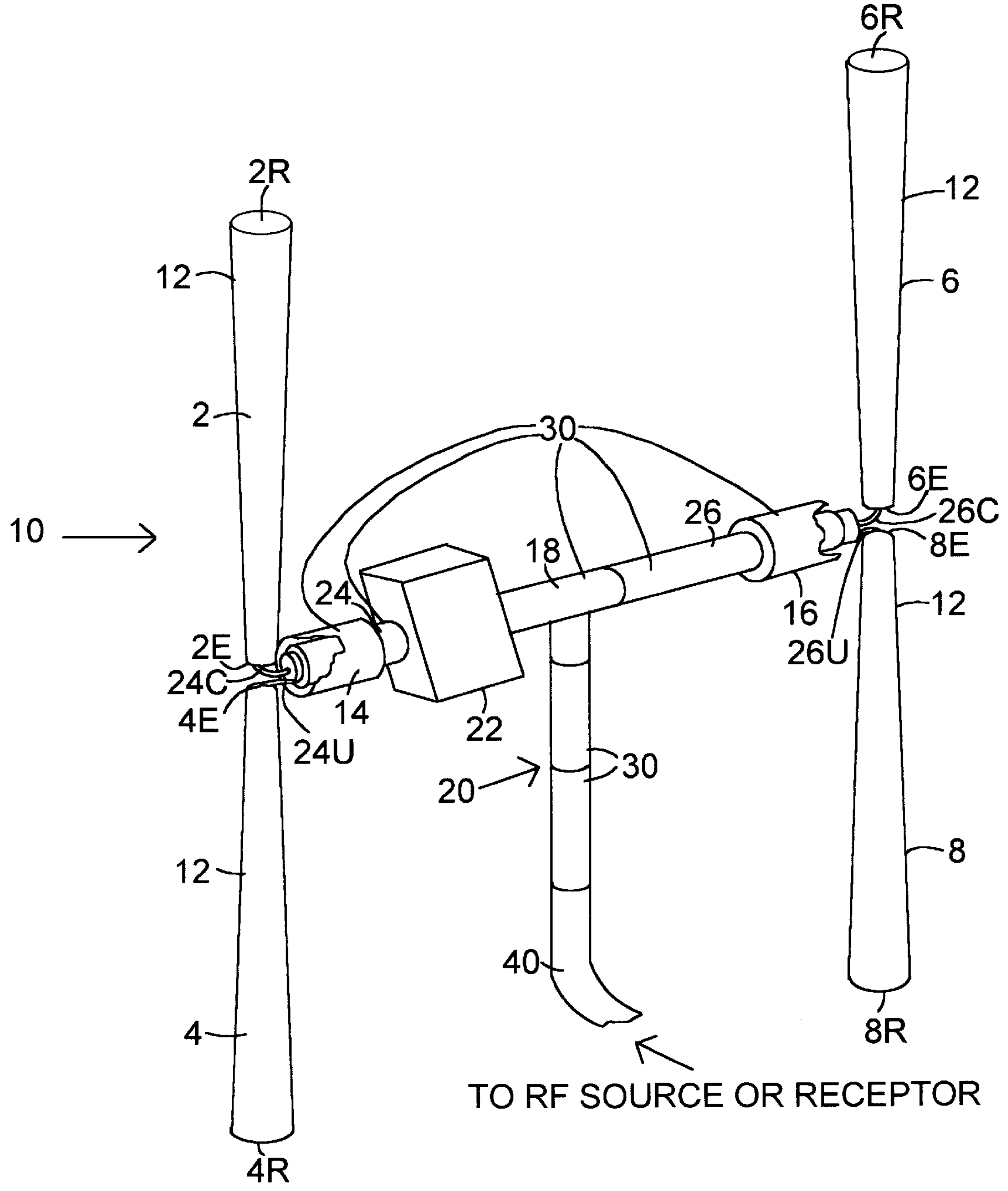
FIG. 2A is a perspective side view of the simple array.
Figure 2B:
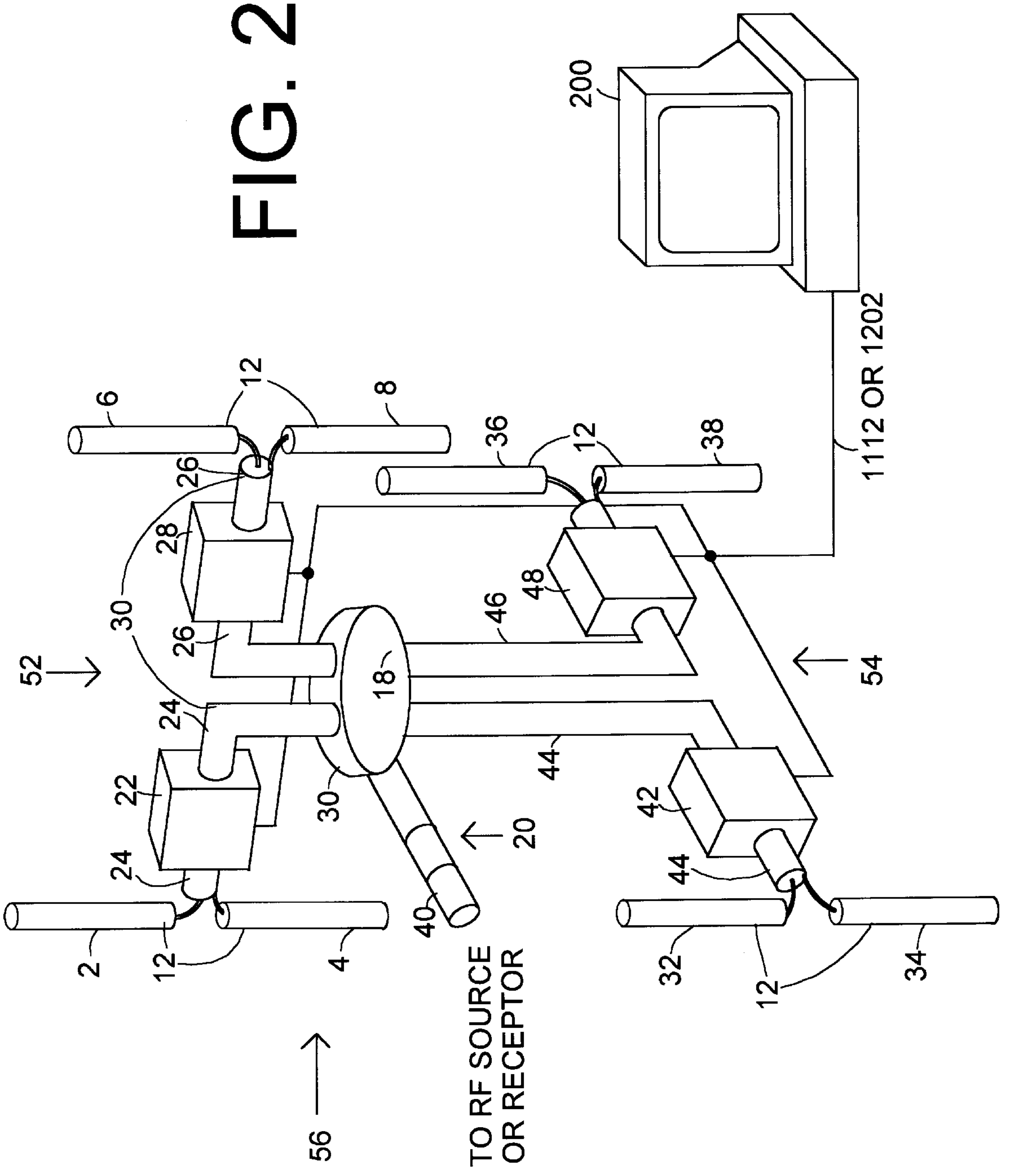
FIG. 2B is a perspective side view of the complex array.
Figure 2C:
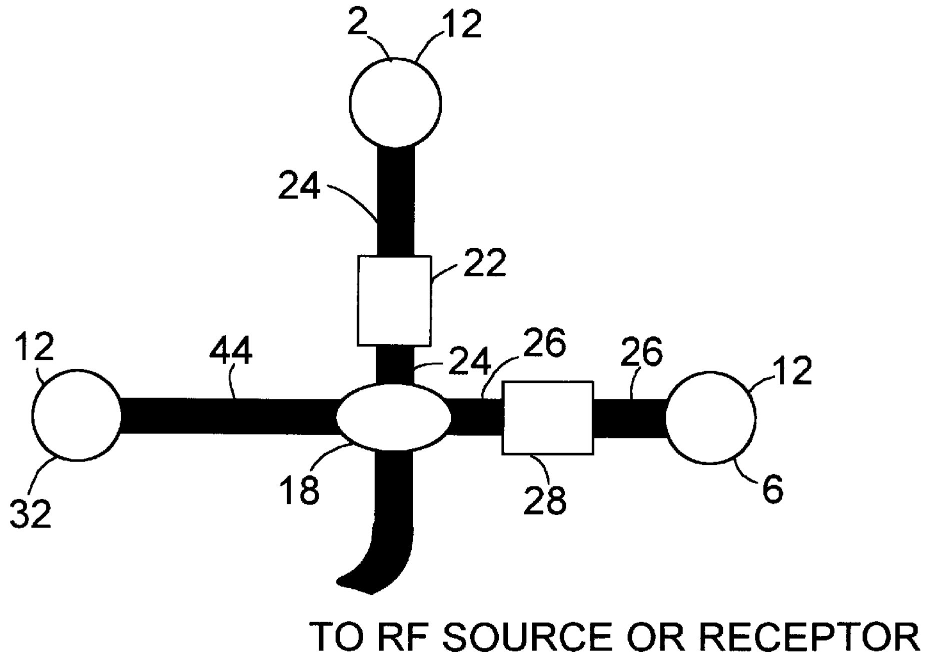
FIG. 2C is a perspective top view of the alternate complex array.

The general array 620, illustrated in FIG. 1A; simple array 10, illustrated in FIG. 2A; the complex array 56, illustrated in FIG. 2B; the alternate complex array, illustrated in FIG. 2C; and the down-tilt array 78, illustrated in FIG. 5 may all utilize a plurality of dipole elements 12. For example, the plurality of dipole elements 12 in FIG. 2A includes a first upper dipole element 2, a second upper dipole element 6, a first lower dipole element 4, and a second lower dipole element 8. The dipole elements 12 may be constructed of metals such as aluminum, copper, steel, silver-plated metals, and/or various other metallic alloys. In addition, conductive foils may be laminated to plastics, or similar dielectrics, to produce lightweight dipole elements 12. For example, etchings on printed circuit boards (PC boards) may be utilized to construct various dipole elements 12.

The dipole elements 12 are further defined by their physical shape and dimensions. The shape of each dipole element 12 is substantially cylindrical, substantially conical, substantially frustum-shaped, substantially planar, or substantially rectangular. Substantially conical dipole elements 12 can be used to achieve a lower impedance and a lower Q of the array antenna than with cylindrically shaped dipole elements 12. Consequently, substantially conical dipole elements 12 are well-suited for broadband applications such as Personal Communication Systems (PCS). As the diameter of the cylindrical or conical dipole element of a fixed length is increased, a lower impedance of the array antenna results. Thus, the diameter of the dipole elements 12 can be used to improve matching the impedance of the array antenna with the characteristic impedance of the coaxial cable, waveguide, unbalanced transmission line, or other signal transmission media.

In general, the length of each dipole element 12 could be any length greater than approximately one-quarter wavelength at the desired frequency of operation. However, the preferred length of each dipole element 12 may vary from approximately one-half wavelength at the desired frequency of operation to approximately three-quarters wavelength at the desired frequency of operation. If the array antenna uses dipole elements 12 that are longer than one-half wavelength and shorter than three-quarters wavelength, then the array antenna will have slightly higher impedances in comparison to a one-half wavelength dipole element. In addition, the longer dipole elements 12 may have slightly higher gain than a one-half wavelength dipole element depending, upon the relative vertical spacing of dipole elements 12.

General Array

FIG. 1A is a block diagram of the general array 620. The general array 620 comprises a plurality of radiating elements 618, a plurality of signal transmission media 614, a means for splitting a signal 18, and a means for processing a signal 616. FIG. 1B exemplifies one possible embodiment of the general array 620. Specifically, FIG. 1B shows a perspective side view of the general array 620.

Radiating Elements (618)

Each radiating element 618 comprises a dipole element 12, a horn, the combination of a dipole element and a conductive reflector, a helical radiator, the combination of a dipole element and a corner reflector, the combination of a dipole element and a parabolic reflector, the combination of a horn and a conductive reflector, a waveguide having a slot, a waveguide having an aperture, a cavity having a slot, a cavity having an aperture, a radiating cavity, a radiating waveguide, or the like. For example, the left side of FIG. 1B illustrates a radiating element 618 embodied as the combination of a dipole element and a parabolic reflector. The right side of FIG. 1B illustrates a radiating element embodied as the combination of a dipole element and a corner reflector.

Signal Transmission Media (614)

Each signal transmission media 614 comprises an unbalanced transmission line, stripline, microstrip, a coaxial cable, a waveguide, a dielectric waveguide, a flexible waveguide, a rigid waveguide, twin lead, or the like. In general, respective ones of the signal transmission media 614 may be coupled to corresponding ones of the radiating elements 618. In addition, each signal transmission media 614 generally may be coupled to the means for splitting a signal 18. However, various possible series orientations of the means for processing a signal 616 with respect to the signal transmission media 614 may permit the decoupling of the signal transmission media 614 from one or more radiating elements 618. In other words, the means for processing a signal 616 may optionally decouple the signal transmission media 614 from one or more radiating elements 618. Likewise, the means for processing a signal 616 may optionally decouple the signal transmission media 614 from the means for splitting a signal 18.

Means for Splitting a Signal (18)

The means for splitting a signal 18 constitutes a splitter, a coaxial splitter, a plurality of coaxial splitters, a waveguide splitter, a transformer, a hybrid, a “star” junction, an electrical interconnection of multiple coaxial cables, an electrical interconnection of any signal transmission media, any combination of the foregoing, or the like. In addition, the means for splitting a signal 18 may comprise a plurality of coaxial splitters joined by signal transmission media, as jumpers that couple ones of the coaxial splitters. The means for splitting a signal 18 is coupled to at least one signal transmission media 614.

Means for Processing a Signal (616)

The means for processing a signal 616 processes electromagnetic energy in accordance with control signals, typically originating from an antenna control system. In particular, the means for processing a signal 616 switches radio frequency signals, attenuates radio frequency signals, phase shifts radio frequency signals, and/or modulates radio frequency signals. Consequently, the means for processing a signal 616 may refer to a radio frequency switch, a coaxial relay, a radio frequency signal processing system, a phase shifter, a phase shifter with inherent means for attenuating, means for attenuating, means for attenuating with inherent phase shifting, or another device.

Note that in practice, the distinctions between the means for attenuating and the phase shifter may be blurred. Various embodiments of the phase shifter may produce, but need not produce, inherent attenuation. Conversely, various means for attenuating a signal may produce, but need not produce, inherent phase shifts. The phase shifter and the means for attenuating are described in greater detail in following portions of the specification.

As illustrated in FIG. 1A, the means for processing a signal 616 has a control input 103 and RF signal terminals 101 and 105. Alternatively, the means for processing a signal 616 has a control input 606 in conjunction with the means for attenuating as illustrated in FIG. 6B through 6I, inclusive. The control input 103, or control input 606, is responsive to control signals from an antenna control system. The means for processing a signal 616 is coupled to the means for splitting a signal 18 via at least one RF signal terminal.

Simple Array

The principal elements of the simple array 10 in FIG. 2A are the plurality of dipole elements 12, the signal transmission network 30 and the primary phase shifter 22.

Dipole Elements (12)

The simple array 10 utilizes two or more dipole elements 12. As illustrated in FIG. 2A, the plurality of dipole elements include the first dipole upper dipole element 2, the first lower dipole element 4, the second upper dipole element 6, and the second lower dipole element 8. Each dipole element 12 has a connecting end and a radiating end. The connecting ends 2E, 4E, 6E, and 8E are labeled with the same number as their corresponding dipole elements 12 with the addition of the suffix E. For example, the connecting end of the first upper dipole element is labeled 2E on FIG. 2A. The radiating ends are labeled with same number as their corresponding dipole element with the suffix R.

Figure 3A:
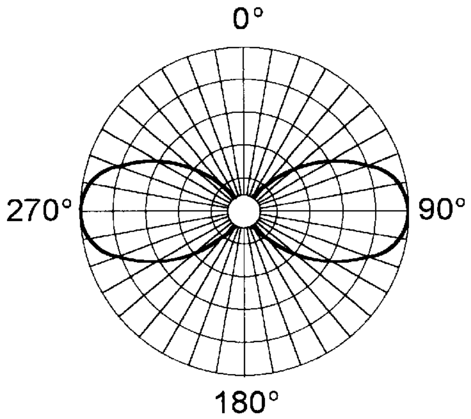
FIG. 3A illustrates the vertical radiation pattern of the simple array.
Figure 3B:
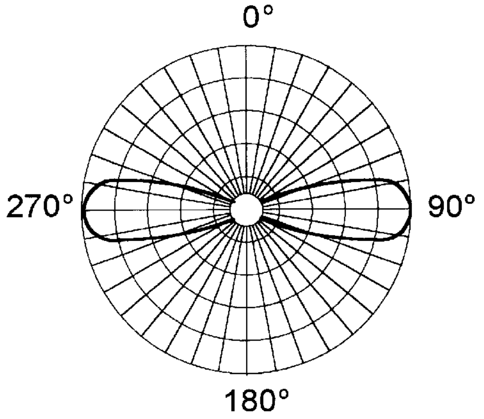
FIG. 3B illustrates the vertical radiation pattern of the alternate collinear array.
Figure 3C:
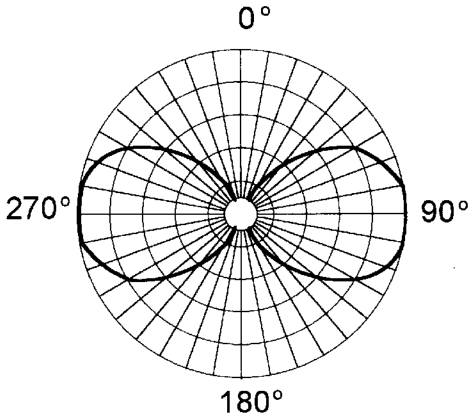
Figure 3D:
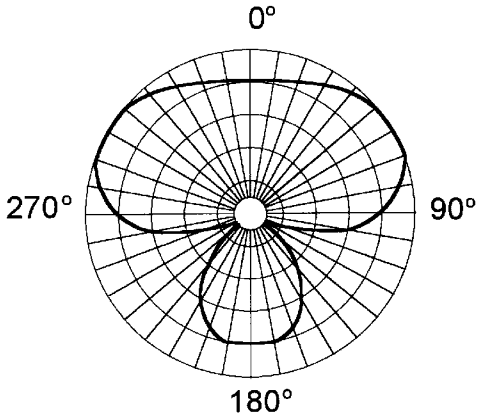

In practice, the radiating ends 2R, 4R, 6R, and 8R of the dipole elements 12 may be attached to additional dipole elements (not shown in FIG. 2A) via shorted one-quarter wave stubs to form a collinear array antenna. For example, one additional dipole element could be attached to the first upper dipole element 2 at the radiating end 2R. Meanwhile, another additional dipole element could be attached to the second upper dipole element 6 at radiating end 6R. The resulting alternate collinear array antenna would have a vertical radiation pattern that is more compressed than the vertical pattern of the simple array 10. Specifically, the vertical radiation pattern of the simple array 10 in FIG. 2A is illustrated in FIG. 3A. In contrast, the compressed vertical radiation pattern of the alternate collinear array antenna, using one additional dipole element attached to the first upper dipole element 2 and to the second upper dipole element 6, is illustrated in FIG. 3B.

The dipole elements 12 are defined by the vertical separations between dipole elements 12 and the horizontal separations between dipole elements 12. The first vertical separation between the connecting ends 2E and 4E may vary from approximately zero to approximately four-tenths of a wavelength. Likewise, second vertical separation between the connecting ends 6E and 8E may vary from approximately zero to approximately four-tenths of a wavelength. Nevertheless, the first vertical separation and second vertical separation generally will be much less than four-tenths of a wavelength to facilitate a non-lossy connection between the signal transmission network 30 and the dipole elements 12. In addition, first vertical separations and second vertical separations, which are shorter than four tenths of one-wavelength, should be used to maximize gain for the case where dipole elements 12 are longer than one-half wavelength.

The horizontal spacing between the dipole elements 12 influences the simple array 10 radiation pattern in the horizontal plane. The first upper dipole element 2 and the first lower dipole element 4 have a primary horizontal spacing with respect to the second upper dipole element 6 and the second lower dipole element 8, respectively. The primary horizontal spacing preferably ranges from approximately one-quarter of a wavelength to approximately one-wavelength at the desired frequency of operation. Omnidirectional, figure-eight, and star-like patterns may be produced by varying the primary horizontal spacing and/or phasing of the first upper dipole element 2 and the first lower dipole element 4 with respect to the second upper dipole element 6 and the second lower dipole element 8.

The simple array 10 may have, but need not have, a means for securing, which secures the relative orientations of the dipole elements 12. The means for securing relative orientations includes a clamp, a fastener, a framework, a signal transmission media (i.e. a rigid coaxial cable) and/or a support. The means for securing may be constructed from materials, such as dielectric material, conductive material, plastic, fiberglass, epoxy, resins, metals, brass, aluminum, steel, zinc, tin, lead, and copper. However, in practice, dielectric materials are preferred so that the theoretical radiation patterns of the simple array 10 are not unduly altered. The means for securing relative orientations fixes one or more of the following spacings: the first vertical spacing, the second vertical spacing, and the primary horizontal spacing.

Signal Transmission Network (30)

The signal transmission network 30 couples the dipole elements 12 to a radio frequency source or receptor. A radio frequency source or receptor includes one or more of the following: transmitters, receivers, transceivers, base stations, repeaters, duplexers, diplexers, transmitter combiners, receiver multicouplers, cavity combiners, hybrid combiners, and cavity filters. The signal transmission network 30 includes an alpha transmission media 24, a beta transmission media 26, and a means for splitting a signal 18. In addition, the signal transmission network may include, but need not include, an omega transmission media 40, an impedance matching network 20, a first balun 14 and a second balun 16. The signal transmission network 30 is coupled to the primary phase shifter 22.

The alpha transmission media 24, beta transmission media 26 and omega transmission media 40 include, for example, coaxial cables, rigid waveguides, flexible waveguides, microstrip, stripline, unbalanced transmission line, dielectric waveguides, twin-lead, and the like. The electrical length of the beta transmission media 26 corresponds to the combined electrical length of the path through the primary phase shifter 22 and the alpha transmission media 24. Because the electrical length of the beta transmission media 26 corresponds to the combined electrical length of the alpha transmission media 24 plus the primary phase shifter 22 by a known relationship, the relative phase of the radio frequency signals in the dipole elements 12 can be controlled.

Preferably, the electrical length of the beta transmission media 26 is related by an integer multiple of one-wavelength to the combined electrical length of the alpha transmission media 24 plus the primary phase shifter 22 so that the resulting phase of the radio frequency signals in the dipole elements 12 can be readily, conveniently determined. If desired for impedance matching, the electrical length of the alpha transmission media 24 and the electrical length of the beta transmission media 26 may be fixed at any integer multiple of approximately one-half wavelength, at the desired radio frequency of operation, to reflect the impedance of the dipole elements 12 to the means for splitting a signal 18. If such half wavelength dimensions are used, then increasing the diameter of the dipole elements 12 will reduce the impedance at the means for splitting a signal 18.

If the length of the alpha transmission media 24 and the beta transmission media 26 correspond by a known relationship (i.e. integer multiples of one-wavelength), and if the inner conductor and the outer conductor of the transmission media are connected to opposite dipole elements 12, then the dipole elements 12 can be fed in-phase. For example, referring to FIG. 2A, connecting the alpha center conductor 24C of the alpha transmission media 24 to the first upper dipole element 2, connecting the alpha outer conductor 24U of the alpha transmission media 24 to the first lower dipole element 4, connecting the beta center conductor 26C to the second upper dipole element 6, and connecting the beta outer conductor 26U to the second lower dipole element 8 may produce an in-phase relationship, of the first upper dipole element 2 and the first lower dipole element 4 with respect to the second upper dipole element 6 and the second lower dipole element 8. Such an in-phase relationship only exists provided that the primary phase shifter 22 does not introduce a phase shift which is inconsistent with the in-phase relationship, and provided that the primary horizontal spacing is consistent with an in-phase relationship. To produce an out-of-phase relationship, the connections to the first upper dipole element 2 and the first lower dipole element 4 are merely reversed.

The means for splitting a signal 18 is coupled to the primary phase shifter 22 and the alpha transmission media 24. The means for splitting a signal 18 may be directly, mechanically attached to the alpha transmission media 24 or the primary phase shifter 22. The means for splitting a signal 18 constitutes a commercially available coaxial splitter, a plurality of coaxial splitters, a waveguide splitter, a transformer, a hybrid, a "star" junction, a direct electrical interconnection of multiple coaxial cables, or any combination of the foregoing. The means for splitting a signal 18 may have inherent impedance matching characteristics. For example, where the means for splitting 18 is embodied as transformer, the transformer can be used to match the impedance of the dipole elements 12 to the impedance of the radio frequency source or receptor.

The impedance matching network 20 is optionally used to match the impedance of the plurality of dipole elements 12 to the characteristic impedance of the omega transmission media 40 or the impedance of the RF source or receptor. The impedance matching network 20 is not essential for the operation of the array antenna and may be omitted; especially where the means for splitting a signal 18 has inherent impedance matching characteristics. The impedance matching network 20 may constitute a quarter-wave coaxial transformer, a series-section coaxial transformer, a toroidal transformer, an air-coil coupled transformer, a fixed capacitor-inductor network, or an adjustable capacitor-inductor network located between the simple array and the omega signal transmission media 40. Because the primary phase shifter 22 may change the impedance of the simple array antenna 10, an adjustable capacitor-inductor network may be used, but need not be used, to dynamically compensate for said changes in the impedance of the simple array 10.

The first balun 14 and second balun 16 are optionally used if the alpha transmission media 24 and the beta transmission media 26 constitute unbalanced transmission lines, for example, coaxial cable. As illustrated in FIG. 2A, the first balun 14 is a conductive sheath which is electrically connected to the outer sheathing of the alpha transmission media 24 approximately one-quarter wavelength from the connecting ends 2E and 4E. Similarly, the second balun 16 may constitute a conductive sheath which is electrically connected approximately one-quarter of a wavelength from the connecting ends 6E and 8E. The first balun 14 and the second balun 16 reduce the current radiated from alpha transmission media 24 and beta transmission media 26 to preserve the directional radiation patterns of the simple array 10.

Alternatively, the first balun 14 may constitute an electrical connection (not shown) from the first upper dipole element 2, near the connecting end 2E, to the outer sheathing of the alpha transmission media 24, at a point approximately one-quarter wavelength from the connecting end 2E. Likewise, the second balun 16 may constitute a connection from the second upper dipole element 6 to the outer sheathing of the beta transmission media 26 at a point approximately one-quarter wavelength from the connecting end 6E.

Primary Phase Shifter (22)

Figure 6A:
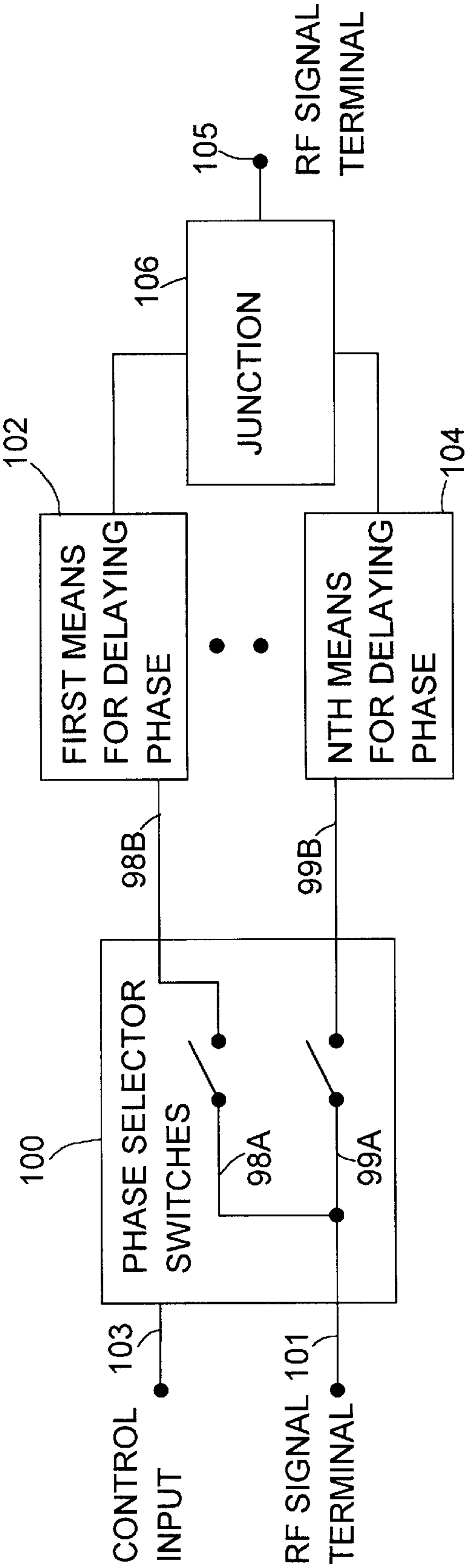
FIG. 6A is a general, block diagram of one embodiment of means for processing a signal, wherein the means for processing a signal comprises a phase shifter; phase shifter refers to the phase shifter, the primary phase shifter, the secondary phase shifter, the tertiary phase shifter, or the quaternary phase shifter.

In the simple array 10, the means for processing a signal may comprise a primary phase shifter 22. The primary phase shifter 22 may vary, in effect, the electrical length of the alpha transmission media 24 such that the first upper dipole element 2 and the first lower dipole element 4 are fed out of phase or in phase with respect to the second upper dipole element 6 and the second lower dipole element 8, respectively. Referring to FIG. 6A, the primary phase shifter 22 has a control input 103 which is responsive to control signals from an antenna control system, a trunking base station controller, a cellular base station controller, a mobile switching center, a computer, or the like.

The primary phase shifter 22 may be used to produce the antenna radiation patterns in the horizontal plane as illustrated in FIG. 3C through FIG. 3H inclusive. A multitude of radiation patterns are possible and those shown in FIG. 3C through FIG. 3H are merely illustrative. In particular, FIG. 3C through FIG. 3E, inclusive, show the horizontal plane radiation patterns where the first upper dipole element 2 and the first lower dipole element 4 are horizontally separated by approximately one-half wavelength from the second upper dipole element 6 and the second lower dipole element 8, respectively. FIG. 3F through FIG. 3H show the horizontal plane radiation patterns where the primary horizontal separation (the horizontal separation of first upper dipole element 2 and the first lower dipole element 4 with regards to the second upper dipole element 6 and the second lower dipole element 8, respectively) is approximately one-quarter wavelength at the desired frequency of operation. In sum, the primary phase shifter 22 allows the simple array 10 to be used to produce omnidirectional patterns, cardioid patterns, figure-eight, and/or other radiation patterns in the horizontal plane.

Complex Array Antenna

A variation of the simple array 10 featured in FIG. 2A is the complex array 56 illustrated in FIG. 2B. The main elements of the complex array 56 are a primary array 52, a signal transmission network 30, a secondary array 54, a delta transmission media 44, a gamma transmission media 46, and two or more phase shifters.

The complex array 56 may include any two phase shifters selected from the group of the primary phase shifter 22, a secondary phase shifter 28, a tertiary phase shifter 42, and a quaternary phase shifter 48. The prefixal adjectives, “primary, secondary, tertiary, and quaternary,” denote the relative location of the phase shifters on the complex array 56. For example, the complex array 56 may include the primary phase shifter 22 and a tertiary phase shifter 42. In addition, the complex array 56 may include, but need not include, a secondary phase shifter 28 and a quaternary phase shifter 48.

The components of the primary array 52 and the secondary array 54 are similar in construction to the simple array antenna 10, as illustrated in FIG. 2A, with the principal distinction that two or more phase shifters are utilized. Equivalent elements in FIG. 2A and FIG. 2B are accordingly labeled with the same numbers.

Primary Array (52)

The primary array 52 utilizes two or more dipole elements 12. Likewise, the secondary array 54 utilizes two or more dipole elements 12. By preferably utilizing eight or more total dipole elements, the aperture of the complex array 56 is relatively high compared to the simple array 10. Accordingly, space-diversity reliability is enhanced in the complex array 56. In particular, the spacing of dipole elements 12 incorporates space diversity into the complex array 56 such that phase distortion and fading is minimized. Thus, the complex array 56 in FIG. 2B has attributes which are well-suited for mobile communications at microwave frequencies, and particularly for applications including Personal Communications Systems (PCS).

As illustrated in FIG. 2B, the primary array 52 has a first upper dipole element 2, a first lower dipole element 4, a second upper dipole element 6, and a second lower dipole element 8.

The first upper dipole element 2 and first lower dipole element 4 have a primary horizontal spacing from the second upper dipole element 6 and the second lower dipole element 8, respectively. The primary horizontal spacing ranges from approximately one-eighth wavelength to approximately one-half wavelength in order to produce cardioids in the horizontal plane. Other horizontal spacings may be used to produce different horizontal plane radiation patterns.

Signal Transmission Network (30)

The signal transmission network 30 refers to the combination of the alpha transmission media 24, the beta transmission media 26, and the means for splitting a signal 18. The alpha transmission media 24, the beta transmission media 26, the delta transmission media 44, and the gamma transmission media 46 are collectively referred to as the signal transmission media.

The alpha transmission media 24 and the beta transmission media 26 may be coupled to the dipole elements 12 of the primary array 52. The alpha transmission media 24 and the beta transmission media 26 may be coupled to the means for splitting a signal 18. However, the primary phase shifter 22 may optionally decouple the alpha transmission media 24 from the dipole elements 12, provided that the possible series orientation of the alpha transmission media 24 with respect to the primary phase shifter 22 so permits. Likewise, the primary phase shifter 22 may optionally decouple the alpha transmission media 24 from the means for splitting a signal 18, provided that the possible series orientation of the alpha transmission media 24 with respect to the primary phase shifter 22 so permits. The secondary phase shifter 28 may optionally decouple the beta transmission media 26 from either the dipole elements 12 or the means for splitting a signal 18, provided that the possible series orientation of the secondary phase shifter 28 with respect to the beta transmission media 26 so permits.

The alpha transmission media 24, the beta transmission media 26, and the primary phase shifter 22 each provide a specific amount of propagation delay to the applied electromagnetic energy. Consequently, the alpha transmission media 24, the beta transmission media 26, and the primary phase shifter 22 may each be conceptualized as placing a certain amount of electrical length in the path of the electromagnetic energy. The combined electrical lengths of the alpha transmission media 24 and the primary phase shifter 22 are selected to correspond to the electrical length of the beta transmission media 26 by a known relationship. The correspondence in electrical lengths may, but need not, mean that the alpha transmission media 24 and the beta transmission media 26 have equal physical lengths, or are related by some integer multiple of one wavelength at the desired radio frequency of operation.

The means for splitting a signal 18 may be a splitter, an electrical connection, a commercially available “star” used for cavity combiners, a waveguide splitter, a transformer, one or more multi-port resistive pads, hybrid combiners, a plurality of tee connectors with accompanying coaxial cable harnesses, or the like. The means for splitting a signal 18 couples the phase shifters to the radio frequency source or receptor. The means for splitting 18 may be mechanically connected to the optional impedance matching network 20. In practice, the means for splitting a signal 18 may be mechanically connected to at least one phase shifter, to at least one signal transmission media, or to at least one phase shifter and at least one signal transmission media.

Primary Phase Shifter (22) & Secondary Phase Shifter (28)

If the primary phase shifter 22 is utilized, the primary phase shifter 22 is preferably located in series relative to the alpha transmission media 24; alternatively, the primary phase shifter 22 is located in parallel relative to the alpha transmission media 24. As shown in FIG. 2B, the primary phase shifter 22 is located in series between two portions of the alpha transmission media 24. The primary phase shifter 22 could also be located in series with the entire alpha transmission media 24, and substantially adjacent to either the dipole elements 12 or the means for splitting a signal 18.

The primary phase shifter 22 is coupled to the means for splitting a signal 18 and at least one dipole element 12.

The primary phase shifter 22, as well as the secondary phase shifter 28, may include, but need not include, means for attenuating. Conceptually, the combination of a phase shifter with means for attenuating is equivalent to either a phase shifter with inherent means for attenuating or the means for processing a signal. The means for attenuating may, but need not, constitute a high impedance facilitated by the open circuit of a switching element. The means for attenuating may utilize one or more of the following switching elements: a PIN diode, a RF transistor, a relay, a switching transistor, a tube, a switching element, a semiconductor, a phase delay circuit, and the like. In addition, the means for attenuating may utilize, but need not utilize, one or more of the following resistive elements: a resistor, a signal transmission media, a resonant circuit, a cavity, a dielectric waveguide, a waveguide, stripline, microstrip, coaxial cable, unbalanced transmission line, a waveguide with ferrite phase shifter, hybrid, a filter, and the like. The means for attenuating is optionally coupled to the means for splitting a signal 18. Preferably, the primary phase shifter 22 is coupled to the means for splitting a signal 18 such that an impedance variation (i.e. a high impedance) generated by the means for attenuating, of the primary phase shifter 22, is reflected back to the means for splitting a signal 18 as a high impedance. A high impedance or a low impedance is measured relative to the characteristic impedance of the transmission media or the impedance of the RF source or receptor.

If a secondary phase shifter 28 is utilized, the secondary phase shifter 28 is located in series with the beta transmission media 26; alternatively, the secondary phase shifter 28 is located in parallel with the beta transmission media 26. As shown in FIG. 2B, the secondary phase shifter 28 is located in series between two portions of the beta transmission media 26. The secondary phase shifter 28 could also be located in series with the entire beta transmission media 26, and substantially adjacent to either the dipole elements 12 or the means for splitting a signal 18. The secondary phase shifter 28 is coupled to the means for splitting a signal 18 and at least one dipole element 12. The secondary phase shifter 28 used in the complex array 56 may include, but need not include, means for attenuating. The means for attenuating may, but need not, constitute a high impedance produced by the open circuit of a switching element. The secondary phase shifter 28 is preferably coupled to the means for splitting a signal 18 such that an impedance variation generated by the means for attenuating, of the secondary phase shifter 28, is reflected back to the means for splitting 18 as a high impedance. For example, the primary phase shifter 22 and the secondary phase shifter 28 can contemporaneously, independently generate high impedances via a plurality of means for attenuating so that the secondary array 54 can asynchronously produce cardioid patterns in two opposite directions.

Secondary Array (54)

The secondary array 54 has a third upper dipole element 32, a third lower dipole element 34, a fourth upper dipole element 36, and a fourth lower dipole element 38. The third upper dipole element 32 and the third lower dipole element 34 have a secondary horizontal spacing from the fourth upper dipole element 36 and the fourth lower dipole element 38, respectively. The secondary horizontal spacing ranges from approximately one-eighth wavelength to approximately one-half wavelength at the desired frequency of operation in order to produce cardioid radiation patterns. Other secondary horizontal spacings may be used to produce different radiation patterns.

The complex array 56 may include, but need not include, means for fixing and means for securing. The means for fixing includes a clamp, a fastener, a support, a brace, a framework, or the like. The means for fixing is affixed to the complex array 56. The means for fixing secures the relative orientation of said primary array 52 with respect to said secondary array 54 in substantially perpendicular planes, or otherwise.

The means for securing is affixed to at least one dipole element 12. The means for securing includes a clamp, a fastener, a support, a framework, a signal transmission media (i.e. rigid waveguide), and/or mounting hardware. The means for securing fixes the relative orientations of one or more of the following spacings: the first vertical spacing, the second vertical spacing, the third vertical spacing, the fourth vertical spacing, the primary horizontal spacing, and the secondary horizontal spacing. The means for securing is constructed from materials, such as metals, plastics, fiberglass, resins, dielectric materials, or conductive materials.

Delta Transmission Media (44) & Gamma Transmission Media (46)

A delta transmission media 44 and a gamma transmission media 46 may be coupled to the dipole elements 12 of the secondary array 54 and to the means for splitting a signal 18. However, if the possible series orientation of the phase shifter (i.e. tertiary phase shifter 42) relative to the signal transmission media (i.e. quaternary phase shifter 48) permits, then the signal transmission media may be optionally decoupled from either the dipole elements 12 or the means for splitting a signal 18.

The delta transmission media 44 and the gamma transmission media 46 have electrical lengths. The concept of electrical lengths was explained above in greater detail with respect to the alpha transmission media 24 and the beta transmission media 26. The electrical lengths of the delta transmission media 44 combined with the electrical length of the tertiary phase shifter 42 corresponds to the electrical length of the gamma transmission media 46 by a known relationship. Correspondence of the electrical lengths may mean, but need not mean, that the delta transmission media 44 and the gamma transmission media 46 are merely the same length, or that the lengths are related by integer multiples of one-wavelength at the desired radio frequency of operation.

Tertiary Phase Shifter (42) & Quaternary Phase Shifter (48)

If the complex array 56 uses a tertiary phase shifter 42, the tertiary phase shifter 42 is preferably located in series with the entire delta transmission media 44 or in series with portions of the delta transmission media 44. Alternatively, the tertiary phase shifter 42 is in parallel with the delta transmission media 44. The tertiary phase shifter 42 may be coupled to the means for splitting a signal 18 and at least one dipole element 12.

The tertiary phase shifter 42, as well as the quaternary phase shifter 48, may include, but need not include, means for attenuating. The means for attenuating may, but need not, constitute a high impedance produced by the open circuit of a switching element. The means for attenuating comprises, for example, one or more of the following switching elements: a PIN diode, a RF transistor, a relay, a tube, a transistor, a phase delay circuit, a semiconductor, and the like. In addition, the means for attenuating may comprise a resistive element. The resistive element includes, for example, a phase delay circuit, a resistor, a signal transmission media, a resonant circuit, a dielectric waveguide, a waveguide, a cavity, a hybrid, stripline, coaxial cable, a waveguide with a ferrite phase shifter, a filter, and the like. Optimally, the tertiary phase shifter 42 is coupled to the means for splitting a signal 18 such that an impedance variation generated via the means for attenuating, of the tertiary variable phase shifter 42, is reflected back to the means for splitting a signal 18 as a high impedance. A high impedance or a low impedance is measured relative to the characteristic impedance of the transmission media or the RF source or receptor.

If a quaternary phase shifter 48 is used, the quaternary phase shifter is located in series, or in parallel, with the gamma transmission media 46. The quaternary phase shifter 48 is coupled to the means for splitting a signal 18 and at least one dipole element 12. The quaternary phase shifter 48 used in the complex array 56 may include, but need not include, means for attenuating. The means for attenuating may, but need not, constitute a high impedance produced by the open circuit of a switching element. Optimally, the quaternary phase shifter 48 coupled to the means for splitting a signal 18 such that an impedance variation generated via the means for attenuating, of the quaternary phase shifter 48, is reflected back to the means for splitting a signal 18 as a high impedance. A high impedance or a low impedance is measured relative to the characteristic impedance of the signal transmission media or the RF source or receptor. The tertiary phase shifter 42 and the quaternary phase shifter 48 can each generate a relatively high impedance at the means for splitting a signal 18 such that the primary array 52 can asynchronously produce cardioid patterns in two opposite directions.

All of the phase shifters, including the primary phase shifter 22, the secondary phase shifter 28, the tertiary phase shifter 42, and the quaternary phase shifter 48, can be physically aligned near, or located substantially adjacent to, the means for splitting a signal 18. In practice, all of the phase shifters can be housed in one common housing to reduce wind-loading on a tower, to reduce weight of the antenna, and to reduce distortion of the radiation patterns from mutual RF coupling of multiple phase shifter housings. A control transmission media 1112 or a communications interface 1202 couples the antenna control system 200 to each phase shifter. The control transmission media 1112 or the communications interface 1202 includes, for example, fiber optic cable or shielded wire to reduce possible effects of radio frequency interference. An antenna control system 200 which facilitates radio-frequency control of the phase shifters is also feasible.

Generating Various Radiation Patterns

Figure 4A:
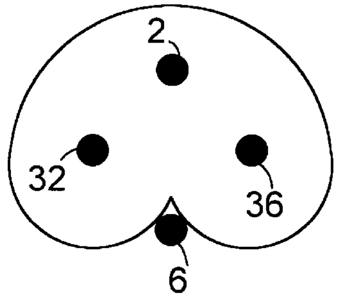
FIG. 4A illustrates a horizontal plane radiation pattern of a cardioid generated by the complex array where the first upper dipole element lags the second upper dipole element in phase.
Figure 4B:
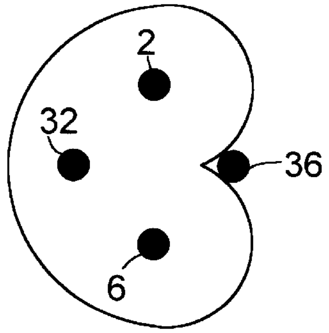
FIG. 4B illustrates a horizontal plane radiation pattern of a cardioid generated by the complex array where the third upper dipole element lags the fourth upper dipole element in phase.
Figure 4C:
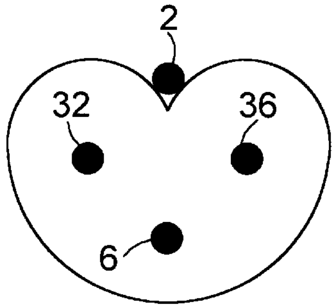
FIG. 4C illustrates a horizontal plane radiation pattern of a cardioid generated by the complex array where the second upper dipole element lags the first upper dipole element in phase.
Figure 4D:
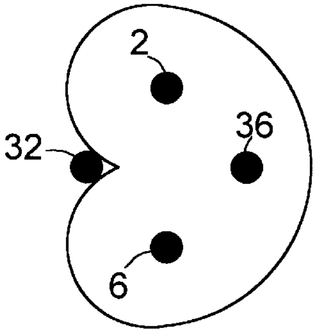
FIG. 4D illustrates a horizontal plane radiation pattern of a cardioid generated by the complex array where the fourth upper dipole element lags the third upper dipole element in phase.
Figure 4E:
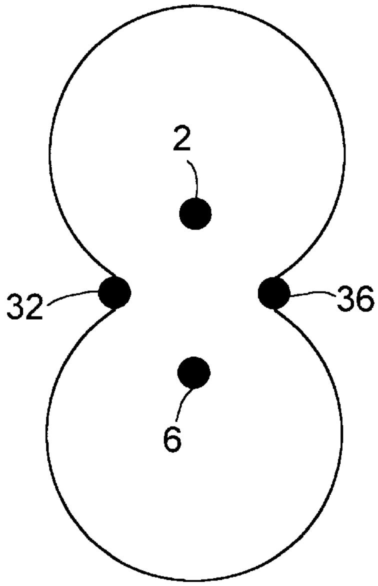
FIG. 4E illustrates a horizontal plane radiation pattern of a figure eight generated by the complex array where the first upper dipole element lags the second upper dipole element, the third upper dipole element, and the fourth upper dipole element in phase.
Figure 4F:
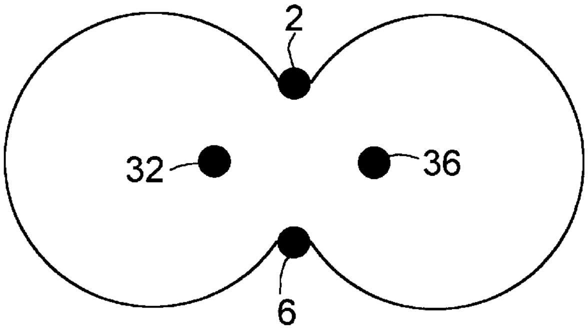
FIG. 4F illustrates a horizontal plane radiation pattern of a figure eight generated by the complex array where the third upper dipole element lags the first upper dipole element, the second upper dipole element, and the fourth upper dipole element in phase.

FIG. 4A through FIG. 4F inclusive provide illustrative examples of the horizontal plane radiation patterns produced by the complex array antenna 56, equipped with the primary phase shifter 22, the secondary phase shifter 28, the tertiary phase shifter 42, and the quaternary phase shifter 48. Note that FIG. 4A through FIG. 4F are not drawn to scale. The four dark circles in each of the figures represent a top view of the dipole elements 12 shown in FIG. 2B. The numbers on the dipole elements 12 in FIG. 4A through FIG. 4F correspond to numbers on the dipole elements 12 in FIG. 2B. The complex array antenna 56 is capable of asynchronously radiating cardioids in four orthogonal, horizontal directions as shown in FIG. 4A through FIG. 4D. The complex array antenna 56 can also radiate figure-eight patterns in two orthogonal directions as shown in FIG. 4E and FIG. 4F. Although not illustrated, the complex array 56 is capable of producing omnidirectional patterns with several discrete gain levels, and other complex radiation patterns.

The primary array 52 and the secondary array 54 are located in substantially, relatively perpendicular planes to generate orthogonal cardioid patterns. To produce a cardioid pattern, first, the primary array 52 or the secondary array 54 is substantially isolated by using two phase shifters selected from the group of the primary phase shifter 22, secondary phase shifter 28, tertiary phase shifter 42, and quaternary phase shifter 48. Specifically, the primary array 52 is substantially isolated, and inactivated, when the primary phase shifter 22 and the secondary phase shifter 28 create a high-impedance path via a plurality of means for attenuating. The high impedance path created by the means for attenuating substantially inhibits the traveling of electromagnetic energy, at the desired frequency of operation, from the means for splitting a signal 18 to the primary array 52. Likewise, the secondary array 54 is substantially isolated, and inactivated, when the tertiary phase shifter 42 and the quaternary phase shifter 48 create a high-impedance path via a plurality of means for attenuating. The high impedance path, created by the means for attenuating of the tertiary phase shifter 42 and the quaternary phase shifter 48, substantially inhibits the traveling of electromagnetic energy from the means for splitting a signal 18 to the secondary array 54.

Next, the primary array 52 or secondary array 54 which was not previously isolated has a phase shift introduced by one of the two phase shifters located on the non-isolated primary array 52 or non-isolated secondary array 54. Delaying one phase shifter by a fixed amount produces a cardioid with a peak signal in one direction, delaying the other phase shifter by a fixed amount produces a cardioid with a peak signal in the opposite direction.

For example, if the complex array 56 is aligned with approximately three-eighth wavelength primary horizontal spacing and if one dipole element 12 has a delay of approximately 45 degrees, then the peak radiation (i.e. main lobe) of the cardioid is directed toward the delayed dipole element 12. In FIG. 4A the first upper dipole element 2 is lagging in phase with respect to second upper dipole element 6. Meanwhile, the third upper dipole element 32 and the fourth upper dipole element 36 are substantially isolated from the primary array 52 at the means for splitting a signal 18. The cardioid patterns in FIG. 4B through FIG. 4D are achieved in a manner analogous to the pattern of FIG. 4A.

To produce figure-eight patterns in the horizontal plane, illustrated in FIG. 4E and FIG. 4F, numerous combinations of phase shifts can be utilized. For example, to produce the figure-eight pattern illustrated in FIG. 4E, the first upper dipole element 2 lags the second upper dipole element 6 by approximately 180 degrees, the first upper dipole element 2 lags the third upper dipole element 32 by approximately 180 degrees, and the first upper dipole element 2 lags the fourth upper dipole element 36 by approximately 180 degrees. To obtain the figure-eight patterns illustrated in FIG. 4F, the third upper dipole element 32 lags the fourth upper dipole element 36 by approximately 180 degrees, the third upper dipole element 32 lags the first upper dipole element 2 by approximately 180 degrees, and the third upper dipole element 32 lags the second upper dipole element 6 by approximately 180 degrees.

The vertical spacing between the primary array 52 and the secondary array 54 is preferably minimal so as to attain an in-phase relationship between the first array 52 and the second array 54 when the first array 52 and the second array 54 are used to generate overlapping figure-eight patterns. In other words, the vertical spacing between the first lower dipole element 4 and the third upper dipole element 32 may be any integer multiple, including zero, of one wavelength at the desired frequency of operation. Similarly, the vertical spacing between the second lower dipole element 8 and the fourth upper dipole element 36 may be any integer multiple, including zero, of one wavelength at the desired frequency of operation. Other spacing is acceptable depending upon the desired radiation patterns and depending upon the degree that the first array 52 and the second array 54 are operated independently as two separate antennas.

Alternate Complex Array

A variation of the complex array 56, designated as the alternate complex array, is shown in FIG. 2C. The alternate complex array includes dipole elements 12, signal transmission media, and one or more phase shifters.

The alternate complex array uses three or more dipole elements 12. As illustrated in FIG. 2C, the dipole elements 12 are arranged in a substantially triangular orientation when viewed from the top. Any one of the dipole elements 12 is preferably, substantially coplanar with respect to another single dipole element 12. Horizontal separations between the dipole elements 12 are defined by the lengths of the sides of the imaginary triangle formed by the dipole elements 12 when viewed from the perspective of FIG. 2C. The horizontal separations of the dipole elements 12 in the alternate complex array will range from approximately one-eighth wavelength to approximately one wavelength at the desired frequency of operation.

Other horizontal spacings between the dipole elements 12 may be appropriate. For example, horizontal spacings between dipole elements 12 are noncritical when one or more conductive reflectors (i.e. corner reflectors) are disposed about each dipole element 12. Noncritical means that the horizontal spacing may be virtually any value which is greater than approximately one-eighth wavelength at the desired frequency of operation.

The signal transmission media include an alpha transmission media 24, a beta transmission media 26, and a delta transmission media 44. Respective ones of the signal transmission media may be coupled to corresponding ones of the dipole elements 12. However, if the possible series orientation of the phase shifter with respect to the signal transmission media permits, then the signal transmission media may be optionally decoupled from either the dipole elements 12 or from the means for splitting a signal 18. The transmission media may be coupled to a radio frequency source or receptor via means for splitting a signal 18. One or more phase shifters are coupled to the means for splitting a signal 18. For example, referring to FIG. 2C, the primary phase shifter 22 is coupled in series, or in parallel, with the alpha transmission media 24.

Down-tilt Array

The down-tilt array 78 illustrated in FIG. 5 has the following principal elements: an upper array 58, a lower array 60, the signal transmission network 30, and means for processing a signal. As illustrated in FIG. 5, the means for processing a signal comprises a phase shifter, such as the primary phase shifter 22.

Upper Array (58)

The upper array has one or more dipole elements 12. At a minimum, the upper array 58 merely constitutes a first fed dipole element 66. The upper array 58 may be coupled to the signal transmission network 30.

As illustrated in FIG. 5, the upper array 58 is composed of a first beam-width narrowing dipole element 62, a first fed dipole element 66, and means for cascading. The first fed dipole element 66 may be configured as an end-fed arrangement (not shown) or as a center-fed arrangement (FIG. 5) with respect to the signal transmission network 30. The first beam-width narrowing dipole element 62 is in substantially vertical, coaxial alignment relative to the first fed dipole element 66. Vertical spacing between the dipole elements 12 may range from approximately zero to approximately one-quarter wavelength at the desired radio frequency of operation.

The first beam-width narrowing dipole element 62 is coupled to the first fed dipole element 66 via means for cascading. The means for cascading includes a first one-quarter wavelength stub 64 or an equivalent circuit such as a parallel resonant circuit.

The first one-quarter wavelength stub 64 has a shorted end 64S and a stub connecting end 64C. The stub connecting end 64C is attached to the dipole elements 12. The first quarter wavelength stub 64 is approximately an electrical one-quarter wavelength at the desired radio frequency of operation. The one-quarter wavelength stub 64 provides approximately one-half wavelength of phase delay so that the first beam-width narrowing dipole element 62 and a first fed dipole element 66 are being fed substantially in-phase.

Lower Array (60)

The lower array 60 has one or more dipole elements 12. At a minimum, the lower array 60 merely constitutes a second fed dipole element 70. The lower array 60 may be coupled to the signal transmission network 30.

As shown in FIG. 5, the lower array 60 is composed of a second beam-width narrowing dipole element 76, a second fed dipole element 70, and a means for cascading. The second beam-width narrowing dipole element 76 is in substantial vertical, coaxial, but non-coextensive, alignment relative to the second fed dipole element 70. Vertical spacing between the dipole elements 12 may range from zero to approximately one-quarter wavelength at the desired radio frequency of operation.

The second beam-width narrowing dipole element 76 is coupled to the second fed dipole element 70 through means for cascading. The means for cascading includes a second one-quarter wavelength stub 74 or an equivalent circuit such as a parallel resonant circuit.

The second one-quarter wavelength stub has a shorted end 74S and stub connecting end 74C. The stub connecting end 74C is attached to the dipole elements 12. The second one-quarter wavelength stub 74 is approximately an electrical one-quarter wavelength at the desired radio frequency of operation. The second one-quarter wavelength stub 74 may be constructed from a section of coaxial cable taking into account the velocity factor of the particular dielectric and manufacturing variations in the coaxial cable. The second one-quarter wavelength stub 74 provides approximately one-half wavelength of phase delay between the second beam-width narrowing dipole element 76 and second fed dipole element 70 so that the respective dipole elements 12 are fed substantially in phase.

Additional beam-width narrowing dipole elements may be cascaded in a vertical location relative to the existing dipole elements 12 by using additional means for cascading (i.e. one-quarter wavelength stubs). The addition of the vertically disposed dipole elements 12 will increase the peak gain of the vertical plane radiation pattern and narrow the half-power beam width in the vertical plane. The upper array 58 is vertically separated from the lower array 60 so that the signals induced in the upper array 58 and the lower array 60 are substantially additive. Consequently, the resultant radiation pattern of the down-tilt array 78 in the vertical plane is compressed compared to the individual vertical radiation patterns of the lower array 60 and the upper array 58.

Signal Transmission Network (30)

The signal transmission network 30 has an alpha transmission media 24, a beta transmission media 26, and a means for splitting a signal 18. The alpha transmission media 24 and the beta transmission media 26 may couple the lower array 60 and the upper array 58 to the means for splitting a signal 18. The electrical length of the alpha transmission media 24 plus the electrical length of the primary phase shifter 22 corresponds to the electrical length of the beta transmission media 26. Correspondence of the electrical lengths of the alpha transmission media 24, the beta transmission media 26, and the primary phase shifter 22 means that the electrical lengths of the alpha transmission media 24 and the beta transmission media 26 are related by a known relationship. The electrical lengths of the alpha transmission media 24 and the beta transmission media 26 are preferably related by an integer multiple of wavelengths at the desired radio frequency of operation. As a result, the relative phase of electromagnetic energy in the upper array 58 and the lower array 60 can be readily determined.

Phase Shifter

The down-tilt array 78 includes at least one phase shifter. The phase shifter is coupled to the means for splitting a signal 18 and at least one dipole element 12. In practice, the means for splitting a signal 18 and the phase shifter may be mounted in a common housing.

If the phase shifter is physically located in series with the alpha transmission media 24 as shown in FIG. 5, or in parallel with the alpha transmission media 24, then the phase shifter is referred to as a primary phase shifter 22. For example, a phase shifter which is directly, mechanically connected to the means for splitting a signal 18 and the alpha transmission media 24 is a primary phase shifter 22. Alternatively, a secondary phase shifter 28 is physically located in series with the beta transmission media 26, or in parallel with the beta transmission media 26. The secondary phase shifter 28 advances the phase of electromagnetic energy to produce down tilt. In contrast, the primary phase shifter 22 produces delays in the phase of electromagnetic energy to down tilt the beam in the vertical plane.

Generating Various Down-tilt Coverage Patterns

The primary phase shifter 22 retards the phase of the lower array 60 with respect to the upper array 58 to tilt the main lobe of the vertical beam downward. Down tilt limits the coverage area to a defined radius around the site of the antenna system or the base site equipment. In addition, down tilt may be used to increase the signal strength at a defined radius about the antenna system.

In practice, the degree of phase delay will depend upon the height above average terrain of the down-tilt array 78 and the desired coverage radius among other factors. The desired degree of down tilt is given by the following formula: Desired Degree of Down tilt=$90°-\tan^{-1}$ (desired coverage radius in meters/antenna height in meters). once the desired degree of down tilt is calculated the corresponding phase shift can be calculated graphically or mathematically.

The graphical method of calculating the desired phase shift is simpler than the mathematical method and is described below. First, one draws a radius from the center of the lower array 60 with a magnitude of X wavelengths at the desired frequency of operation. X may be any convenient integer number of wavelengths. Second, one draws a line from the center of the down-tilt array 78 at the desired degree of down tilt. Degrees down tilt are measured from a horizontal plane perpendicular and coextensive with the vertical center point of the down-tilt array 78. Next, one measures the distance, referred to as the distance of constructive interference, from the center of the upper array 58 to the intersection of said radius and said line. Finally, one subtracts X from the distance of constructive interference to obtain the resulting phase delay in wavelengths. For example, for a desired down tilt of approximately 7.5 degrees from the horizontal plane a phase lag of approximately 22.5 degrees is required by the primary phase shifter 22.

In practice, the down-tilt array 78 may utilize additional components such as impedance matching transformers, to match the antenna to the characteristic impedance of the transmission line from the radio frequency signal source or signal receptor. In addition, the down-tilt array 78 may include radomes (to protect the dipole elements from the atmospheric conditions) and baluns (to assure maximum radiation occurs from the dipole elements 12).

Phase Shifter

Various embodiments of the array antenna may include one or more phase shifters. For example, as previously described with regards to the general array 620, the means for processing a signal 616 may include, but need not include, a phase shifter. The phase shifter refers generically to the phase shifter, the primary phase shifter 22, the secondary phase shifter 28, the tertiary phase shifter 42, and/or the quaternary phase shifter 48. The prefixal adjectives, "primary, secondary, tertiary, and quaternary," refer to the respective location of the phase shifter on the complex array 56.

The phase shifter may comprise a commercially available phase shifter. In general, a commercially available phase shifter produces phase shifts by varying the propagation velocity of the radio frequency signal, by varying the propagation path length of the radio frequency signal, and/or by varying the frequency of the radio frequency signal. For example, a ferrite phase shifter typically produces phase shift by altering the propagation velocity of a radio frequency signal propagating along a waveguide, parallel plates, microstrip, or stripline.

Figure 6B:
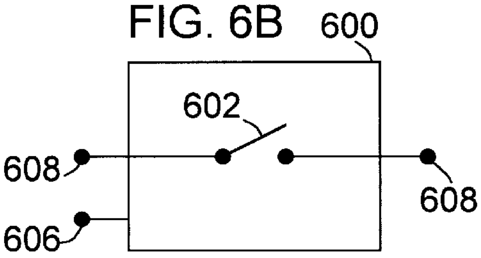
FIG. 6B through FIG. 6I, inclusive, show various embodiments of the means for processing a signal, wherein the means for processing a signal comprises means for attenuating.
Figure 6C:
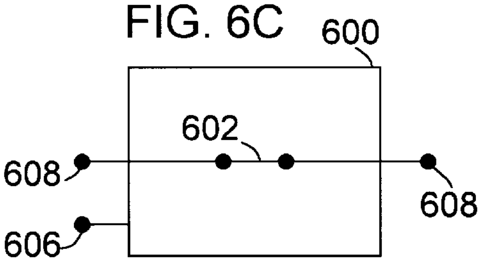
Figure 6D:
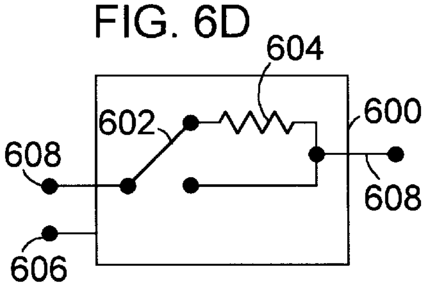
Figure 6E:
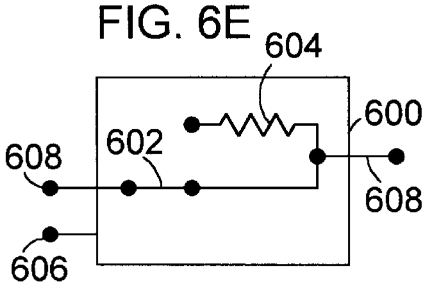
Figure 6F:
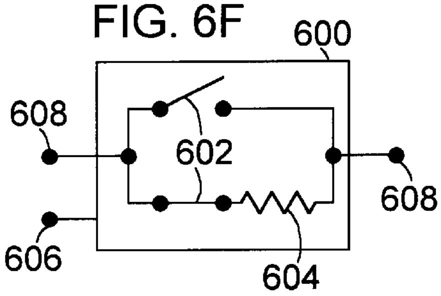
Figure 6G:
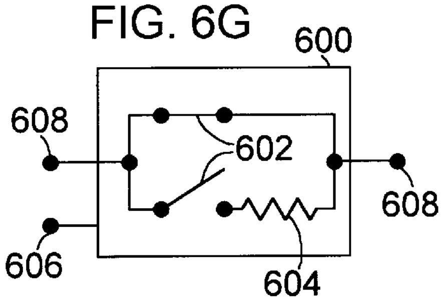
Figure 6H:
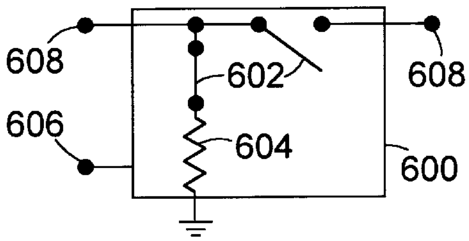
Figure 6I:
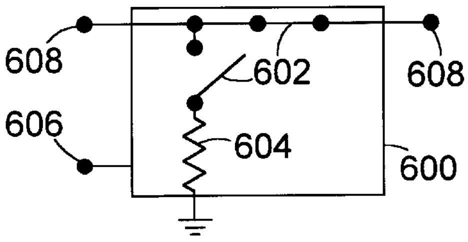
Figures 7A, 7B:
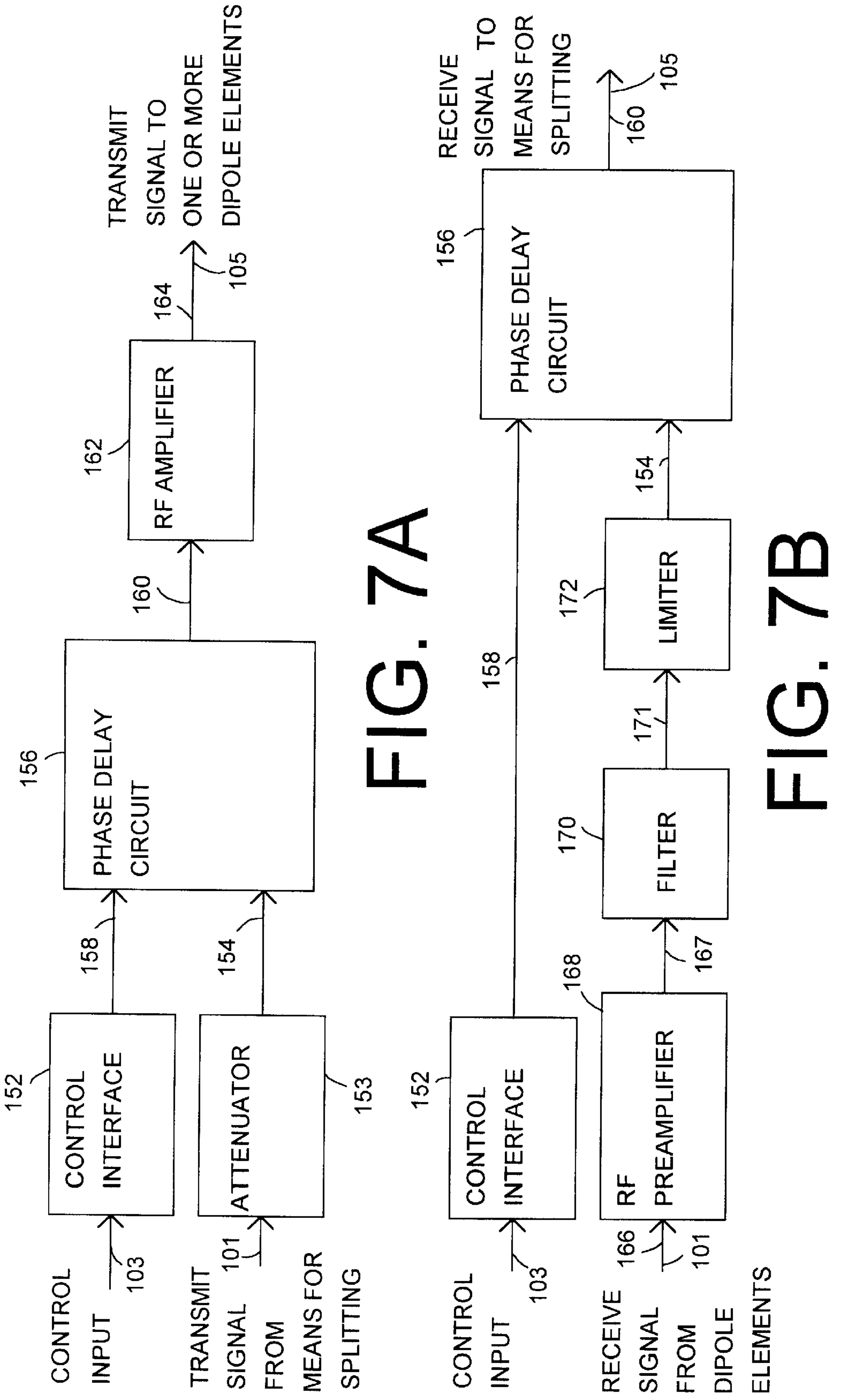
FIG. 7A is a block diagram of another embodiment of the means for processing a signal, wherein the means for processing a signal comprises a phase shifter which is suitable for transmitting applications.
FIG. 7B is a block diagram of another embodiment of the means for processing a signal, wherein the means for processing a signal is phase shifter which is suitable for receiving applications.
Figure 8:
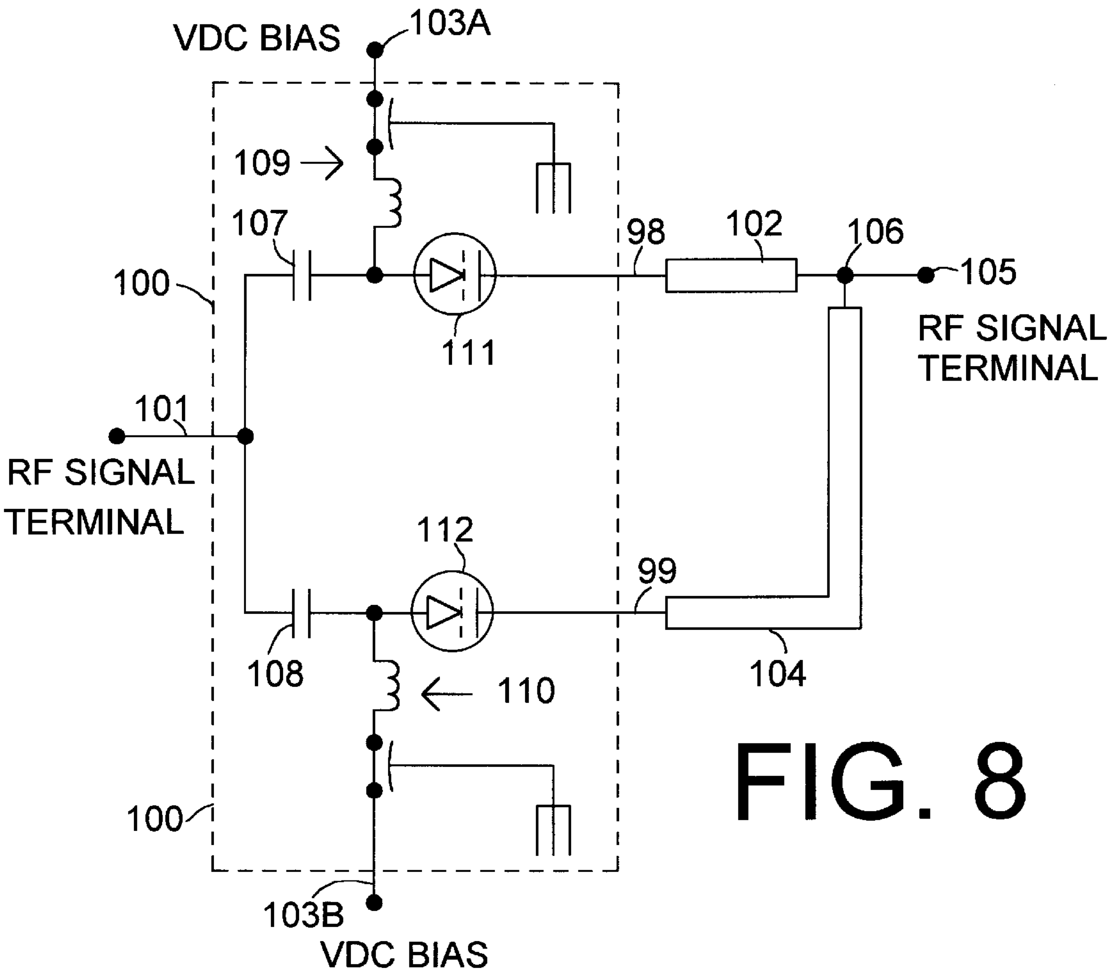
FIG. 8 shows illustrative details of the phase shifter depicted in FIG. 6A where the switching elements are PIN diodes and where the means for delaying phase are microstrip or stripline.
Figure 9:
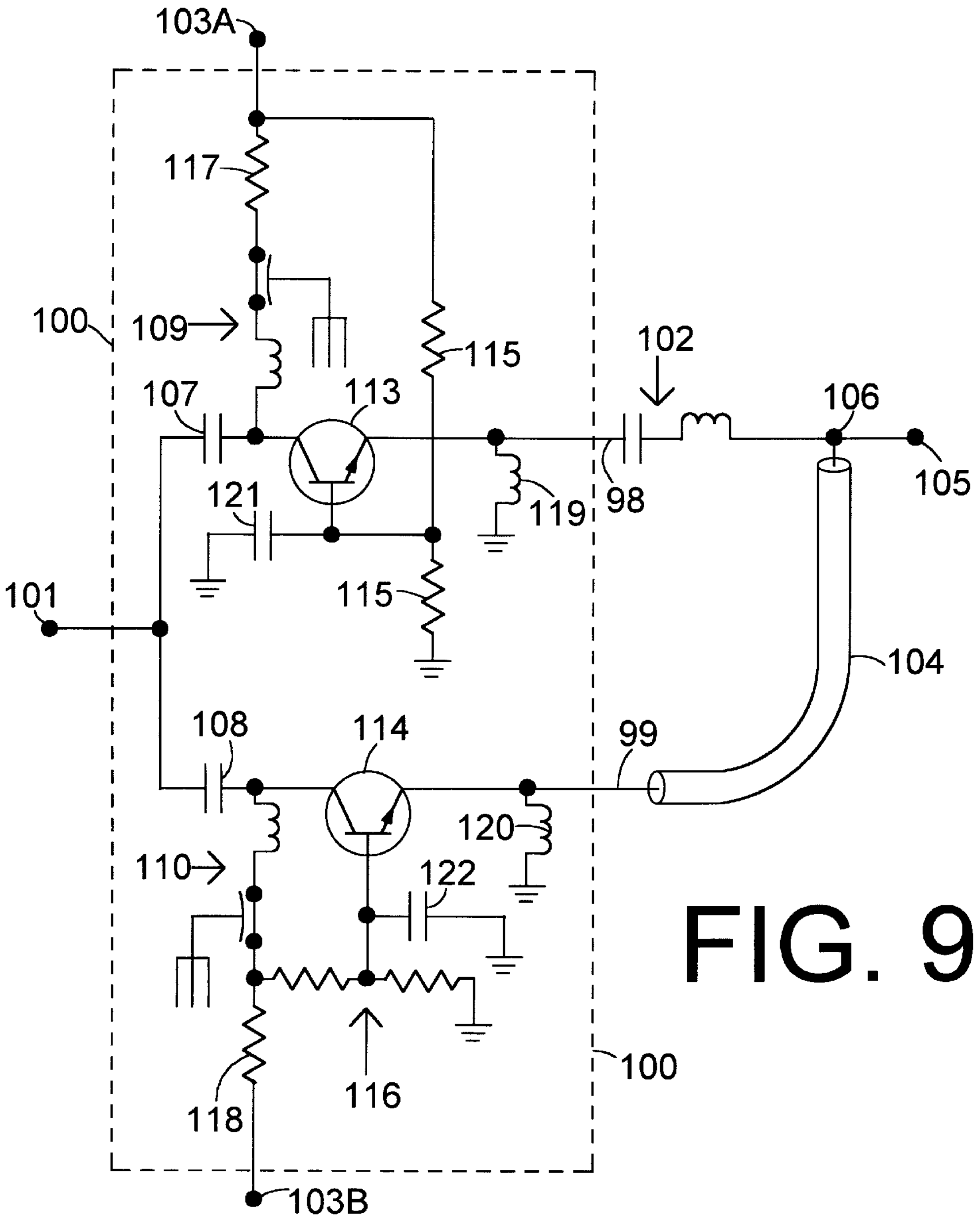
FIG. 9 shows illustrative details of the phase shifter depicted in FIG. 6A where the switching elements are RF power transistors and the means for delaying phase are coaxial cable and a series resonant circuit.
Figure 10:
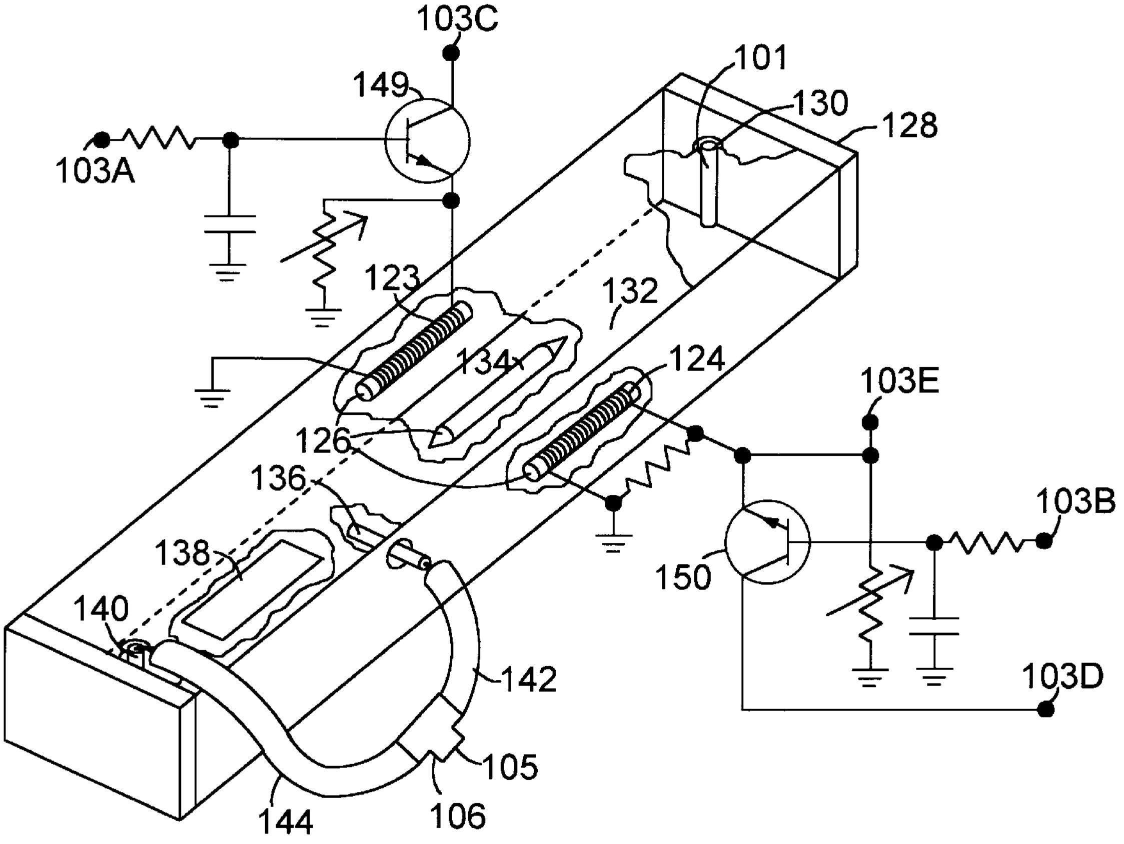
FIG. 10 illustrates a phase shifter using switching transistors, a ferrite polarizer, and a waveguide.

FIG. 6A, FIG. 7A and FIG. 7B illustrate alternative methods of delaying phase and/or advancing phase on a block diagram level. FIG. 6B through 6I, inclusive, illustrate various embodiments of the means for attenuating. FIG. 8 and FIG. 9 detail several variations in components for implementing the block diagram of FIG. 6A. Specifically, FIG. 8 illustrates the phase shifter with PIN diodes as switching elements and inherent means for attenuating. FIG. 9 illustrates the phase shifter with RF power transistors as switching elements and inherent means for attenuating. Finally, FIG. 10 illustrates the phase shifter utilizing a waveguide, ferrite polarizer, and switching transistors.

Referring to FIG. 6A, the main elements of the phase shifter are the phase selector switches 100, the first means for delaying phase 102, the Nth means for delaying phase 104, and the junction 106.

Phase Selector Switches (100)

The phase selector switches 100 in FIG. 6A encompass the following types of switching elements: relays (not shown), PIN diodes (111 and 112 in FIG. 8), RF power transistors (113 and 114 in FIG. 9), switching transistors, tubes, semiconductors, combinations of the foregoing devices, or the like. Where necessary, the phase selector switches 100 are supported appropriate DC biasing networks and RF isolation circuitry.

Note that the roles of the switching transistors (149 and 150 in FIG. 10) are contrasted from the relays, PIN diodes, and RF transistors because the switching transistors themselves do not conduct electromagnetic energy at the desired radio frequency. Rather, the combination of the first switching transistor 149, the second switching transistor 150, the ferrite polarizer 126, and the waveguide 132 may collectively function as "switching elements."

The phase selector switches 100 have a control input 103 which is responsive to a control signal. The phase selector switches 100 have a plurality of switching elements, including a first switching element and a Nth switching element. Each switching element has at least two switch terminals. For example, the first switching element has a first switch terminal 98A and first switch terminal 98B. Meanwhile, the second switching element has a second switch terminal 99A and a second switch terminal 99B. First switch terminal 98A and second switch terminal 99A couple each switching element to the RF signal terminal 101. In addition, the first switch terminal 98B couples the first switching element to the first means for delaying phase 102. The second switch terminal 99B couples the Nth (i.e. second) switching element to the Nth (i.e. second) means for delaying phase 104. That is, respective ones of switching elements are coupled to corresponding ones of means for delaying phase.

Means for Delaying Phase

The phase shifter has a plurality of means for delaying the phase. The total number in the plurality of the means for delaying phase is expressed as N. For simplicity, FIG. 6A shows the case where N equals two. In other words, FIG. 6A has a first means for delaying phase 102 and a second (i.e. Nth) means for delaying phase 104. The first means for delaying phase 102, the Nth means for delaying phase 104, and all other means for delaying phase, can be printed circuit traces (i.e. microstrip) as illustrated in FIG. 8, sections of coaxial cable as illustrated in FIG. 9, inductor-capacitor series resonant circuits as illustrated in FIG. 9, sections of waveguide analogous to the single waveguide illustrated in FIG. 10, semiconductors, tubes, hybrids, transformers, unbalanced transmission line, and/or variations of the foregoing. The total number N of means for delaying phase will generally depend upon the number of different radiation patterns desired and the number of dipole elements 12 being controlled.

Each means for delaying phase has at least one corresponding switching element located in the phase selector switches 100. When calculating the electrical length of each means for delaying phase an allowance may be necessary for the physical length of the circuitry encompassed by the phase selector switches 100.

Junction (106)

The junction 106 is the coupling between the first means for delaying phase 102 and the RF signal terminal 105, and/or the coupling between the Nth means for delaying phase 104 and the RF signal terminal 105. In addition, the junction 106 is the coupling between any other means for delaying phase and the RF signal terminal 105. The junction 106 should be kept as close as possible to the termination of each means for delaying phase. Note that several techniques for locating the junction 106 near the termination of each means for delaying phase are illustrated in FIG. 8 and FIG. 9. For example, referring to FIG. 8, if the first means for delaying phase 102 is approximately one-quarter wavelength, and an Nth means for delaying phase 104 of approximately one wavelength, the printed circuit traces are curved, or bent, to converge at junction 106. Similarly, as illustrated in FIG. 9, if the first means for delaying phase 102 is a series resonant circuit, which provides a phase delay of 90 degrees, and the Nth means for delaying phase 104 is a flexible coaxial cable which is approximately one-wavelength long, the flexible coaxial cable is bent to meet at termination of the series resonant circuit.

Means for Attenuating

As previously described with regards to the general array 620, the means for processing a signal 616 may include, but need not include, means for attenuating 600. FIG. 6B through FIG. 6I, inclusive, symbolically illustrate various embodiments of the means for attenuating 600. The phase shifters of FIG. 7 and FIG. 8 inherently have the means of attenuating illustrated in FIG. 6B and FIG. 6C. At a minimum, the means for attenuating 600 comprises a switching element 602. In addition, the means for attenuating 600 may comprise the combination of one or more switching elements 602 and a resistive element 604.

The means for attenuating 600 comprises, for example, one or more of the following switching elements: a reed switch, a contact switch, a PIN diode, a RF transistor, a relay, a switching transistor, a tube, a field-effect transistor, a metal-oxide-semiconductor transistor, a semiconductor, a phase delay circuit, and the like. In addition, the means for attenuating 600 may utilize, but need not utilize, one or more of the following resistive elements: a resistor, a signal transmission media, a resonant circuit, a cavity, a dielectric waveguide, a waveguide, stripline, microstrip, coaxial cable, unbalanced transmission line, twin lead, a waveguide with ferrite phase shifter, hybrid, a radio frequency signal processing system, and a filter.

The means for attenuating 600 has a control input 606 and RF signal terminals 608. The control input 606 is responsive to control signals from the antenna control system. Specifically, one or more switching elements 602 are controlled via the control input 606. Consequently, the switching element 602 is coupled to the control input 606. For example, if the switching element 602 is embodied as a PIN diode, then the switching element 602 is coupled to the control input 606 via a DC biasing network (not shown). The switching element 602 is coupled to the means for splitting a signal 18 through at least one RF signal terminal 608.

FIG. 6B through FIG. 6I, inclusive, illustrate various embodiments of the means for attenuating 600. In FIG. 6B, a high impedance at the RF signal terminals 608 is facilitated by the open circuit of a switching element 602. In contrast, referring to FIG. 6C, the closed circuit of a switching element 602 creates a low impedance at RF signal terminals 608. FIG. 6D and FIG. 6E illustrate the high impedance state and the low impedance state, respectively, of a means for attenuating 600 using a double pole, single throw type of switching element 602 and a resistive element 604. FIG. 6F and FIG. 6G substitute each sole double pole, single throw switching element 602 of FIG. 6D and FIG. 6E, with two switching elements 602. FIG. 6H shows a high impedance state achieved by two switching elements 602 and a resistive element 604. The resistive element 604 is in parallel with one RF signal terminal 608. In contrast, FIG. 6I shows the low impedance state at the RF signal terminal 608 achieved by the two switching elements 602. Where the means for attenuating 600 comprises multiple switching elements 602, for example, in FIG. 6F through FIG. 6I, the control input 606 may comprise multiple control terminals.

Phase Shifter with PIN Diodes as Switching Elements

FIG. 8 illustrates the phase selector switches 100 where PIN diodes are used for the switching elements. The number N of PIN diodes generally corresponds to the number N of means for delaying phase. PIN diodes and specifications of PIN diodes are available from Motorola Semiconductor Products, Inc. P.O. Box 20912, Phoenix, Ariz. 85036.

The phase shifter of FIG. 8 has inherent means for attenuating. The inherent means for attenuating of the phase shifter of FIG. 8 is analogous to the means of attenuating 600 shown in FIG. 6B and FIG. 6C. In particular, when the antenna control system applies no control signal at the control input 103, then both the first PIN diode 111 and the Nth PIN diode 112 are in off states. Consequently, a high impedance is present at RF signal terminals 101 and 105.

The phase shifter in FIG. 8 produces phase shifts in the following manner; the values of the components should be selected accordingly. In FIG. 8, the control input 103 includes a first input 103A and a Nth (i.e. second) input 103B. The antenna control system applies a control signal at first input 103A to select the first means for delaying phase 102. Alternatively, the antenna control system applies a control signal at Nth input 103B to select the Nth means for delaying phase 104.

The control signal will turn on either the first PIN diode 111 or the Nth PIN diode 112, but will not turn on both the first PIN diode 111 and the Nth PIN diode 112. If the control signal was applied to the first input 103A, then the first DC blocking capacitor 107 stops any DC voltage from turning on the Nth PIN diode 112 as well as the first PIN diode 111. If the control signal was applied to the Nth input 103B, then the Nth DC blocking capacitor 108 stops any DC voltage from turning on the first PIN diode 111 as well as the Nth PIN diode 112. Note that one of the DC blocking capacitors, selected from the first DC blocking capacitor 107 and the Nth DC blocking capacitor 108, is not absolutely necessary for proper operation. When operating near or at microwave frequencies the maximum value, of the first DC blocking capacitor 107 and the Nth DC blocking capacitor 108, is limited to a point beyond which the capacitor acts as an inductance. For example, at 900 MHz the individual values of the first DC blocking capacitor 107 and the Nth DC blocking capacitor 108 should typically be kept lower than 33 picofarads.

Meanwhile, the RF input signal is applied at RF signal terminal 101. If the first means for delaying phase 102 and the Nth means for delaying phase 104 are embodied as stripline, microstrip, coaxial cable, unbalanced transmission line, or the like, then appropriate ground connections (not shown) for the RF input signal are also made. To stop the RF signal from entering the antenna control system via first input 103A or second input 103B, the first RF signal isolating network 109 and the Nth RF signal isolating network 110 are used. Each RF isolating network has an inductor which provides a high reactance at the desired radio frequency of operation, and a capacitor (i.e. a feed-through capacitor). If a feed-through capacitor is used, the capacitor is grounded to an appropriate metal shield and the chassis of the phase shifter.

The first means for delaying phase 102 and the Nth means for delaying phase 104 can be constructed according to conventional stripline or microstrip techniques. The width of the etching and the relative spacing of the metallic cladding on one-side of the PC board to the metallic cladding on the other side of the PC board effect the characteristic impedance of the etching. Characteristic Impedance=377 $h/(e_r)^{0.5}*W[1+1.735\ e_r^{-0.0724}(W/h)^{-0.836}]$, where W=width of the microstrip etching, h thickness of the dielectric, and $e_r$ is the dielectric constant of the PC board. The geometry of the board and the dielectric constant also determine the required electrical length at the desired frequency (or wavelength) of operation. In particular, the electrical length may be determined by first multiplying the free-space wavelength by the ratio of the double-sided board thickness to the width of the stripline, and then by dividing the result by the dielectric constant of the board.

Phase Shifter With RF Power Transistors As Switching Elements

FIG. 9 illustrates the use of RF power transistors as switching elements in the phase selector switches 100. RF power transistors in the microwave region are frequently constructed of gallium arsenide semiconductor material and employ unique junction geometry to attain reliable operation at microwave frequencies. RF power transistors and specifications are available through Motorola Semiconductor Products, Inc., Box 20912, Phoenix, Ariz. 85036.

The phase shifter of FIG. 9 has inherent means for attenuating. The inherent means for attenuating of the phase shifter of FIG. 9 is analogous to the means of attenuating 600 shown in FIG. 6B and FIG. 6C. In particular, when the antenna control system applies no control signal at the control input 103, then both the first RF power transistor 113 and the Nth RF power transistor 114 are in off states. Consequently, a high impedance is present at RF signal terminals 101 and 105.

The phase shifter in FIG. 9 operates in the following manner and the values of the components should be selected accordingly. The antenna control system applies an appropriate voltage at the first input 103A to select the first means for delaying phase 102 or applies an appropriate voltage at the Nth input 103B to select the Nth means for delaying phase 104. The first DC blocking capacitor 107 and Nth DC blocking capacitor 108 prevent the application of a voltage at the first input 103A or the Nth input 103B from turning on both the first RF power transistor 113 and the Nth RF power transistor 114.

As depicted in FIG. 9, most microwave transistors are NPN devices. Consequently, the first RF power transistor 113 typically requires the application of a positive voltage at the first input 103A to turn on the first RF power transistor 113. Likewise, the Nth RF power transistor 114 typically requires the application of a positive voltage at the Nth input 103B to turn on the Nth RF power transistor 114.

The first voltage divider 115 or the Nth voltage divider 116 lowers the voltage applied to the first input 103A or the Nth input 103B, respectively, to an acceptable level for the first RF power transistor 113 or the second RF power transistor. Optimally, the base-emitter junction of the first RF power transistor 113 or the base-emitter junction of the second RF power transistor 114 is forward biased at 0.8 volts direct current (VDC). Note that the first voltage divider 115 could be eliminated if two different voltage levels are applied to the first RF power transistor 113. Analogously, the Nth voltage divider 116 could be eliminated if two different voltage levels are supplied to the Nth RF power transistor 114.

The applied voltage at the first input 103A or the Nth input 103B is dropped across a first current limiting resistor 117 or an Nth current limiting resistor 118. The first current limiting resistor 117 or the Nth current limiting resistor 118 primarily limit the direct current through the collector-emitter path of the first RF power transistor 113 or Nth RF power transistor 114, respectively, to acceptable levels.

The first feedback preventing capacitor 121 prevents RF feedback from causing the first RF power transistor 113 to oscillate. The Nth feedback preventing capacitor 122 prevents the Nth RF power transistor 114 from oscillating. Each feedback preventing capacitor should have a relatively low reactance at the desired radio frequency of operation.

As illustrated in FIG. 9, the first means for delaying phase 102 uses a series resonant inductor-capacitor circuit to delay phase by one-quarter wavelength (i.e. 90 degrees). The values of the inductor (L) and capacitor (C) are chosen to correspond to the following formula: Desired radio frequency of operation=$1/6.28((LC)^{1/2})$. One or more additional series resonant circuits may be cascaded with the existing series resonant circuit to increase the total phase delay. The Nth means for delaying phase 104 is shown in FIG. 9 as a coaxial cable. The coaxial cable must be cut to its electrical wavelength which is shorter than the free-space wavelength. The electrical wavelength is calculated by multiplying free-space wavelength by the velocity factor. The velocity factor primarily varies with the dielectric material used in transmission line and the physical dimensions of the transmission line. However, manufacturing variations in the consistency of the dielectric may cause seemingly identical transmission lines to have different velocity factors. Actual physical measurements of the transmission lines will yield the most accurate results.

Phase Shifter With Switching Transistors Ferrite Polarizer, and Waveguide

The phase shifter illustrated in FIG. 10 includes a first switching transistor 149, a second switching transistor 150, a ferrite polarizer 126, and a waveguide 132. The first switching transistor 149, the second switching transistor 150, and the ferrite polarizer 126 collectively shift the phase of a radio frequency signal in a waveguide 132. In practice, the phase shifter of FIG. 10 could be used for an antenna system configured for microwave frequencies, such as those frequencies allocated for PCS. The phase shifter illustrated in FIG. 10 is disclosed in greater detail in U.S. Pat. No. 5,440,278, entitled "Ferrite System For Modulating, Phase Shifting, or Attenuating Radio Frequency Energy." U.S. Pat. No. 5,440,278, invented by Darin Bartholomew, is incorporated herein by reference.

The phase shifter of FIG. 10 operates in the following manner. A radio frequency input signal is applied to the first coupling device 130. Alternatively, the removable waveguide cover 128 is removed and the radio frequency input signal is inputted at the open end of the waveguide 132 via additional sections of rigid or flexible waveguide. When the first switching transistor 149 and the second switching transistor 150 are off, then the phase of the output signal at the RF signal terminal 105 will depend primarily upon the distance traveled through the waveguide interior and the electrical length of the second transmission media 144. In the context of FIG. 10, the unique distance traversed by the radio frequency input signal in the waveguide 132 from the first coupling device 130 to the third coupling device 140 is referred to as the first means for delaying phase 102 (not labeled in FIG. 10).

When the first switching transistor 149 and the second switching transistor 150 are on, then the collector currents cause the ferrite polarizer 126 to rotate the radio frequency input signal by approximately 90 degrees in polarity. Now maximum coupling occurs at the second coupling device 136 such that the phase of the output signal depends primarily upon the distance traveled in the waveguide interior and the electrical length of the first transmission media 142. The unique distance traversed by the input radio frequency signal in the waveguide interior from the first coupling device 130 to the second coupling device 136 is referred to as the Nth means for delaying phase 104 (not labeled in FIG. 10). The vane attenuator 138 relatively causes any non-coupled and rotated input signal to be attenuated before reaching the third coupling device 140.

To activate the first switching transistor 149 and the second switching transistor 150, the antenna control system provides voltages simultaneously at the first input 103A and the second input 103B. Meanwhile, a shunt voltage regulator, a series voltage regulator, a zener diode voltage regulator, or any other generic voltage regulator (not shown) provides regulated voltages to the first collector terminal 103C and the second collector terminal 103D. The regulated voltages at first collector terminal 103C and the second collector terminal 103D are selected to provide the appropriate current in the first electromagnet windings 123 and the second electromagnetic windings 124 to induce a corresponding magnetic field to rotate the polarization of the radio frequency input signal by approximately 90 degrees. Numerous degrees of rotation, other than approximately 90 degrees, may be used depending upon the relative physical orientations of the first coupling device 130, the second coupling device 136, and the third coupling device 140.

Phase Shifters Using Phase Delay Circuits

FIG. 7A illustrates a phase shifter for transmitting signals from an array antenna. FIG. 7B illustrates a phase shifter for receiving from an array antenna. FIG. 7A and FIG. 7B can be used together in an array antenna for transmitting and receiving if the appropriate duplexers are used to join the arrangements in FIG. 7A and FIG. 7B. Duplexers may be constructed from resonant cavity filters or the like.

The advantage of the phase shifters described in FIG. 7A and FIG. 7B is that any degree on phase shift is possible with the phase delay circuit 156. However, note that some commercially available ferrite phase shifters can produce any degree of phase shift within a limited range. Other phase shifters may require a plurality of means for delaying phase, ranging from the first means for delaying phase 102 up to the Nth means for delaying phase 104. For example, one means for delaying phase was required for each desired degree of phase shift for the phase shifter disclosed in FIG. 8. The disadvantage in using the phase shifter embodied in FIG. 7A is that an RF amplifier 162 is a heavy and usually must be mounted on the antenna. Thus, in practice the phase shifter of FIG. 7A could be employed only where wind-loading and tower-loading permits. For example, the phase shifter of FIG. 7A is well-suited for urban areas where antennas are frequently located on buildings.

The main elements of the phase shifter for transmitting featured in FIG. 7A are a phase delay circuit 156, an attenuator 153, and a RF amplifier 162. The phase shifter of FIG. 7A may also include, but need not include, a control interface 152. The phase delay circuit 156 has a first circuit input 154, a second circuit input 158, and a circuit output 160. The first circuit input 154 is coupled to the attenuator 153. The attenuator 153 is coupled to the means for splitting a signal 18. During operation of the antenna system the attenuator 153 may receive a radio frequency signal from the radio frequency source. The circuit output 160 is coupled to the RF amplifier 162. The RF amplifier output 164 is operably coupled to at least one dipole element 12 of an array antenna.

The phase delay circuit 156 accepts the input of low level RF transmit signals at the first circuit input 154 and phase control currents at the second circuit input 158. The signal at the output 160 is an attenuated low level RF signal which is shifted in phase by a predetermined amount corresponding to the current and/or voltage at the second circuit input 158. In addition, the phase delay circuit 156 optionally has means for attenuating which enables the signal at the circuit output 160 to be attenuated.

The phase delay circuit 156 is available though AT&T Microelectronics, Dept. AL-500404200, 555 Union Boulevard, Allentown, Pa. 18103. The phase delay circuit 156 is currently available for conventional cellular and trunking frequencies in the 800 MHz and 900 MHz region, as AT&T part number 2121A Complex Vector Attenuator$_{TM}$. Higher frequency devices are available by special order. Note that AT&T calls the phase delay circuit 156 a "Complex Vector Attenuator"$_{TM}$. Typically, the phase delay circuit 156 should be operated at approximately 50 mw radio frequency input at the first circuit input 154. Thus, conventional transmitters, repeaters, and cellular base stations with RF power amplifiers cannot be used with the phase delay circuit without attenuator 153 or without reducing the RF output power through other procedures, known to one of ordinary skill in the art. The RF amplifier 162 takes the low level RF output signal at the circuit output 160 amplifies the signal to the desired output level. In practice, direct current from a ground location may be transferred to a tower-top location of the phase shifter via coaxial cable and appropriate RF blocking devices to provide any necessary direct current power.

The control interface 152 accepts analog signals, digital signals, logic level signals, pulses, or switch closures from the antenna control system and produces discrete levels of current required to control the degree of phase shift. The control interface 152 applies the discrete levels of current to the second circuit input 158.

For example, if the antenna control system provides a digital signals to the control interface 152, then, at a minimum, the control interface 152 is embodied by a D/A converter. In addition, the control interface 152 may include an operational amplifier, and/or a voltage divider. The D/A convertor generates analog voltage signals. Respective ones of the analog voltage signals are associated with corresponding ones of said digital signals. If necessary, one or more operational amplifiers and/or voltage dividers are used to change the respective ones of the analog voltage signals to the appropriate analog currents for input at the second circuit input 158.

The phase shifter in FIG. 7B is used for receiving radio frequency signals. The phase shifter featured in FIG. 7B includes an RF preamplifier 168, a limiter 172, and a phase delay circuit 156. The phase shifter in FIG. 7B may also include, but need not include, a filter 170 and a control interface 152. The RF preamplifier 168 has an RF preamplifier input 166 and an RF preamplifier output 167. The RF preamplifier input 166 is coupled to at least one dipole element 12. The RF preamplifier output 167 is coupled to the first circuit input 154. For example, as illustrated in FIG. 7B, the RF preamplifier output 167 is coupled to the first circuit input 154 via the intermediately located filter 170 and the limiter 172. RF preamplifiers 168 using MOSFET and gallium arsenide technology are commercially available through numerous suppliers. Receive signal levels may typically vary from −113 dBm to 30 dBm. While, the RF preamplifier 168 may provide any gain; in practice, the RF preamplifier 168 will typically provide a maximum gain of approximately 60 dB.

The RF preamplifier 168 is preferably coupled to the filter 170. The filter 170 may be physically located at the RF preamplifier input 166 or at the RF preamplifier output 167. Alternatively, the filter 170 is located at the RF preamplifier output 167 and an additional filter is located at the RF preamplifier input 166. The filter 170 can be used to remove off-frequency signals as well as harmonics generated by the RF preamplifier 168. The filter 170 includes filters selected from the group of band-pass filters, notch filters, low-pass filters, high-pass filters, and filters with complex frequency responses.

The RF preamplifier output 167 is coupled to the limiter input 171. The limiter 172 limits the magnitude of the receive signal at the first circuit input 154. The magnitude is limited to a level which will not damage the phase delay circuit 156 taking into account an allowance for component tolerances. The limiter 172 is coupled to the first circuit input 154.

The limiter 172 may be constructed in a manner analogous to the limiters used for commercial FM band (i.e. 88–108 MHz) receivers. Alternatively, a simple limiter 172 may be constructed from two RF diodes and a potentiometer placed in parallel with the RF signal. The two diodes are in parallel with respect to each other and the two diodes are placed in series with respect to said potentiometer. The anode of each diode should be attached the cathode of the other diode. The control interface 152 illustrated in FIG. 7B is analogous to the control interface previously described in FIG. 7A.

Antenna Control System

Figure 11:
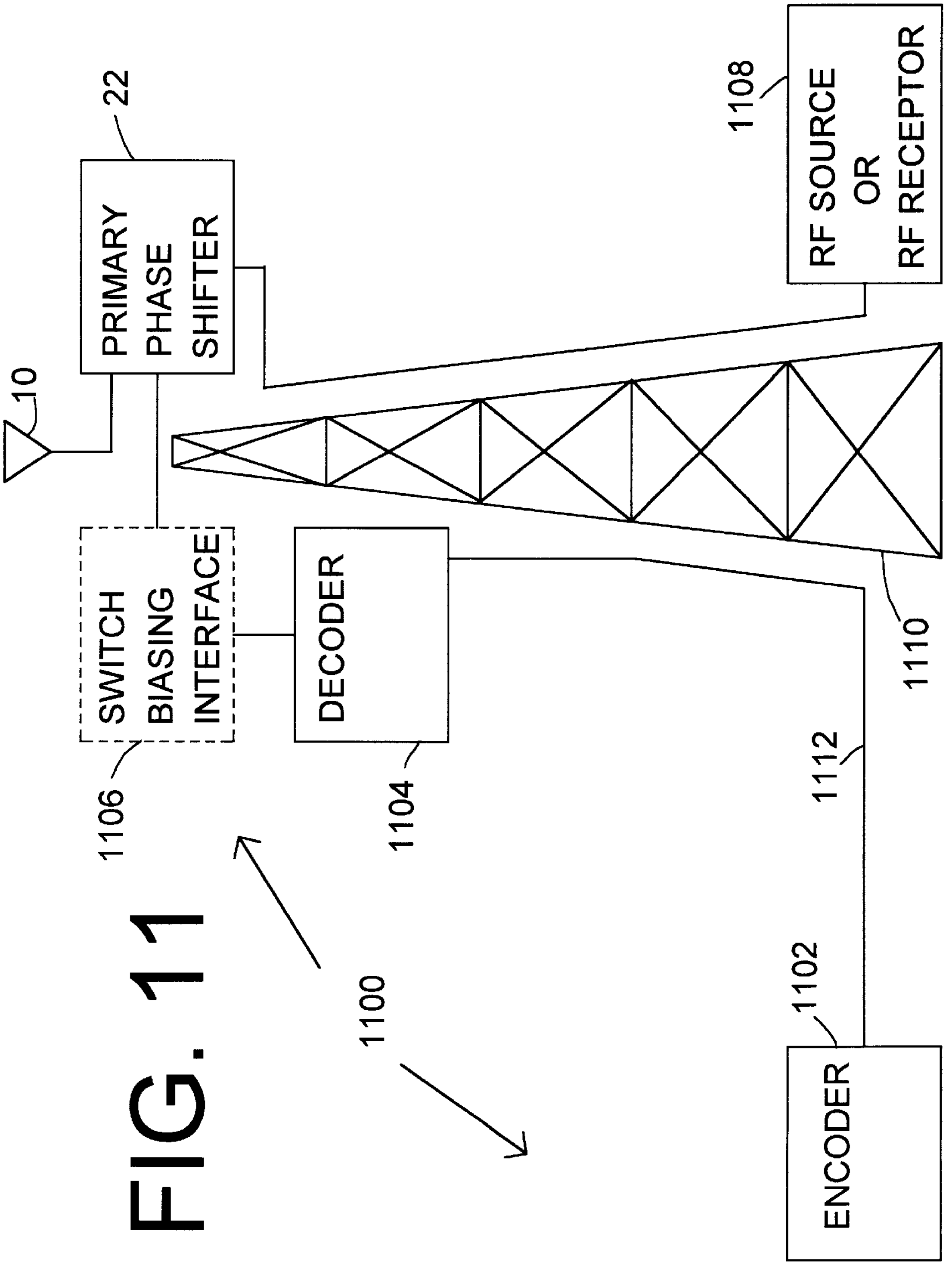
FIG. 11 is a block diagram of one embodiment of the antenna system which features a simple control system.
Figure 12:
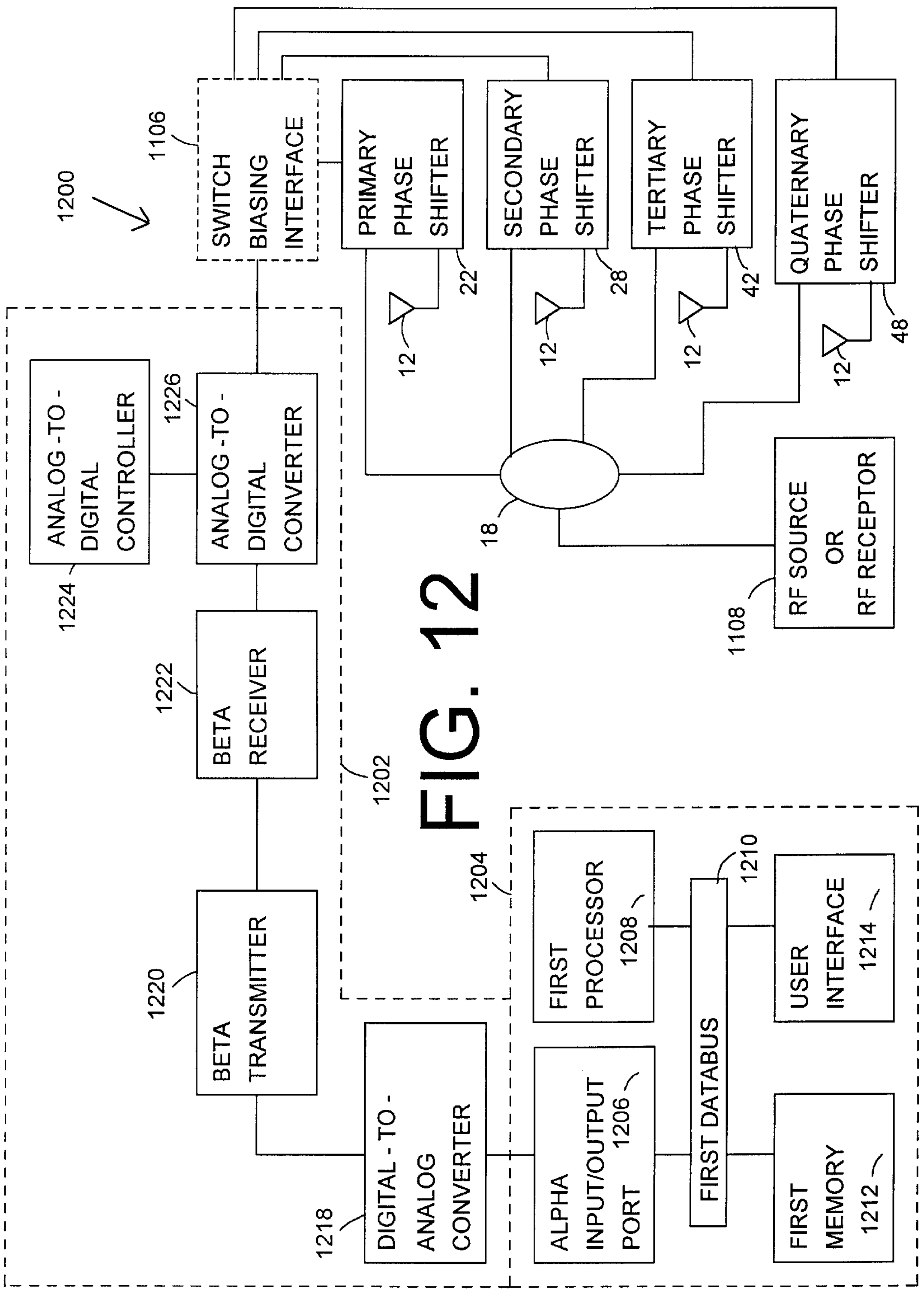
FIG. 12 is a block diagram of another embodiment of the antenna system which features a the complex control system and a complex array.
Figure 13:
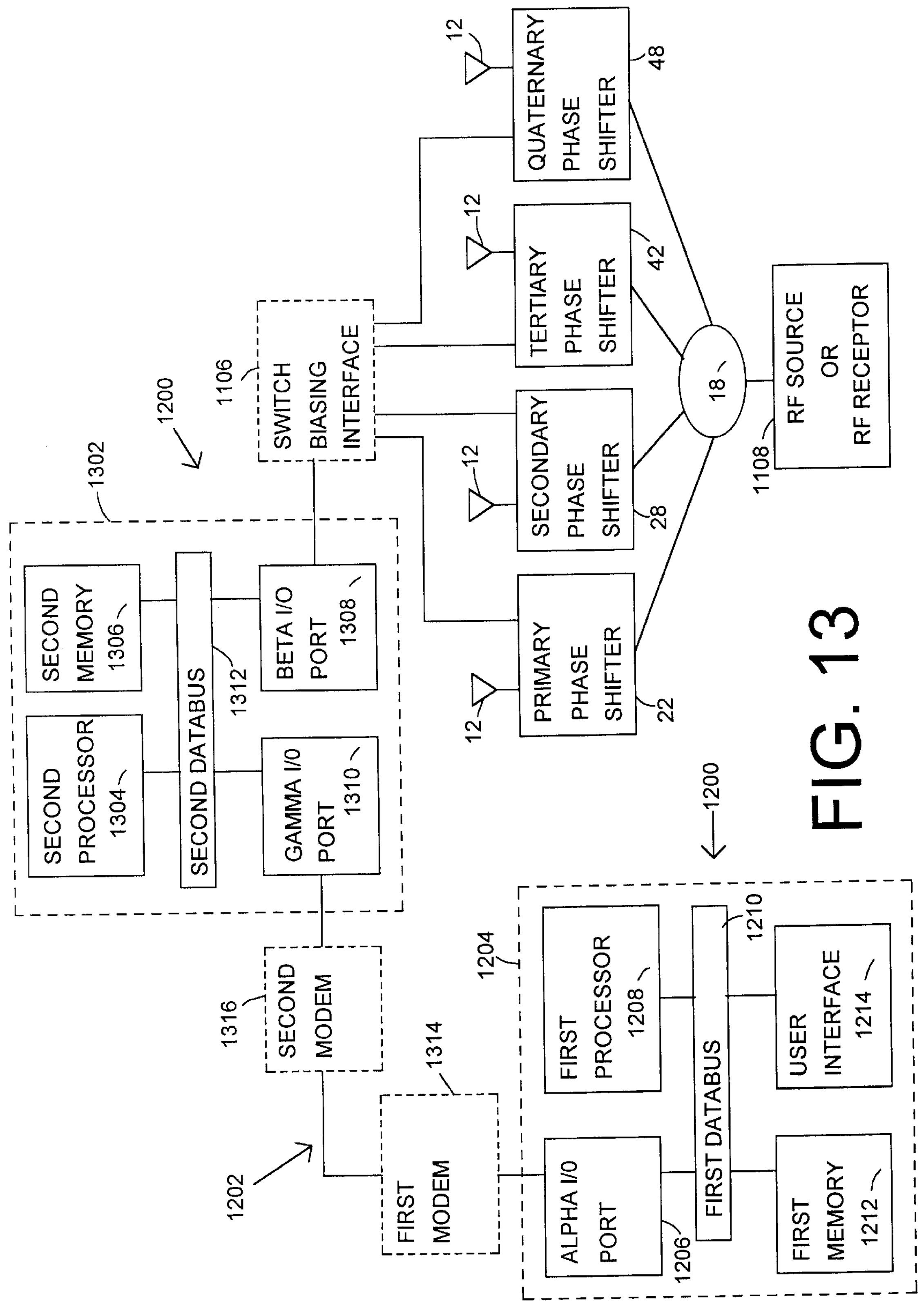
FIG. 13 is a block diagram of another embodiment of the antenna system which features an alternative complex control system and a complex array.

The antenna control system is designated a simple control system 1100, as illustrated in FIG. 11, or a complex control system 1200, as illustrated in FIG. 12 or FIG. 13. The simple control system 1100 allows the user to manually operate an encoder 1102, such as a dual-tone multiple frequency (DTMF) encoder, to remotely control the orientation of radiation patterns. The simple control system 1100 may include, but need not include, provisions for external inputs. Accordingly, one embodiment of the simple control system 1100 may accept external inputs to automatically operate an encoder 1102. External inputs includes data in the form of digital character strings, contact closures, ground closures, logic level changes, pulses, and the like. The simple control system 1100 can control the general array 620, simple array 10, the complex array 56, the alternate complex array, the down-tilt array 78, or variations of the foregoing arrays.

The complex control system 1200 permits the user to utilize an array antenna controller 1204, which includes a first processor 1208 and user interface 1214, to control the orientation of the radiation patterns. The complex control system 1200 permits the user to control the general array 620, the simple array 10, the complex array 56, the alternate complex array, the down-tilt array 78, or variations of the foregoing arrays.

Simple Control System

The main elements of the simple control system 1100 illustrated in FIG. 11 are the encoder 1102, the decoder 1104, and the control transmission media 1112. The simple control system 1100 may also include, but need not include, a switch biasing interface 1106 and an external input source.

Encoder (1102)

The encoder 1102 generates encoder signals in response to particular user inputs, such as the user pressing various push-button switches. The encoder 1102 optionally includes provisions for external inputs in the form of logic level signals, contact closures, ground closures, and the like. The encoder signal is a baseband signal, a modulated radio frequency carrier signal, a modulated light-wave frequency carrier signal, a pulsed signal, a direct current signal, or the like.

The encoder 1102 may be a commercially available DTMF encoder, a DTMF phone, a touch-tone phone, a pulse phone, single-tone encoder, DC encoder, laser, infrared frequency transmitter, optical frequency transmitter, a radio frequency transmitter having a DTMF encoder, or the like. Similarly, the corresponding decoder 1104 may be may commercially available decoder which is compatible with the encoder 1102. Suitable encoders 1102 and decoders 1104 are available through Cetec Vega, Dept. T, P.O. Box 5348, El Monte, Calif. 91734. A DTMF encoder typically generates a baseband signal modulated with tones composed of at least two frequencies in response to user input and/or, from an external input source. The single-tone decoder generates a tone of one frequency in response to user input and/or from an external input source. The DC encoder generates discrete levels of DC currents corresponding to user input or input from an external source.

Control Transmission Media (1112)

In practice, the encoder 1102 is located at a convenient site for the user, for example, a radio dispatcher's office or an equipment shelter at a cellular site, or at a cellular network engineer's office. In contrast, the decoder 1104 is located near an array antenna (i.e. simple array antenna 10) on the communications structure 1110. The communications structure 1110 is a tower, building, or other location where the array antenna is mounted. The encoder 1102 sends a control signal via the control transmission media 1112 to the decoder 1104.

The control transmission media 1112 is an unshielded twisted pair, a shielded multi-conductor cable, fiber-optic cable, coaxial cable, dedicated phone line, a public phone line, a plurality of radio frequency antennas, or the like. The control transmission media 1112 couples the encoder 1102 to the decoder 1104. In other words, if the control transmission media 1112 is optical cable, then the connection between the encoder 1102 and the decoder 1104 is an electromagnetic path through optical cable. Analogously, if the control transmission media 1112 is a plurality of antennas, an electromagnetic path through the intervening space between the two antennas may exist.

If the control transmission media 1112 includes public telephone lines or dedicated phone lines, then long distances between the location of the encoder 1102 and the decoder 1104 are readily facilitated. The portion of the control transmission media 1112, which is located near the communications structure 1110, is preferably selected to provide immunity from interfering RF signals which might cause noise and distortion of the encoder signals. Fiber-optic cable provides superior isolation from interfering RF signals to unshielded or shielded multi-conductor cable.

Decoder (1104)

The decoder 1104 provides control signals in the form of contact closures, switch closures, pulses or logic level signals in response to particular, predefined encoder signals generated by the encoder 1102. For example, if the decoder 1104 receives predefined encoder signals, which are tones of certain frequency and duration, then in response the decoder 1104 may generate a latched logic level signal. The latched logic level signal will remain latched until a reset signal is present at the decoder 1104 or until the user uses the encoder 1102 to send a new encoder signal.

As an illustrative example of the simple control system 1100, a touch-tone phone may be used as an encoder 1102. Means for detecting a ringing signal may be utilized in conjunction with the decoder 1104 to facilitate operation with the touch-tone phone. Because touch-tone phones are pervasive in the present public telephone system, the user may conveniently modify radiation patterns by first establishing a control transmission media 1112 via the public network, and then by inputting appropriate tones via a touch-tone key pad.

The user dials the decoder 1104 using the public telephone network. The decoder 1104 preferably is coupled to means for detecting a ringing signal. The means for detecting a ringing signal may constitute, for example, a DC blocking capacitor and a rectifier. The DC blocking capacitor is coupled to a telephone line and a rectifier (i.e. diode) is coupled to the DC capacitor. The output of the means for detecting a ringing signal may be coupled to the input of a comparator. The comparator generates a logic level output, switch closure, or the like which takes the telephone line off-hook (i.e. answers the telephone line) at the location of the decoder 1104. Once the telephone line is answered, the user has established a control transmission media 1112 between the encoder 1102 and the decoder 1104 via the telephone line and switching equipment of the public telephone system.

The user would then input an alphanumerical name, numerical name, verbal name, or code to modify the present radiation pattern of the antenna system. The decoder 1104 generates control signals, with the appropriate logic levels, in response to the user inputting an alphanumerical name, numerical name, verbal name, or code for the desired radiation pattern. For example, to produce a cardioid facing East, the user could type in the characters "E", "A", "S","T" on the DTMF key pad of the encoder 1102. The array antenna must be oriented appropriately at the time of installation such so that the verbal commands or numerical commands correspond to the correct antenna radiation pattern.

Switch Biasing Interface (1106)

The switch biasing interface 1106 is present where the decoder 1104 cannot directly interface with one or more phase shifters (i.e. primary phase shifter 22). The switch biasing interface 1106 accepts various control signals from the decoder 1104, which can be a ground closure, a contact closure, a logic level, pulses, or switch activity, or the like. The switch biasing interface 1106 converts the output of the decoder 1104 to suitable voltages and/or currents for the control input 103 of a phase shifter or means for processing a signal. For example, the switch biasing interface 1106 may convert the output of the decoder 1104 to suitable voltages and/or currents for biasing, or turning on, switching elements in the phase selector switches 100. The switch biasing interface 1106 optionally includes a data latch for converting a transient encoder signal (or output of the array antenna controller 1204) to a latched output. The switch biasing interface 1106 is coupled to at least one phase shifter at control input 103, or to at least one means for processing a signal 616 at control input 606.

The switch biasing interface 1106 preferably includes operational amplifiers to achieve the correct biasing from the control signals (i.e. TTL levels) generated by the decoder 1104. For example, operational amplifiers can be configured as a non-inverting amplifier to increase the applied voltage to the control inputs 103 of one or more phase shifters. In addition, the operational amplifier can be used as a unity-follower, even where the control signal (i.e. TTL voltage) is the correct biasing voltage, to buffer the control input 103 from the antenna control system.

Complex Antenna Control System

The complex control system 1200 has an array antenna controller 1204 and a communications interface 1202. The array antenna controller 1204 is a processor system configured with a user interface 1214. One embodiment of the hardware requirements for the complex control system 1200 are illustrated in FIG. 12. FIG. 13 illustrates an alternative embodiment of hardware requirements for the complex control system 1200. An illustrative example of the software programming requirements for the complex control system 1200 are presented in the flow chart of FIG. 14.

Array Antenna Controller (1204)

Referring to FIG. 12, the array antenna controller 1204 has a first processor 1208, a first memory 1212, a first databus 1210, an alpha input/output (I/O) port 1206, and a user interface 1214. The first processor 1208 is a processor (i.e microprocessor) which communicates to the first memory 1212, the user interface 1214 and the alpha input/output port 1206 via the first databus 1210. The first memory 1212 is any type of memory including a dynamic random access memory, a static random access memory, a cache memory, an optical storage media, a magnetic storage media, a hard disk, an optical disk, a read only memory, or the like.

The alpha input/output port 1206 is an input/output port which supports the serial or parallel transfer of data. Thus, the alpha input/output port 1206 refers to a serial or parallel input/output port. If the alpha input/output port 1206 is a serial input/output port, then the alpha input/output port 1206 may conform to RS-232 standards. The alpha input/output port 1206 may be omitted if the communications interface 1202 is coupled immediately to the first databus 1210.

The alpha input/output port 1206 may be implemented, for example, through the use of a universal asynchronous receiver transmitter (UART) circuit. Generally, a UART circuit interfaces with the parallel data on the first data bus 1210 to transfer the data into serial form or from serial form. Commercially available UART circuits are typically circuits which also support the framing of serial data, error detection, and handshake signals. The user interface 1214 supports a graphical user interface and/or a line-command interface. A graphical user interface allows user to interact with the first processor 1208 by representing processes and objects as visual symbols on a display. In contrast, a line-command interface allows the user to interact with the first processor 1208 by inputting verbal, numerical, or alphanumerical commands on a key board.

While the array antenna controller 1204 could be virtually any general purpose computer, a personal computer capable of executing Microsoft$_R$ Windows$_{TM}$ is preferred. The array controller 1204 could also constitute a general purpose computer capable of operating in other graphical environments, for example, X-Windows$_{TM}$, developed by the Massachusetts Institute of Technology, Cambridge, Mass.

Communications Interface (1202)

Referring to FIG. 12, the communications interface 1202 couples the array antenna controller 1204 to one or more phase shifters. In particular, the communications interface 1202 may be a multi-conductor cable (not shown) for short distances of less than 100 feet between the array antenna controller 1204 and the array antenna. For any distance between the array antenna controller 1204 and the array antenna, the communications interface 1202 may constitute a D/A converter 1218, a beta transmitter 1220, a beta receiver 1222, an A/D converter 1226, and an A/D controller 1224, as illustrated in FIG. 12.

The D/A converter 1218 is coupled to the alpha input/output port 1206. The D/A converter 1218 accepts a digital word from the alpha input/output port 1206 and converts the digital word to a corresponding analog voltage or current. The D/A converter 1218 may be any commercially available D/A converter 1218, for example, an integrating D/A converter, a dynamic element matching D/A converter, or the like. The beta transmitter 1220 accepts the analog output of the D/A converter 1218. The beta transmitter 1220 modulates an electromagnetic carrier in accordance with the analog output of the D/A converter 1218. For example, the beta transmitter 1220 modulates an infrared frequency carrier with amplitude modulation that varies according to the voltage amplitude at the output of the D/A converter 1218. The beta transmitter 1220 is coupled to the beta receiver 1222. For instance, the beta transmitter 1220 is coupled to the beta receiver 1222 via free space or via fiber optic cable.

The beta receiver 1222 receives the modulated signal from the beta transmitter 1220 and demodulates the signal to produce an analog voltage or current which is proportional to the current or voltage at the output of the D/A converter 1218. Next, the A/D converter 1226 accepts the demodulated analog output of the beta receiver 1222 to produce a corresponding digital word.

The A/D converter 1226 is any commercially available A/D converter, such as the well-known successive approximation analog to digital converter. The A/D converter 1226 is coupled to the A/D controller 1224 which provides a clock, regulated voltage, control logic, buffers, or any additional circuitry that supports the proper operation of the A/D converter 1226. The A/D converter 1226 is preferably coupled to the switch biasing interface 1106. The A/D convertor 1226 is immediately coupled to one or more phase shifters where the switch biasing interface 1106 is not critical in adjusting the digital output of the A/D converter. Alternatively, the A/D converter of the communications interface 1202 could be coupled to the gamma input/output port 1310 of the communications controller 1302.

Alternate Complex Control System

The alternative embodiment of the hardware configuration for the antenna control system is illustrated in FIG. 13. The alternate complex control system of FIG. 13 has a communications controller 1302, a communications interface 1202 and a array antenna controller 1204.

Array Antenna Controller (1204)

The hardware of the array antenna controller 1204 in FIG. 13 is identical to the hardware of the array antenna controller 1204 featured in FIG. 12. However, the software used to control the array antenna controller 1204 in conjunction with the communications controller 1302, as depicted in FIG. 13, can be more complex than the software used to control the array antenna controller 1204 alone, as depicted in FIG. 12.

Communications Controller (1302)

The communications controller 1302 has a second processor 1304, a second memory 1306, a beta input/output (I/O) port 1308, and a gamma input/output (I/O) port 1310. The communications controller 1302 is located near the array antenna. Consequently, the communications controller 1302 is preferably protected by an enclosure suitable for withstanding the elements and suitable for mounting upon a communications tower. The second processor 1304 communicates to the second memory 1306, the beta input/output port 1308, and the gamma input/output port 1310 through the second databus 1312. The architecture of the communications controller 1302 can be substituted for the architecture of a general purpose computer such as a personal computer.

Communications Interface (1202)

The communications interface 1202 can take several forms. If the distance between the alpha input/output port 1206 and the gamma input/output port 1310 is shorter than approximately 100 feet, then the alpha input/output port 1206 and the gamma input/output port 1310 are electrically connected by using a null-modem cable (not shown). In other words, the communications interface 1202 is embodied by a null-modem cable. For any distance between the alpha input/output port 1206 and the gamma input/output port 1310, the communications interface 1202 may include a first modem 1314 and a second modem 1316 as shown in FIG. 13. The first modem 1314 and the second modem 1316 couple the alpha input/output port 1206 to the gamma input/output port 1310.

The first modem 1314 and the second modem 1316 are commercially available devices which allow the array antenna controller 1204 to communicate to the communications controller 1302 via telephone lines or radio frequency transmissions. The first modem 1314 accepts various signals, such as direct current signals, logic level signals, pulses, digital words, alternating current signals, or the like, from the alpha input/output port 1206 of array antenna controller 1204. The first modem 1314 converts a signal into modulated signals suitable for reception and transmission over public or private telephone lines. The second modem 1316 demodulates the modulated signal generated by the first modem 1314 and converts the modulated signal into logic levels suitable for interfacing the communications controller 1302 as show in FIG. 13. The first modem 1314 and the second modem 1316 preferably provide, but need not provide, bi-directional, full-duplex communications between the array antenna controller 1204 and the communications controller 1302.

The communications controller 1302 can be programmed to control the second modem 1316 with commercially available communications software. Additional, optional software features, concerning data storage and retrieval and redundancy, could be added to communications software.

In particular, optional data storage and retrieval features of the antenna system are realized by utilizing an array antenna database. The status of the current and past antenna patterns is preferably stored in the array antenna database. The array antenna database preferably automatically annotates each user selection of antenna radiation patterns, and automatic selection of antenna radiation patterns by external inputs, with concurrent time-stamps. The array antenna database could also permit manual annotation of the selection of the radiation pattern. The communications controller 1302 is preferably programmed to provide the status of current radiation patterns settings and/or past radiation pattern settings upon query of the array antenna database by the user from the array antenna controller 1204.

The communications controller 1302 may be programmed, but need not be programmed, to offer redundancy with respect to the array controller 1204 such that the antenna system will remain in a status quo pattern upon failure of the communications interface 1202 or upon failure of the array antenna controller 1204.

The communications controller 1302 could be instructed, but need not be instructed, to accept processing tasks from the array antenna controller 1204 to increase the available processing time for the array antenna controller 1204. Consequently, the array antenna controller 1204 and the communications controller 1302 could be used collectively to process external input data in real time. Real time signifies, for example, that the processing time of the communications controller 1302 and/or the processing time of the array antenna controller 1204 is substantially imperceptible to mobile radio users and/or users of the array antenna controller 1204. External input data includes data supplied from a trunking base station controller, a cellular base station controller, a mobile services switching center, a location determining receiver, and a signal quality determining receiver among other data sources.

General Program for the Antenna Control System

The antenna control system as illustrated in FIG. 12 includes a first processor 1208. The antenna control system as illustrated in FIG. 13 has a first processor 1208 and a second processor 1304. The general program 1400 shown in FIG. 14 merely illustrates one possible approach for providing the first processor 1208 and/or the second processor 1304 with appropriate instructions. In practice, the general program 1400 may vary depending upon the type of communications system (i.e. cellular communications system versus trunking communication system), whether or not a communications controller 1302 is present, and whether the list of antenna patterns is verbally displayed or graphically displayed via the user interface 1214.

Figure 14:
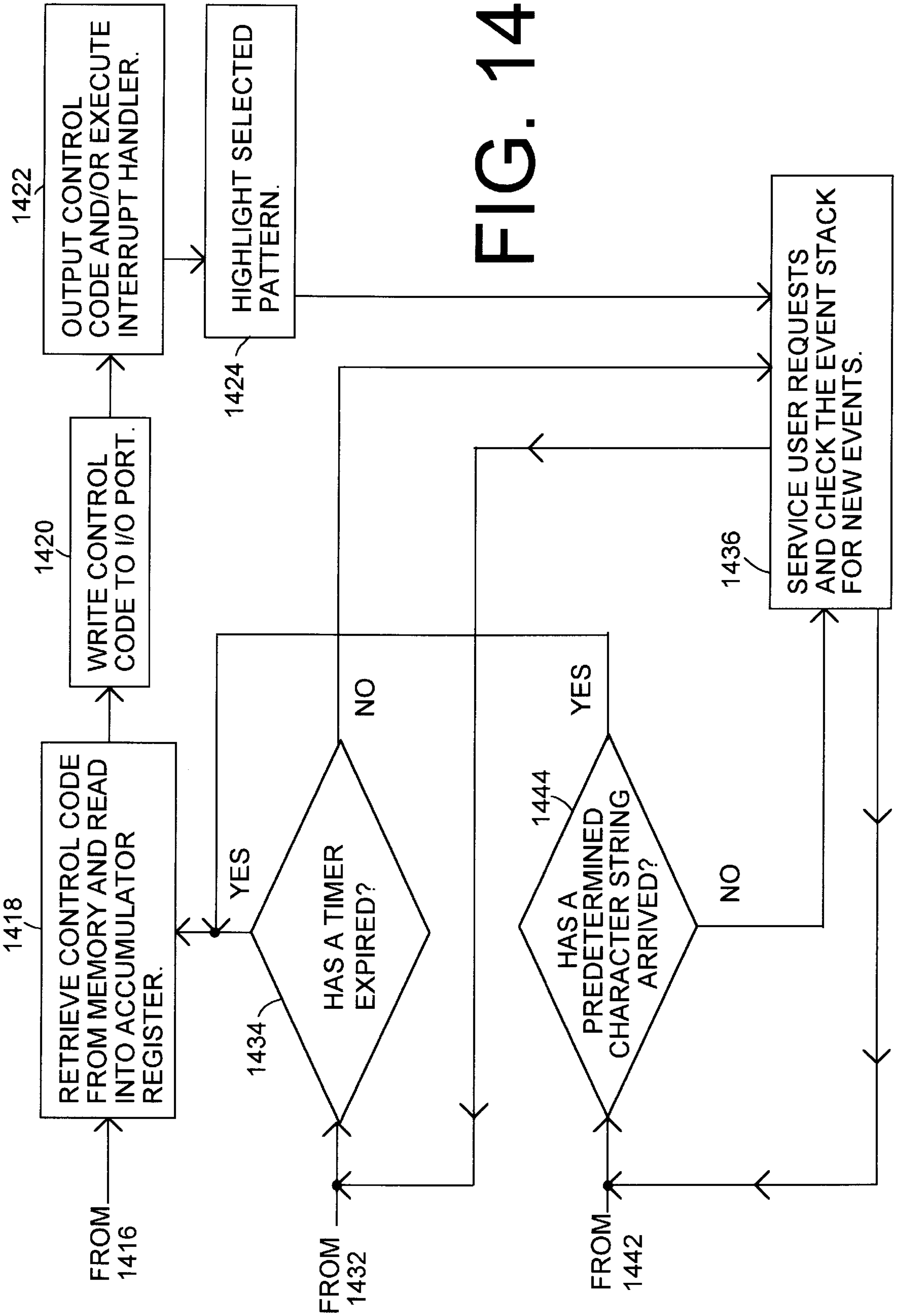
FIG. 14 is a block diagram of one embodiment the general program for the complex control system where the general program is configured for a windowing operating environment.

As illustrated in FIG. 14, the general program 1400 is primarily configured for operation in a graphical environment (i.e. windowing environment). However, the general program 1400 is easily modified for operation in non-graphical, command-line interface environments such as Disk Operating Systems (DOS) or UNIX operating systems. The general program 1400 is modified for a command-line interface by substituting mouse and button presses with direct commands. Current windowing programs differ in features such that general program 1400 illustrated in FIG. 14 may differ from one windowing program to another windowing program. In particular, the programmer is able to define unique events in the X-Windows$_{TM}$ environment such as the events defined in block 1440. However, the definition of events in block 1440 may not be supported at the present time by certain windowing programs.

In general, windowing programs generate events. Events are a record created by the windowing program in response to the users input or input from an application program. Examples of events include: events corresponding to pressing or releasing a keyboard key, activating a window, updating a window or pressing a mouse button. Most windowing programs store the events in a stack. Events have various fields of information which correspond to the particular events. For example, when a mouse button is pressed a field identifies the coordinates of the mouse pointer with reference to a particular window. A window is a work or display area in a graphical user interface that responds to distinct user inputs.

The general program 1400 illustrated in FIG. 14 may be used for a trunking system, a paging system, a conventional repeater system, a point-to-multipoint data system, a cellular system, or other communications systems. The general program 1400 has four main routines, or four main components: I) user selection of horizontal plane radiation patterns, II) user selection of vertical plane radiation patterns, III) user selection of times to automatically change radiation patterns, and IV) user selection of respective mobile radio users (MRU) with corresponding radiation patterns. I) User selection of horizontal plane radiation patterns is generally illustrated in blocks 1404, 1412, 1413, 1414, 1416, 1418, 1420, 1422, and 1424. II) User selection of vertical plane radiation patterns is generally illustrated in blocks 1406, 1426, 1413, 1414, 1416, 1418, 1420, 1422, and 1424. III) User selection of times to automatically change radiation patterns is illustrated in blocks 1408, 1428, 1430, 1432, 1434, 1436, 1418, 1420, 1422, 1424. IV) User selection of respective mobile radio users (MRU) with corresponding specific radiation patterns is illustrated in blocks 1410, 1438, 1440, 1442, 1444, 1436, 1418, 1420, 1422 and 1424.

I) User Selection of Horizontal Plane Radiation Patterns

Referring to block 1404, if the user requests to display the horizontal pattern control panel, then the general program 1400 will display the horizontal patterns window with the horizontal pattern control panel in block 1412. The horizontal patterns window may resemble, but need not resemble, the horizontal plane radiation patterns in FIG. 3C through FIG. 3H inclusive. The user can select a radiation pattern by placing his mouse on the desired antenna pattern and "clicking on" the radiation pattern. The horizontal plane radiation patterns window in block 1414 are preferably supplemented with various representations to assist the user in selection of an appropriate radiation pattern. For example, the horizontal plane radiation patterns window may provide, but need not provide, graphical representations of radiation patterns, verbal descriptions of radiation patterns, numerical descriptions of radiation patterns, alphanumerical descriptions of radiation patterns, verbal descriptions of the target area, numerical descriptions of the target area, graphical representations of the target area, and the like. The numerical gain values of radiation patterns and coordinates of the target area facilitate user selection of a horizontal plane radiation pattern which is focused upon the target area.

In block 1414, the general program 1400 determines if the user pressing a mouse button, or pressing a key, in the horizontal patterns window is a request to select a radiation pattern. Consequently, to implement block 1414 the general program 1400 must typically look at the identity of recent events in the event stack. If the identity of the event is a mouse button event or a key press event in the appropriate window, then the general program 1400 evaluates the coordinate field to determine if an a horizontal plane radiation pattern was selected. A range of coordinates is associated with each horizontal plane radiation pattern. If the user pushes a mouse button in the horizontal patterns window or if the user presses a key in the horizontal patterns window, and if the key was a request to select a radiation pattern, then the general program 1400 progresses to block 1416.

In block 1416, the general program 1400 obtains the address of the control code from the selected radiation pattern. Numerous indexing and retrieval methods may be used to retrieve the proper control code. For example, the general program 1400 may add a constant in the index register or general register to the X and/or Y coordinate values of mouse or key event to obtain an address of the control code. The control code includes phase delay control code and/or the attenuation control code. Alternatively, in block 1416 the general program 1400 may look in a database containing fields with X coordinate values, Y coordinate values, and control codes. Respective ones of the X and/or Y coordinate values would be associated with corresponding ones of control codes. The control code in block 1416 is a digital code, a word, or a plurality of words. When the control code is sent to the control input 103, the control code may be physically embodied as a digital code, a word, a plurality of words, a control signal, a pulse, a logic level signal, a direct current signal, a baseband signal, a modulated light signal, a modulated radio frequency signal, or the like. Each respective horizontal plane pattern has one corresponding control code.

Next, in block 1418 control codes are retrieved from first memory 1212 and read into the an accumulator register or general purpose register of the first processor 1208. In block 1420, the general program 1400 commands the processor to write the control code to the alpha input/output port 1206. In block 1422, the first processor 1208 instructs the alpha input/output port 1206 to output the control code and/or execute an interrupt handler as supported by the operating system. Finally in block 1424, the selected pattern is preferably highlighted or designated in some manner to inform the user of the current antenna pattern setting.

II) User Selection of Vertical Plane Radiation Patterns

The selection of vertical plane patterns is analogous to the selection of horizontal plane patterns as described above. Note that the horizontal pattern selection routine and the vertical pattern selection program are severable from the general program 1400. The general program 1400 may only include the horizontal pattern selection routine or the vertical pattern selection routine to avoid user confusion.

The selection of vertical plane patterns begins in block 1406 with a user requests to display the vertical pattern control panel. If the user requested to display the vertical pattern control panel in block 1406, then in block 1426 the general program 1400 will display the vertical patterns window with vertical control panel. The vertical patterns window could include a graphical representation of vertical plane radiation patterns, for example, a tower with two movable radiation beams emanating from the tower. The user could drag the antenna beam downward to the desired degree of down tilt and make the selection of down tilt by pressing a mouse button. The vertical pattern window also preferably provides user with a textual, numerical value of down tilt and/or the distance of the target area to the site of the antenna system to facilitate proper selection of down tilt.

III) User Selection of Times to Automatically Change Radiation Patterns

The user selection of times to automatically change radiation patterns may be included, but need not be included, in the general program 1400. User selection of times to automatically change radiation patterns is illustrated starting at block 1408. If the user requests to display the radiation pattern time chart, then the general program will display the time window. The time window of block 1428 contains a time chart with rows or columns containing data fields, for example, time intervals, dates, and radiation pattern names. Radiation pattern names are arbitrary names chosen according to user preferences in block 1413. Alternatively, a default list of pattern names and descriptions will also be stored in the first memory 1212 or in other storage medium.

The user can enter radiation patterns into the time chart from the default list or the personally created list to vary the radiation patterns generated by an array antenna according to time. Respective ones of the time intervals are associated with corresponding ones of the radiation patterns in accordance with user input. In response to user input, the program stores the time chart as a database. The chart is preferably stored in the form of an inverted file to facilitate efficient retrieval.

In block 1430, timer events are established corresponding to the time intervals placed in the time chart. The timer events reflect the expiration of one or more timers in accordance with the user input of time intervals in the time chart. Timer events are, directly or indirectly, associated with corresponding pattern names and control codes in block 1432. In block 1434, if at least one timer expires then, the phase shifting and/or attenuation output process as described in blocks 1418, 1420, 1422 and 1424 is invoked.

Block 1436 shows the stand-by tasks of the array controller. The array antenna controller 1204 preferably services user requests and checks the event stack for new events (i.e. timer events) even when the user is not actively using the array antenna controller 1204.

Numerous applications exist for user selection of times to automatically change radiation patterns. For example, the user could employ user selection of times where a the array antenna is located on a tall structure, for example, a 200 foot high building, at an industrial plant. During the day the majority of radio users (i.e. pager users) would presumably be located on the plant and down tilt would be desirable to maximize the coverage within the interior of the industrial plant. In contrast, during the evening and early morning hours, many radio users (i.e. pager users) would presumably be situated in various outlying residential communities. Thus, during the night no down tilt is desirable so that the signal strength is increased at the outlying residential communities.

IV) User Selection of Respective Mobile Radio Users (MRU) with Corresponding Radiation Patterns The user selection of respective mobile radio users (MRU) may be included, but need not be included, in the general program 1400. The mobile radio user selection (MRU) routine begins in block 1410. If the user requests the general program 1400 to display the mobile radio user chart, then the general program 1400 will display the mobile radio user window with the mobile radio user chart in block 1438. The mobile radio user chart includes rows or columns for data. Data for the radio user chart includes one or more of the following: individual identifier (i.e. unit identifier), group identifier, other identifiers representing mobile radio users, and predetermined character strings.

In block 1440, the general program 1400 establishes a mobile radio user event as the arrival of a predetermined character string at an additional input/output port (not shown) of the array antenna controller 1204. The additional input/output port is designated as a chi input/output port (not shown) of the array antenna controller 1204. The chi input/output port is coupled to the first databus 1210.

Generally, predetermined character strings are transferred to the antenna system from an external input source (i.e. mobile transceiver). Each respective mobile radio user, or group of mobile radio users, desiring a special antenna radiation pattern has at least one corresponding predetermined character string. In block 1442, respective ones of the predetermined character strings are associated with corresponding ones of the radiation patterns in accordance with user input. In other words, mobile radio user events are associated with corresponding pattern names and/or corresponding control codes. The mobile radio users, the pattern names, control codes, and other information are preferably stored in a mobile radio user database in the form of inverted fields. If the a predetermined character string actually arrives at the chi input/output port then the phase shifting and/or attenuation output process is invoked via blocks 1418, 1420, 1422, and 1424.

Numerous applications exist for user selection of respective mobile radio users with corresponding radiation patterns. For instance, the mobile radio user selection is useful where certain groups of mobile radio users are primarily located on-site and other groups of mobile radio users are primarily located at remote locations. In general, when a mobile radio user keys up his mobile transceiver, an identifier is transmitted. The identifier expresses the identity of individual mobile transceiver as well as the group to which the individual transceiver belongs. The base station controller or receiver could generate a predetermined character string (i.e. unique digital code) in response to receiving a certain identifier from a mobile transceiver. The base station controller or receiver sends the predetermined character string to the chi input/output port to adjust the radiation pattern the manner established in the mobile radio user chart.

For instance, the array antenna controller 1204 could produce a cardioid or figure eight radiation pattern at the mobile radio users remote location or on-site location. The downlink and/or uplink signal strength at the remote location or at the on-site location would be increased by focusing, concentrating the signal. Hence, the reliability of the communications system has been enhanced by the antenna system.

External Data Interface

The array antenna controller 1204 can accept predetermined character strings to generate particular radiation patterns pursuant to the general program 1400. To obtain a predetermined character string from external inputs or external input data, an external data interface (not shown) may be required. For example, an external input, such as a radio frequency receiver, may produce a contact closure, or a logic signal, in response to the receipt of a code from a mobile radio user. The external data interface generates an appropriate predetermined character string in response to an identifier, tones, contact closures, ground closures, logic level signals, or other information. The external data interface is coupled to the external input source and the array antenna controller 1204.

The external data interface may be embodied by one or more operational amplifiers and an A/D convertor. The logic signal, the contact closure, or the ground closure is converted to digital word by an operational amplifier in combination with an A/D convertor. The input of the operational amplifier (i.e. Op Amp) would be attached to the logic signal, contact closure, or ground closure in a manner providing switched voltage at the input of the operational amplifier. The output of the operational amplifier could be fed into the input of the A/D convertor. A summing amplifier operational amplifier could be used to combine the output of additional operational amplifiers so that the A/D convertor could generate additional unique digital codes in response to one or more contact closures.

External Input Sources

External input sources communicate external input data, logic levels, ground closures, contact closures, pulses or tones to the array antenna controller 1204 or to the encoder 1102. External input data and external inputs to the array antenna controller 1204, may take the form of a push-to-talk identifier or a direct command from a mobile transceiver. The push-to-talk identifier or direct command is communicated via radio frequency from the mobile transceiver to a base station receiver. Finally, the base station receiver sends the external input data to the array antenna controller 1204. External input data may contain information concerning the geographic distribution of mobile radio users and/or radiation patterns used by adjacent cell sites in a cellular network. The array antenna controller 1204 evaluates the external input data and may respond to the external input data by altering a radiation pattern.

Figure 16:
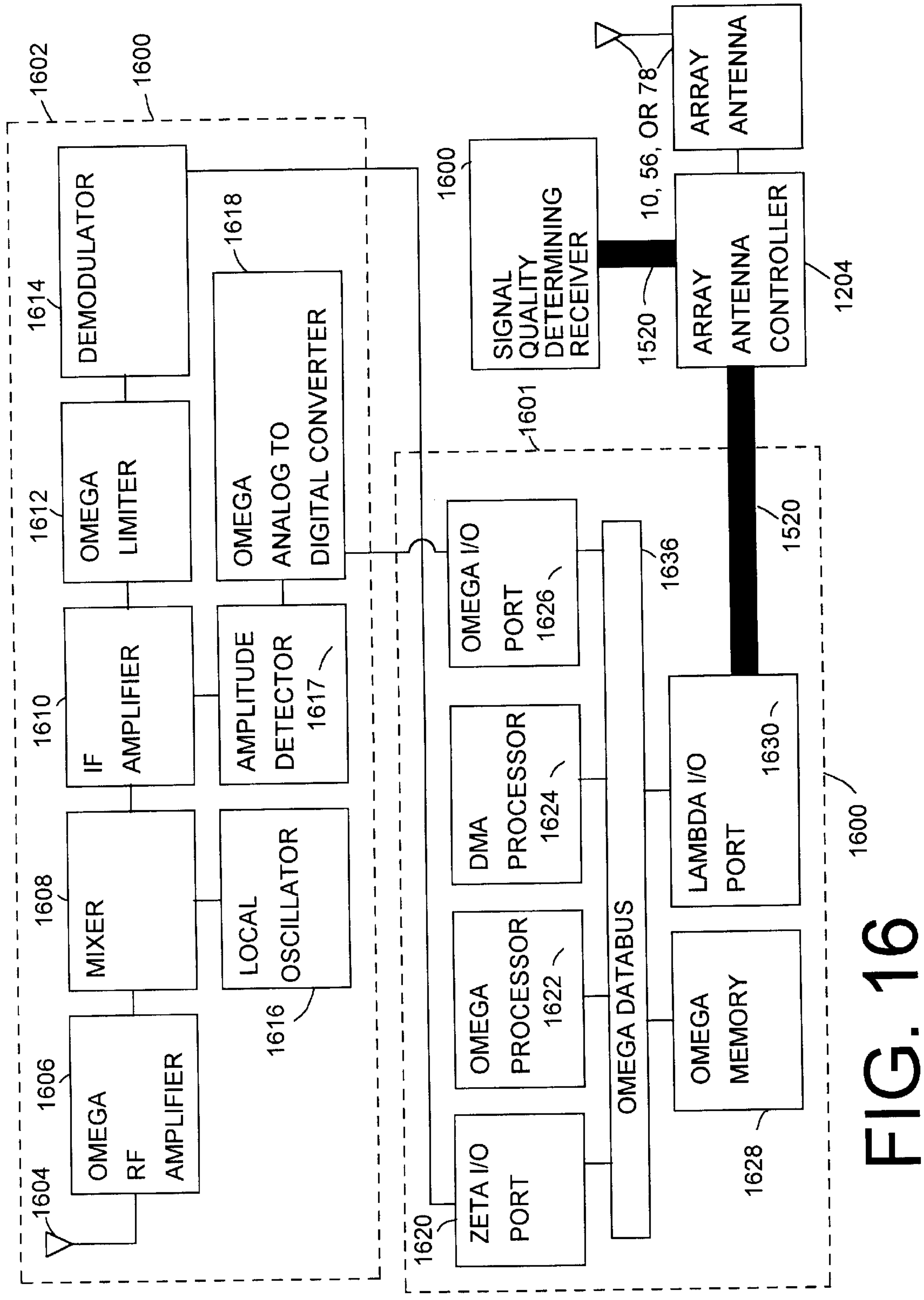
FIG. 16 shows one embodiment of the antenna system using a plurality of signal quality determining receivers as an external input source for the array antenna controller.
Figure 17:
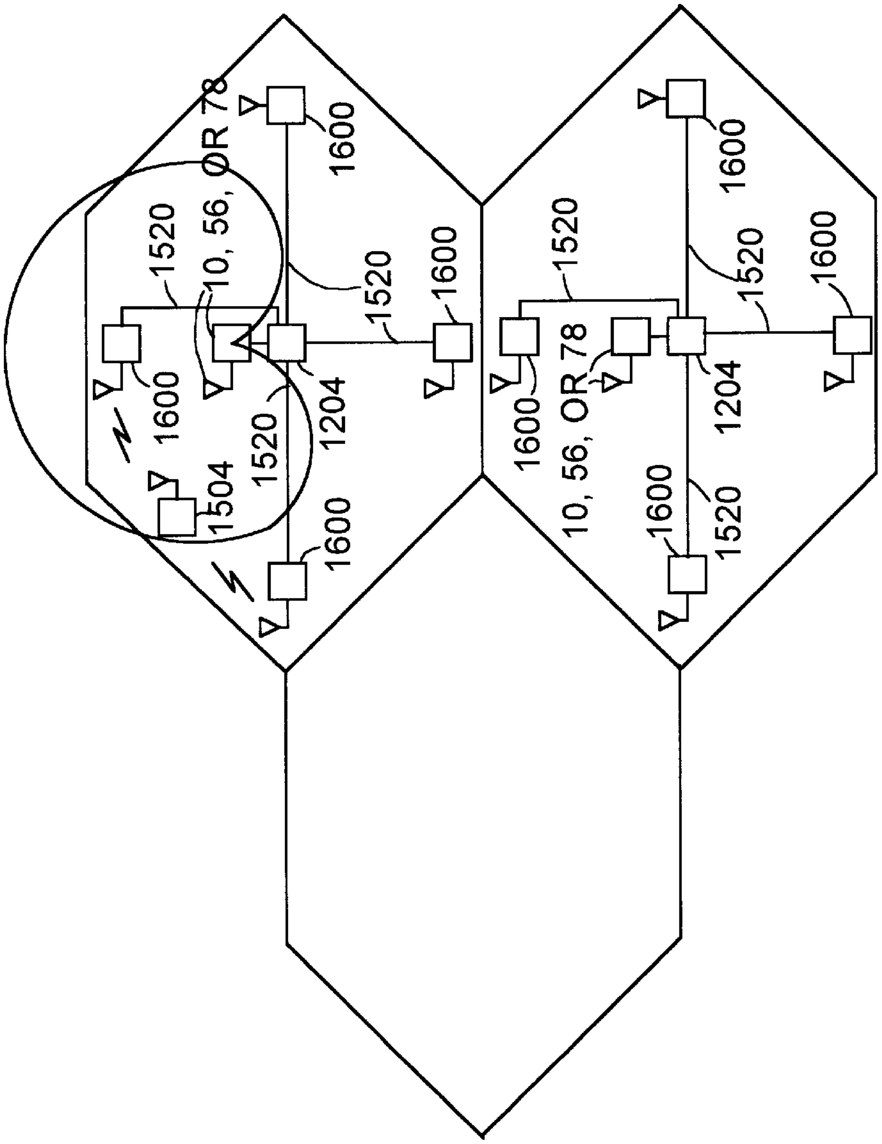
FIG. 17 shows the application of a plurality of signal quality determining receivers to increase the reliability (i.e. downlink and/or uplink signal strength) of the cellular network.

Location determining receivers and signal quality determining receivers are external input sources that provide external input data concerning the geographic distribution of mobile radio users. If external input sources provide external input data concerning the geographic distribution of mobile user activity, the array antenna controller 1204 can select appropriate radiation patterns to increase communications system reliability, channel density per cell and/or call throughput capacity. FIG. 15A through FIG. 15G, inclusive, relate the use of location determining receivers as external input sources for the antenna system. FIG. 16 and FIG. 17 relate to the use of a plurality of signal quality determining receivers as external input sources.

The external input sources are coupled to the array antenna controller 1204 via one or more additional input/output ports (not shown). The additional input/output ports are coupled to the first databus 1210 of the array antenna controller 1204 illustrated in FIG. 12. The additional input/output ports may be realized through the use of UART circuits.

Location Determining Receivers As External Input Sources

Figure 15A:
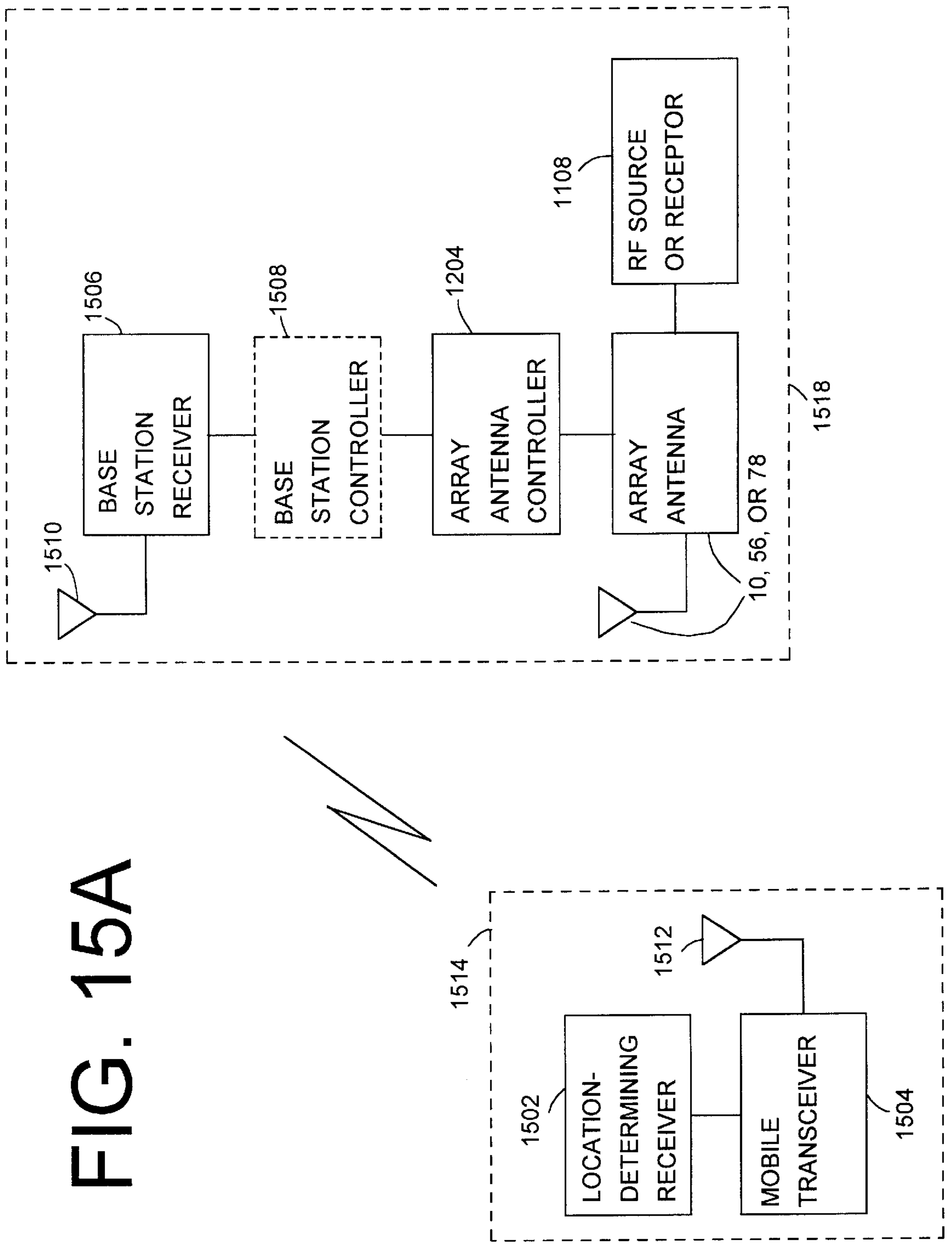
FIG. 15A shows a configuration for using the antenna system in a communications system and for using a location determining receiver as an external input source.

FIG. 15A shows a block diagram of the location determining receiver 1502 as an external input source with respect to a conventional repeater system, a trunking system, one cell in cellular system, or other communication systems. The configuration illustrated in FIG. 15A comprises base site equipment 1518 and one or more mobile units 1514.

The base site equipment 1518 includes a base station antenna 1510, a base station receiver 1506, an array antenna controller 1204, and an array antenna. In addition, the base site equipment 1518 may, but need not, include a base station controller 1508, shown in FIG. 15A using dashed lines. For instance, conventional repeater systems typically do not use base station controllers 1508. The array antenna includes an antenna selected from the group of the general array 620, the simple array 10, the alternate array, the complex array 56, the down-tilt array, arrays using conductive reflectors, arrays using horn elements, arrays using waveguide elements, and other array antennas. The base station controller 1508 includes trunking base station controllers, cellular base station controllers, and other base station controllers. In practice, the base station receiver 1506 may be realized by the receiver portion of a repeater, the receiver portion of a base station, or a separate receiver.

As illustrated in FIG. 15A, the base station receiver 1506 is coupled to the array antenna controller 1204 via a base station controller 1508. Alternatively, the base station receiver 1506 is immediately coupled to the array antenna controller 1204 without the base station controller 1508 intervening. In practice, the actual arrangement of the coupling between base station receiver 1506, the array antenna controller 1204, and the base station controller 1508 may differ depending upon the manufacturer and model of the base station controller 1508. The details of such arrangements are generally known to those skilled in the art. Note that the base station controller 1508 is a valuable source of external input data, for example, channel assignment data and mobile unit identifiers. The array antenna controller 1204 is coupled to the array antenna via the alpha input/output port 1206, and the array antenna controller 1204 is coupled to the base station receiver 1506 via an additional input/output port.

The mobile unit 1514 has a location determining receiver 1502, a mobile transceiver 1504, and a mobile antenna 1512. The location determining receiver 1502 includes a Global Positioning System (i.e. GPS) receiver, a Loran receiver, a Loran C receiver, or the like. The location determining receiver is co-located with the mobile transceiver 1504 such that the location of the mobile transceiver 1504 may be ascertained. In practice, the mobile transceiver 1504 and the location determining receiver 1502 may be embodied as a cellular phone and a GPS receiver, respectively. The location determining receiver 1502 is coupled to the radio frequency mobile transmitter of the mobile transceiver 1504. For example, the location determining receiver 1502 provides logic level signals at the modulator input of the mobile transmitter.

The location determining receiver 1502 periodically provides the mobile transceiver 1504 with external input data regarding mobile geographical coordinates (i.e. longitude and latitude) of the mobile unit 1514. Alternatively, the location determining receiver 1502 provides the mobile transceiver 1504 with external input data regarding the mobile azimuth and/or mobile distance of the mobile unit 1514 relative to an antenna site. The term antenna site, as used throughout the specification and claims, refers to geographical location of an array antenna, or the geographical location of the base site equipment 1518, or the geographical location of the alternate base site equipment 1519. Additionally, the location determining receiver 1502 may, but need not, provide the velocity (magnitude and direction) of the mobile unit 1514 relative to antenna site. Such additional information would facilitate accurate changes in radiation patterns as the mobile unit 1514 moves. The future position of the mobile unit 1514 could be extrapolated from the current location and current velocity.

Many commercially available mobile transceivers 1504 transmit external input data, in the form of a push-to-talk identifier or an analogous identifier, to the base station receiver 1506. Before, during, or after the mobile transceiver 1504 transmits the identifier, the mobile transceiver 1504 will also transmit the mobile geographical coordinates or the mobile azimuth relative to the antenna site. In practice, the mobile transceiver 1504 and the base station receiver 1506 may electromagnetically communicate via a control channel, a data channel, a voice channel, a time division multiplex (TDM) time slot of a radio frequency communications system, or the like. Furthermore, the radiation pattern of the control channel, data channel, TDM time slot, or the like preferably, geographically approaches the periphery of the entire intended coverage area (i.e. one cell in a cellular system).

The communications hardware depicted in FIG. 15A requires software instructions for the array controller 1204 to process the external input data containing geographical coordinates or distances and azimuths from the antenna site. First, the array antenna controller 1204 accepts the external input data via an additional input/output port. External input data concerning the mobile transceiver's coordinates, identifier, mobile azimuth, or other information is communicated from the base station controller 1508 or the base station receiver 1506 to the array antenna controller 1204. The external input data typically originates from a location determining receiver 1502. Where necessary, the array antenna controller 1204 stores the coordinates and/or elevation of the location of the base site equipment 1518 in the registers of the first processor 1208, or in the first memory 1212.

Second, the first processor 1208 calculates the geographical mobile location of one or more mobile units 1514 relative to the antenna site. The geographical mobile location of each mobile unit 1514 is preferably calculated in terms of mobile azimuth and/or the mobile distance of the mobile unit 1514 relative to the antenna site. For the Northern hemisphere, two different formulae are used to calculate the mobile azimuth depending upon whether the mobile transceiver 1504 is located north of the antenna site or south of the antenna site. The formulae are described in Appendix pages C2 through C32 of the publication entitled, "Engineering Considerations for Microwave Communication Systems" (1970 edition), incorporated herein by reference. "Engineering Considerations for Microwave Communication Systems" was available through GTE Network Systems, GTE Network Systems Publication Manager, Department 431, Tube Station C-1, 400 N. Wolf Rd., North Lake, Ill. 60164.

Third, the array antenna controller 1204 matches the mobile azimuths (relative to the antenna site) of one or more mobile units 1514 with a corresponding horizontal radiation pattern having a lobe directed at one or more mobile units 1514. Alternatively, the array antenna controller 1204 matches the mobile distances (relative to the antenna site) of one or more mobile units 1514 with a corresponding vertical plane radiation pattern. The first processor 1208 selects a corresponding vertical plane radiation pattern such that a lobe (i.e. main lobe) is substantially directed at one or more mobile units 1514.

The array antenna controller 1204 has a location database which is stored in the first memory 1212 and/or in another storage medium (i.e. hard disk assembly coupled to the first databus 1210). The location database contains static knowledge concerning a library of radiation patterns of one or more array antennas. Matching the mobile azimuths may be facilitated by, but need not be facilitated by, querying a location database. The actual content of the location database varies considerably depending upon whether a first matching method or a second matching method is used.

According to the first matching method, the location database, for example, contains fields with radiation pattern azimuths, radiation pattern gains, and control codes. Respective radiation pattern gains of one or more particular radiation patterns are a function of corresponding radiation pattern azimuths. The radiation pattern azimuths may be stored in the location database in ascending or descending values of radiation pattern azimuths for ease of retrieval. Respective ones of the control codes are associated with corresponding ones of radiation patterns.

Radiation pattern azimuths that are substantially equivalent to mobile azimuths are identified by mathematical comparisons. The identified radiation pattern azimuth is associated with radiation pattern gains for a plurality of radiation patterns. The single radiation pattern with the highest radiation pattern gain is selected from the plurality of radiation patterns. In practice, the radiation pattern gain may actually represent an average value of radiation pattern gains about the radiation pattern sector of interest.

According to the second method of matching, the location database contains the respective mobile azimuths (of one or more mobile units 1514) that are associated with corresponding horizontal plane radiation patterns, and respective mobile distances that are associated with corresponding vertical plane radiation patterns. The corresponding radiation patterns are defined as the most focused radiation patterns that provide reliable coverage substantially encompassing the geographical locations of particular active mobile units 1514. The "most focused" refers to the highest gain radiation pattern producible by an array antenna with a limited library of radiation patterns, as opposed to the most focused pattern possible from a theoretical viewpoint. The location database may be stored as inverted files for ease of retrieval.

The location database may store, but need not store, dynamic knowledge concerning the present, or recent, mobile azimuths and/or mobile distances of one or more mobile units 1514 relative to the antenna site. In a system with multiple channels, the location database may store, but need not store, the voice channel and/or data channel assignments of various mobile units 1514. The dynamic knowledge concerning present mobile azimuths and/or mobile distances is continuously updated as mobile units 1514 move throughout the coverage area of the antenna site.

In practice, matching the mobile azimuth of one or more mobile units depends upon the following attributes of the communication system: extent that multiple channels are combined onto a common, dynamically controllable antenna system, nature of the call, and the type of modulation. To maximize increases in system reliability, channel density per cell, and/or call throughput capacity; each channel in a trunking system or in a cellular system should use a dynamically controllable antenna system. Thus, a plurality of array antenna controllers 1204 must preview the channel assignment data before initiating a particular radiation pattern based on the mobile azimuth of one or more mobile units 1514. If the nature of the call is mobile-to-mobile call on the channel via a common antenna site, then the first processor 1208 establishes a range of mobile azimuths including the mobile azimuth of the called mobile unit 1514 and the mobile azimuth of the calling mobile unit 1514. The processor 1208, then matches the respective range of mobile azimuths with a corresponding radiation pattern (or with a range of radiation pattern azimuths). In contrast, if the call is a mobile-to-landline call, or landline-to-mobile call, then only the mobile azimuth of a single mobile unit 1514 is matched to a corresponding radiation pattern. In a digital system, to utilize the dynamically controllable antenna, units with geographically close locations or convenient locations relative to available antenna patterns (i.e. figure eight distribution) are assigned adjacent time slots (i.e. channels). A group of adjacent time slots comprises a frame. For example, a group of eight time slots comprises a frame pursuant to the European Group Special Mobile (GSM) digital cellular system. The mobile azimuths of mobile units 1514 in the frame are used to calculate a mobile azimuth range for the frame. Finally, the respective mobile azimuth range of the mobile units 1514, assigned to one common frame, is compared and matched to a corresponding radiation pattern (or a range of radiation pattern azimuths).

Figure 15B:
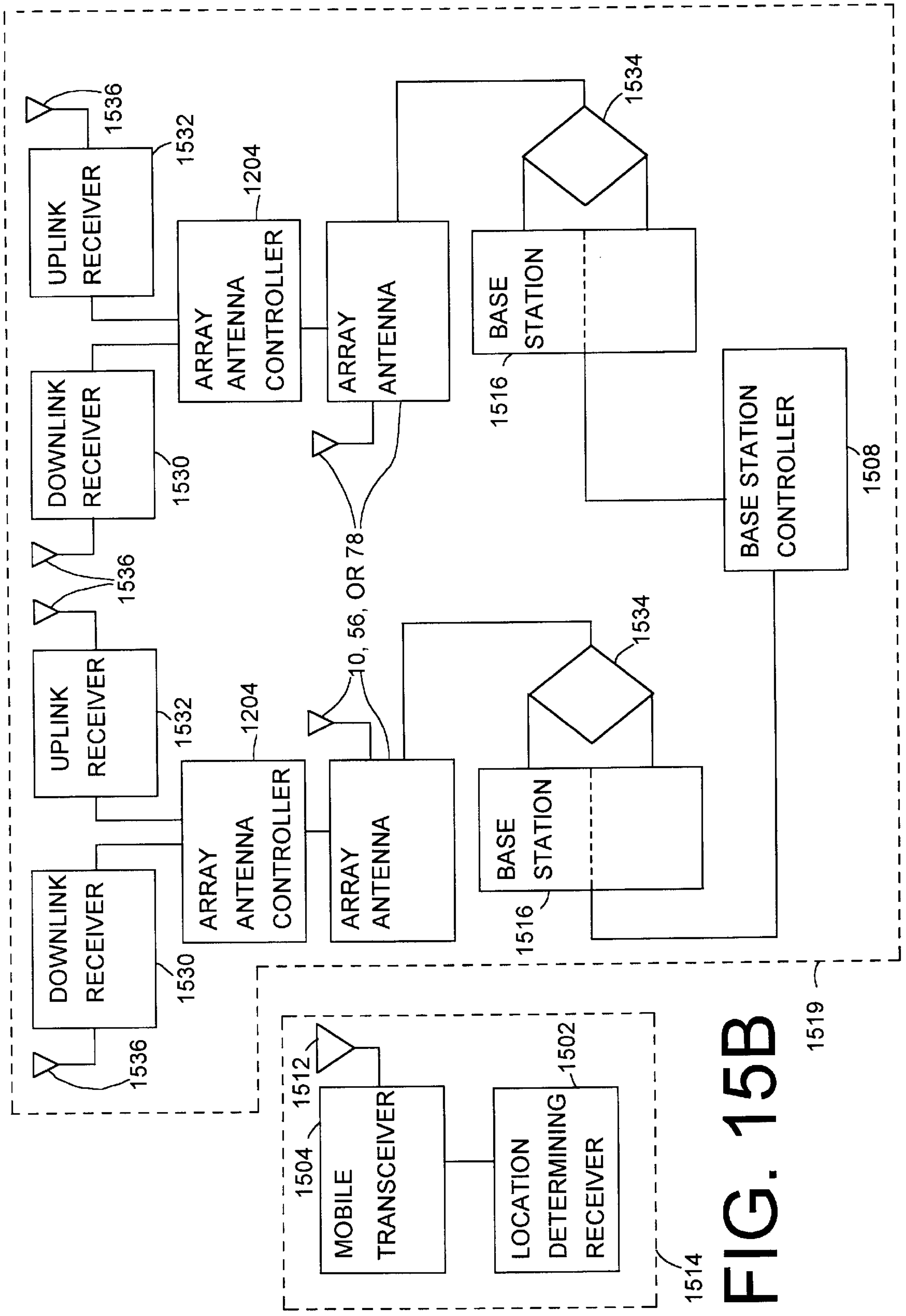
FIG. 15B illustrates a configuration for using the antenna system in a trunking communications system or cellular communications system.

FIG. 15B illustrates a configuration for utilizing a plurality of antenna systems in a trunking system or a cellular system. Pursuant to the configuration illustrated in FIG. 15B, each voice channel and/or data channel can have a unique radiation pattern which is independent of the radiation patterns of all other voice channels and/or data channels. Thus, the antenna system configuration of FIG. 15B increases communication systems reliability.

In addition, space division multiplexing is theoretically possible with the configuration of FIG. 15B. Space division multiplexing concentrates each same frequency radio signal in a distinct and limited geographic area. A space division multiplexing configuration enables, for example, a plurality of different channels of a single site trunking system to share the same radio frequency. Consequently, the call throughput capacity of the trunking system is increased by increasing the available number of channels.

FIG. 15B shows alternate base site equipment 1519 which is analogous to base site equipment 1518. In particular, alternate base site equipment 1519 includes a plurality of base stations 1516 and a plurality of antenna systems. In addition, each alternate base site equipment 1519 comprises one or more downlink receivers 1530 and one or more uplink receivers 1532; alternatively each alternate base site equipment 1519 includes one downlink-uplink receiver (not shown) which may asynchronously and/or simultaneously receive both uplink and downlink transmissions.

Each antenna system includes a) an array antenna, selected from the general array 620, the simple array 10, the complex array 56, the down-tilt array 78, the alternate complex array, an array with one or more conductive reflectors, an array with corner reflectors, an array using radiating waveguides, an array using horn elements, and the variations of the foregoing, and b) a array antenna controller 1204. Each array antenna controller 1204 has at least one additional input/output port coupled to the first databus 1210 to accommodate external input sources. Respective ones of the antenna systems are electromagnetically coupled to corresponding ones of the base stations 1516 and/or duplexers 1534. The base station 1516 and duplexer 1534 are particular types of RF sources or receptors 1108.

The alternate base site equipment 1519 may include an uplink receiver 1532 and a downlink receiver 1530. The uplink receiver 1532 receives electromagnetic transmissions from the mobile transceiver 1504. In contrast, the downlink receiver 1530 receives electromagnetic transmissions from the alternate base site equipment 1519. The downlink receiver 1530 and the uplink receiver 1532 may be embodied as a portion of base station 1516, as a separate receiver, and/or as a single combined uplink-downlink receiver. While FIG. 15B shows a plurality of uplink receivers 1532 and downlink receivers 1530 all array antenna controllers 1204 may be coupled to one downlink receiver 1530 and one uplink receiver 1532. Coupling methods between one downlink receiver 1530 and multiple array antenna controllers 1204 may consist of, but need not consist of, a cable and an impedance matching network, or a local area network configuration. In practice, the downlink receiver 1530 and the uplink receiver 1532 monitor one or more control channels. Alternatively, the downlink receiver 1530 and the uplink receiver 1532 monitor data on data channels and/or voice channels.

Figure 15C:
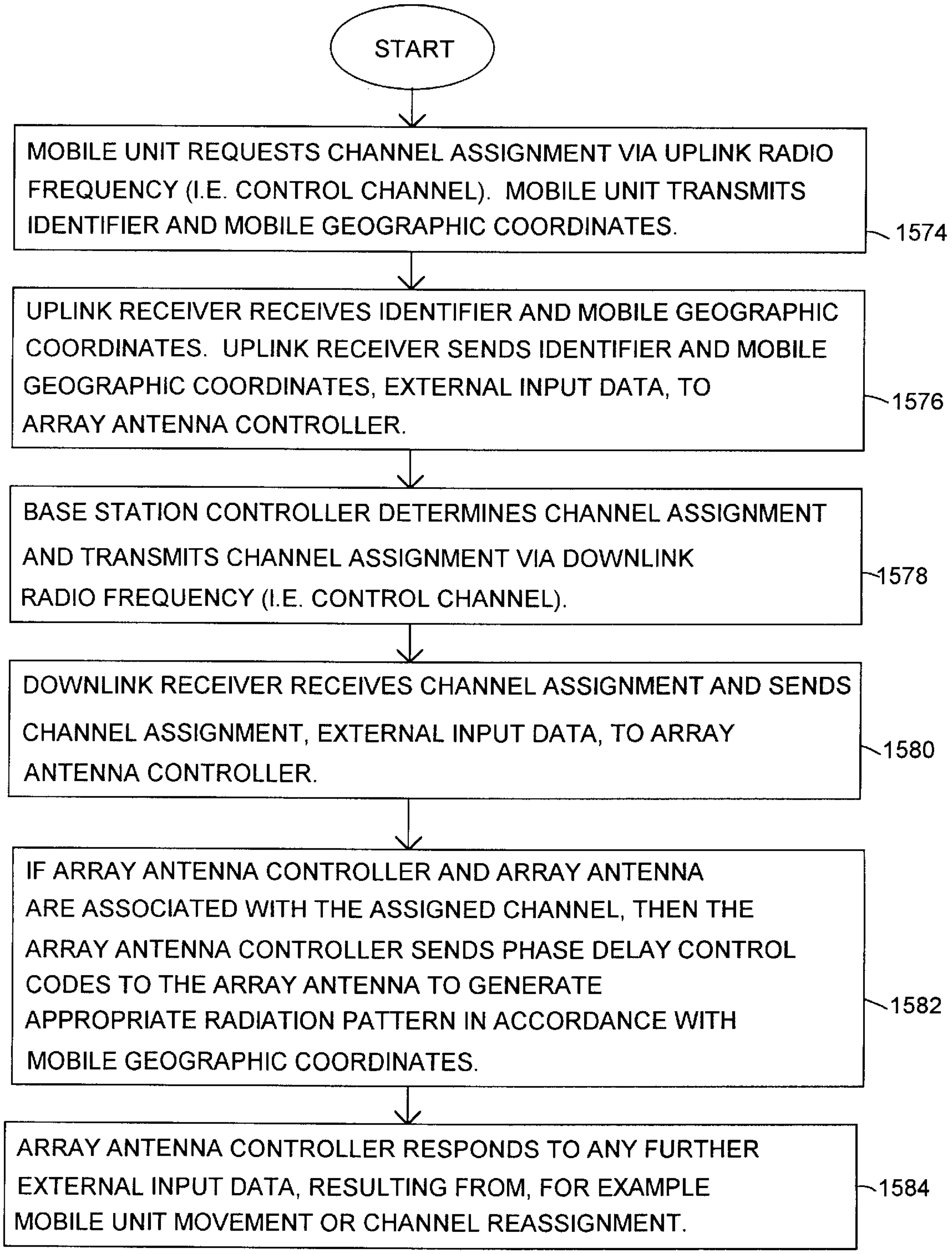
FIG. 15C is a flow chart depicting the operation of the antenna system in regards to the configuration illustrated FIG. 15B.

The operation of the configuration in FIG. 15B is described by the flow chart of FIG. 15C. In sum, external input data, including mobile identifier, mobile geographic coordinates, and channel assignment data, is obtained via radio frequency by the uplink receiver 1532 and the downlink receiver 1530. The external input data is sent to the array antenna controller 1204 for evaluation so each voice channel and/or data channel can have a unique independent radiation pattern. Note that digitally modulated systems may curtail the ability of each voice and/or data channel to have a unique independent radiation pattern.

The flow chart of FIG. 15C provides further details concerning the operation of configuration of FIG. 15B. Starting at block 1574, the mobile unit 1514 requests a voice channel and/or data channel assignment via the uplink radio frequency or frequencies. Before, during, or after the mobile unit's request, the mobile unit 1514 transmits an identifier and mobile geographic coordinates. In block 1576, the uplink receiver 1532 receives the identifier and mobile geographic coordinates. The uplink receiver 1532 sends the identifier and mobile geographic coordinates, external input data, to the additional input/output port of the array antenna controller 1204. In block 1578, the base station controller 1508 determines the channel assignment at any time after receiving the channel request from the mobile unit 1514 in block 1574. Hence, the procedures depicted in blocks 1576 and 1578 may occur asynchronously and/or simultaneously. The base station controller 1508 transmits the channel assignment data via the downlink radio frequency, or frequencies, to the mobile unit 1514. In block 1580, the downlink receiver 1530 receives channel assignment data and sends the channel assignment data, external input data, to the array antenna controller 1204.

In block 1582, if one respective array antenna is associated with the assigned channel, then the array antenna controller 1204 (controlling the respective array antenna) sends control codes to the respective array antenna to generate appropriate radiation patterns. Respective ones of the array antennas are electromagnetically coupled to corresponding ones of the base stations 1516. Each base station supports one or more voice channels, data channels, and/or control channels. Hence, respective ones of the array antennas are associated with corresponding ones of base stations 1516, inherently including the base station's channels. In sum, the first processor 1208 interprets the channel assignment to determine which one of the plurality of antenna systems should react by producing a radiation pattern directed toward the mobile unit 1514.

Appropriate radiation patterns are "matched" with the respective mobile azimuths according to the variety of methods previously discussed. Note that the matching process may occur at any time after or during block 1576 so long as the array antenna does not actually initiate pattern changes until a channel assignment is made in block 1578. Finally, in block 1584, the array antenna controller 1204 responds to any further external input data, resulting from, for example, mobile unit 1514 movement or channel reassignment.

Figure 15D:
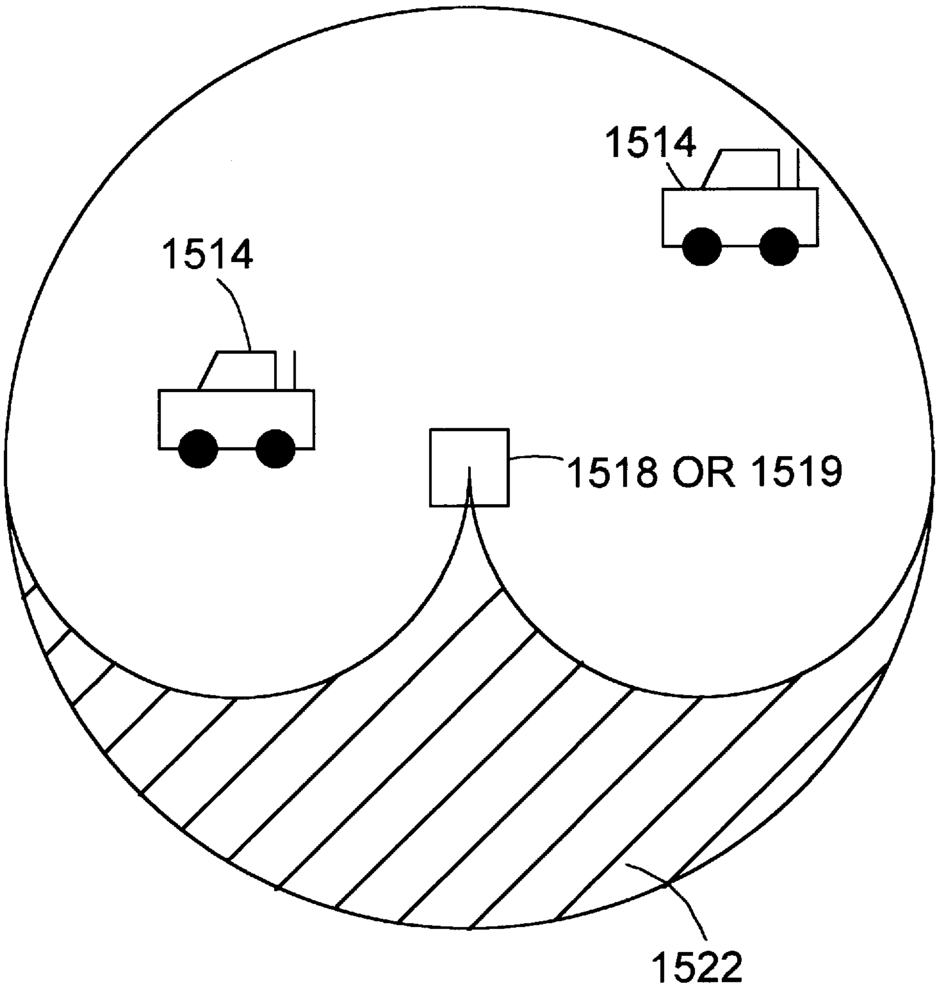
FIG. 15D illustrates the improvement in radio frequency coverage realized by operation of the antenna system as configured in FIG. 15A or FIG. 15B.
Figure 15E:
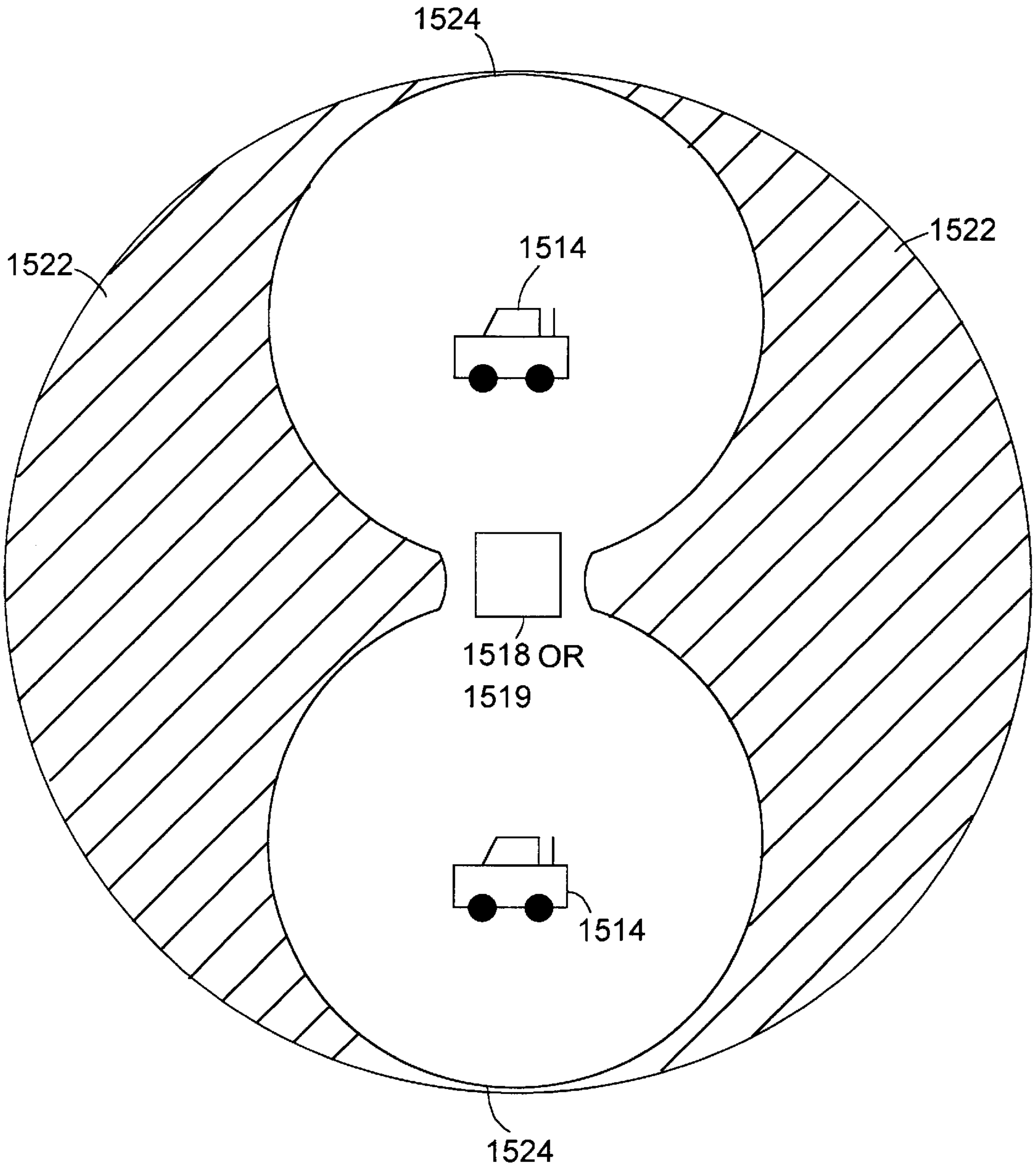
FIG. 15E illustrates the improvement in radio frequency coverage realized, by directing radiation patterns only to geographical areas in which mobile users are active, pursuant to the configurations of FIG. 15A or FIG. 15B.

FIG. 15D and FIG. 15E portray communications systems equipped with base site equipment 1518 analogous to the configuration illustrated in FIG. 15A or FIG. 15B. FIG. 15D and FIG. 15E provide illustrative examples of how the horizontal plane radiation patterns are typically matched, or selected, for a communications system with two active mobile units 1514. In particular, the lobes 1524 of the radiation patterns are substantially directed toward the mobile units 1514.

If the distribution of mobile units 1514 conforms to scenarios like those illustrated in FIG. 15D and FIG. 15E, then the reliability of the system is increased by concentrating radio frequency coverage only in the areas where mobile radio units 1514 are present. The concentration of radio frequency signals is accomplished through the base site equipment 1518, including the array antenna. Specifically, if the base site equipment 1518 periodically uses a directional radiation pattern with higher gain than an omnidirectional pattern, then the reliability of the communications system is increased by the difference between the gain of the omnidirectional radiation pattern and the directional radiation pattern. The higher gain of the array antenna's directional patterns are realized whenever the directional patterns conform to the geographic distribution of mobile units 1514. The inefficiency of fixed omnidirectional coverage is illustrated graphically as wasted signal areas 1522. Wasted signal areas 1522 are represented as the hatched regions on FIG. 15D and FIG. 15E.

With respect to cellular systems, the antenna system combined with the location determining receiver can increase cell density by reusing the same channel, or frequency, in adjacent cells. For example, as illustrated in FIG. 15F, if mobile users in a first cell 1551 can be serviced by a cardioid facing west and if mobile users in a second cell 1552 may be serviced by a cardioid facing east, then the same channel, or frequency, may be shared by the first cell 1551 and the second cell 1552.

The mobile unit 1514 and the base site equipment 1518 is similar to the configuration disclosed in FIG. 15A or FIG. 15B. However, the configuration of FIG. 15F has an array antenna controller 1204 equipped with additional input/output ports and the configuration of FIG. 15F has a means for communicating 1520.

Figure 15F:
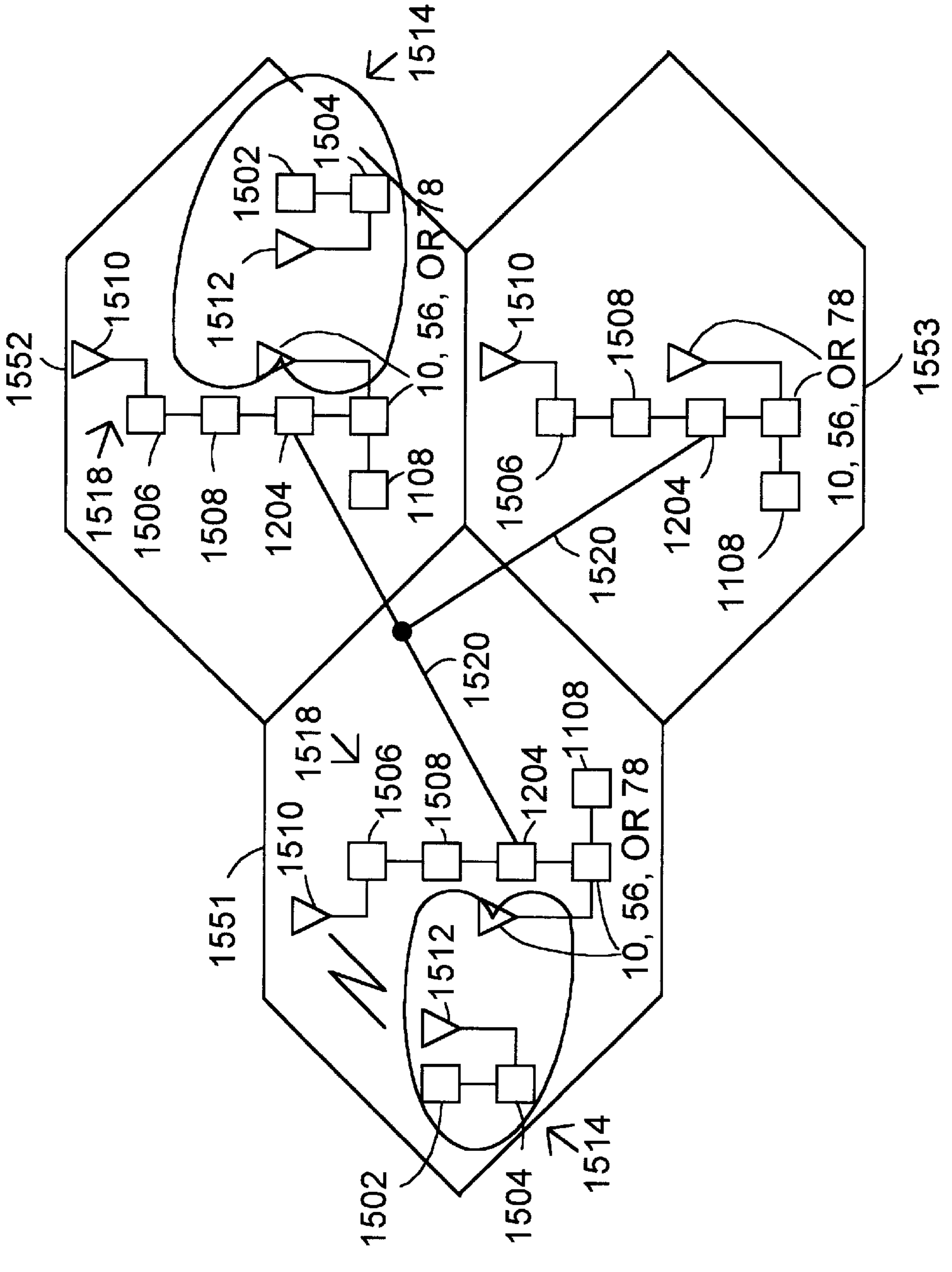
FIG. 15F illustrates the application of a plurality of antenna systems in a cellular network to increase channel density and/or to reduce co-channel interference.

As depicted in FIG. 15F, the array antenna controllers 1204 require additional input/output ports to accommodate the means for communicating 1520 and the transfer of external input data from the antenna systems of substantially proximate or adjacent cells. Each array antenna controller 1204 in FIG. 15F requires a minimum of three input/output ports: the alpha input/output port 1206 plus two additional input/output ports. The additional input/output ports may be realized through the use of UART circuits. The array antenna controller 1204 is coupled to the array antenna. The configuration of FIG. 15F uses array antennas selected from the group of the general array 620, the simple array 10, the complex array 56, an alternate complex array, an array using conductive reflectors, an array using corner reflectors, and other arrays.

The array antenna controller 1204 of the first cell 1551 and the array antenna controller of second cell 1552 are coupled via means for communicating 1520. The means for communicating constitutes a microwave communications system, a fiber-optics communications system, private telephone lines, public telephone lines, party lines, coaxial cable system, a radio frequency communications system, or the like. The means for communicating includes modems, modulators, demodulators, and other modulation devices. Communication between the array antenna controller 1204 of the first cell 1551 and the array antenna controller 1204 of the second cell 1552 may be, but need not be, contention-based or polling-based, via a party line as shown in FIG. 15F.

The software for the array antenna controllers 1204 in the configuration of FIG. 15F involves the following steps. First, array antenna controller 1204 of the first cell 1551 calculates the mobile azimuth and the distance of one or more mobile units 1514 relative to antenna site of the first cell 1551. Second, array antenna controller 1204 of the first cell 1551 matches the mobile azimuth or distance with a corresponding radiation pattern of an array antenna. Third, array antenna controller 1204 of the first cell 1551 accesses the radiation patterns being used by adjacent cells and/or proximate cells, such as the second cell 1552.

Fourth, the array antenna controller 1204 of the first cell 1551 compares the selected first cell 1551 radiation pattern with respect to the radiation patterns in adjacent cells and/or proximate cells, such as the second cell 1551. For example, if the relative orientations of the radiation patterns of two adjacent cells and the distance between two adjacent cells provide sufficient isolation between the two adjacent cells, then the antenna system allows the two adjacent cells to simultaneously share the same frequency.

The null method and the threshold isolation method exists for determining whether sufficient isolation exists between the first cell 1551 and the second cell 1552 such that the first cell 1551 and the second cell 1552 can simultaneously share the same frequency. The null method considers the relative orientation of the nulls of the radiation pattern of first cell 1551 and the nulls of the radiation pattern of the second cell 1552. If the nulls of the first cell 1551 and the second cell 1552 substantially face each other, then the first cell 1551 and the second cell 1552 may, but are not required to, simultaneously share the same frequency. For example, if the tentative radiation pattern null of the first cell 1551 and the existing radiation pattern null of the second cell 1552 substantially face each other, then both the first cell 1551 and the second cell 1552 can, but are not required to, simultaneously use the same frequency. However, if, for example, the null of radiation pattern of the first cell 1551 faces any portion of the lobe of the radiation pattern of the second cell 1552, then the first cell 1551 and the second cell 1552 may or may not be permitted to simultaneously use the same frequency depending upon other radio frequency propagation criteria.

The threshold isolation method concerns calculating a threshold isolation value. The threshold isolation value is calculated on the basis of distance between adjacent cell sites, gains of antennas at adjacent cell sites, bandwidth of the radio frequency signals, frequency stability of the communications equipment, and/or capture ratio of modulated signals. Capture ratio only apples to frequency modulation, phase modulation, and various digital modulation schemes (i.e. FSK). Capture ratio refers to the minimum value of the ratio of the signal strengths, of a first co-frequency signal to a second co-frequency signal, for which the first co-frequency modulated will reliably overtake the second co-frequency signal.

Numerous techniques can be used for calculating the threshold isolation value. For instance, the threshold isolation value may be calculated by selecting a first point within the first cell 1551 and a second point within the second cell 1552. The theoretical or actual signal strength of the radio frequency signal of the first cell 1551 and radio frequency signal of the second cell 1552 is calculated for the first point and the second point. If, at the first point within the first cell 1551, the noninterfering signal strength of the first cell 1551 exceeds the interfering signal strength of the second cell 1552 by the capture ratio (plus a confidence margin), and if, at the second point within the second cell 1552, the noninterfering signal strength of the second cell 1552 exceeds the interfering signal strength of the first cell 1551 by the capture ratio (plus a confidence margin), then the first cell 1551 and the second cell 1552 may simultaneously use the same frequency.

Fifth, the array antenna controller 1204 of the first cell 1551 sends an authorization, or command, to the mobile switching center (i.e. mobile telecommunications switching office), and/or the base station controller 1508 of the first cell 1551 and the base station controller 1508 of the second cell 1552. The array antenna controller 1204 of the first cell 1551 may send the authorization, or command, to the base station controller 1508 of the first cell 1551 and the antenna controller 1508 of the second cell 1552 via the means for communicating 1520. The authorization permits base station controller 1508 of the first cell 1551 and base station controller 1508 of the second cell 1552 to simultaneously use the same channel, or frequency, in the first cell 1551 and the second cell 1552 until the distribution of mobile units 1514 dictates otherwise. Sixth, array antenna controller 1204 of the first cell 1551 informs the array antenna controller 1204 of one or more adjacent cells of the present patterns which first cell 1551 is utilizing. The above process may be repeated as necessary to provide reliable coverage to the mobile units 1514 as the mobile units 1514 move.

Consequently, the antenna radiation patterns of the cell sites in the configuration of FIG. 15F are based on external input data providing the geographical locations of mobile units 1514, frequency usage of cells, and radiation patterns of cells in real time. For example, the frequency, or channel, selected in a first cell 1551 for the downlink and/or uplink of a voice traffic is selected based on the respective orientation of the cardioids in a first cell 1551 and a second cell 1552 as well as the distribution of mobile radio users in a first cell and a second cell.

Alternatively, the software for the configuration of FIG. 15F does not support communication with adjacent cells and/or proximate cells. In particular, the third step (i.e. accessing the radiation patterns being used by adjacent cells) and the sixth step (i.e. informing the array antenna controllers 1204 of adjacent cells of present radiation pattern use) as described above are omitted. Rather, each cell has a list of authorized radiation patterns, unauthorized radiation patterns, unauthorized frequencies and/or authorized frequencies for authorized radiation patterns. Radiation patterns and frequencies are authorized or unauthorized based on a determination of sufficient isolation between channels in adjacent cells. In other words, possible orientations of radiation patterns in adjacent cells and distance between adjacent cells, among other factors, may be evaluated in accordance with the null method and/or the threshold isolation method. Only radiation patterns and frequencies that do not cause undesirable co-frequency interference are authorized. Radiation patterns and frequencies which cause undesirable co-frequency interference are unauthorized.

Figure 15G:
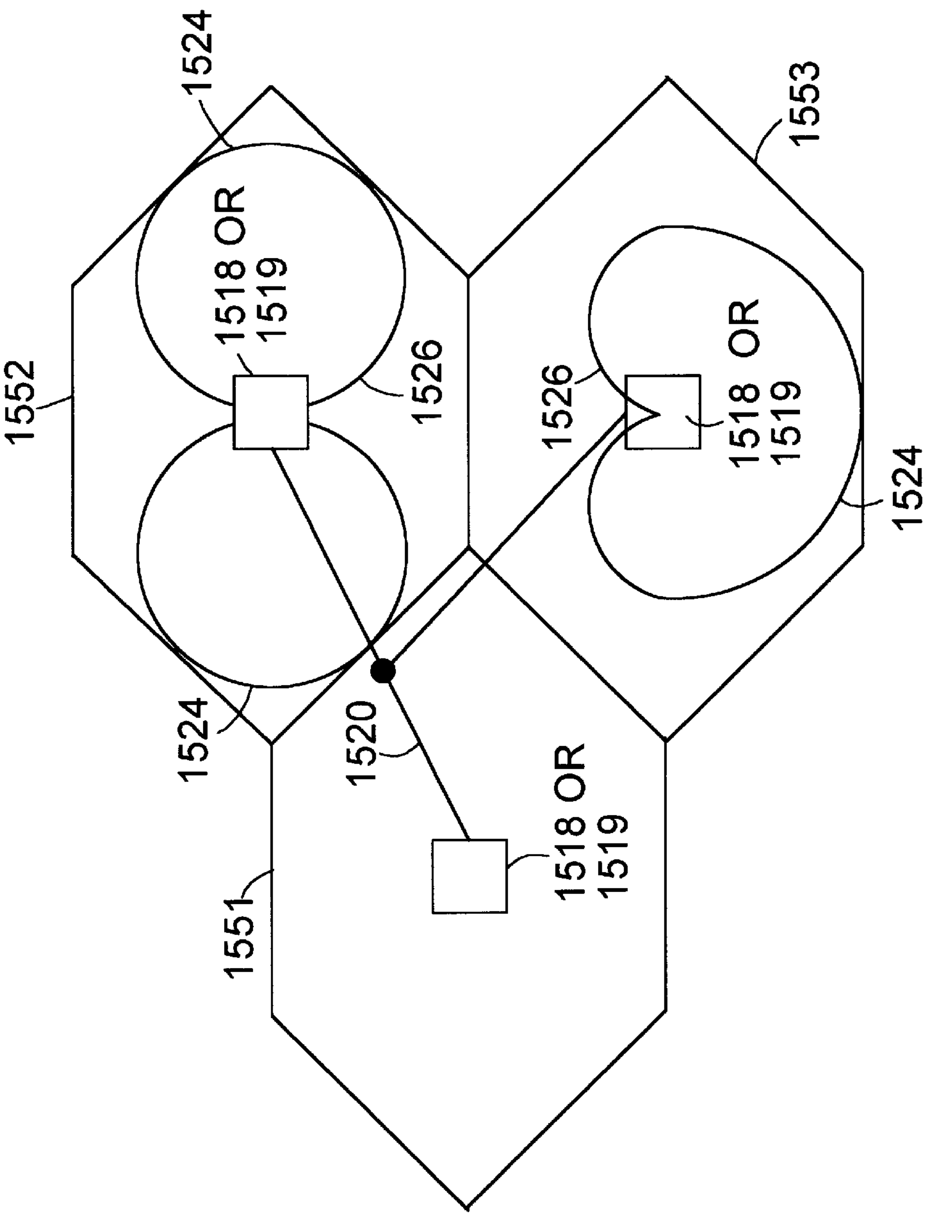
FIG. 15G shows illustrative examples of the null orientation, of radiation patterns, which allow simultaneous reuse of the same frequency in substantially proximate cells.

FIG. 15G illustrates nulls 1526 which substantially face each other. In particular, the second cell 1552 has a figure eight radiation with a null 1526 directed toward the third cell 1553. Meanwhile, the third cell 1553 has a cardioid pattern with a null 1526 directed toward the second cell 1552. Thus, the second cell 1552 and the third cell 1553 may simultaneously utilize the same frequency.

Signal Quality Determining Receivers as External Input Sources

FIG. 16 shows one embodiment of the antenna system using a plurality of signal quality determining receivers 1600 as an external input source for the array antenna controller 1204. Each signal quality determining receiver 1600 is located at a unique geographic location or has a directional antenna adapted to receive radio frequency signals in a unique, discrete geographic area. Each signal quality determining receiver 1600 measures parameters of a received signal, including, for example, amplitude level, signal-to-noise ratio, mobile radio unit identifiers, and/or arrival time of signal. Parameters of the received signal are provided to the antenna system which determines which one of said signal quality determining receivers has the closest unique geographic location to a given mobile radio unit 1514.

The signal quality determining receiver 1600 has an omega receiver 1602 and an omega processing system 1601. The omega receiver 1602 includes an omega RF amplifier 1606, a mixer 1608, an amplitude detector 1617, an IF amplifier 1610, an omega limiter 1612, a demodulator 1614, a local oscillator 1616, and an omega A/D converter 1618.

The omega RF amplifier 1606 may contain, but need not contain, radio frequency filtering to attenuate undesired signals. The omega RF amplifier 1606 has a radio frequency amplifier (i.e. gallium arsenide semiconductors or field effect transistors) necessary to receive the transmitted signal from mobile units 1514. The mixer 1608 accepts the signal generated by the local oscillator 1616 and mixes the local oscillator signal with the amplified output from the omega RF amplifier 1606. Note that the omega RF amplifier 1606 and the mixer 1608 could be combined into a "converter stage." The output of the mixer 1608 is at a lower radio frequency than the radio frequency amplified by the omega amplifier 1606. The output frequency of the mixer 1608 is called the intermediate frequency. The intermediate frequency is amplified by the IF amplifier 1610. The IF amplifier 1610 is coupled to the omega limiter 1612 and the amplitude detector 1617. The omega limiter 1612 may be omitted where the omega receiver 1602 is used for amplitude modulated signals.

The amplitude detector 1617, realized by a diode for example, detects the amplitude of the lower radio frequency regardless of whether the lower radio frequency is amplitude modulated, frequency modulated, phase modulated, frequency shift modulated, phase shift modulated, pulse width modulated, or modulated according to other methods. The amplitude detector 1617 rectifies the intermediate frequency and amplifies the resulting DC signal for the A/D converter 1618. The detected amplitude is routed to an omega A/D converter 1618 which changes the analog value of the detected amplitude into a digital value of amplitude. The A/D converter 1618 optimally produces, but need not produce, at least a 16 bit digital value to provide adequate immunity from quantization noise. The digital value of amplitude can then be processed by the omega processor 1622. The omega limiter 1612 limits signals above a certain threshold receive level. The omega limiter 1612 may be a circuit analogous to limiters typically used for commercial FM band (i.e 88 MHz to 108 MHz) receivers. The demodulator 1614 receives an analog or a digitally modulated signal and produces a digital output for processing by the omega processor 1622. For example, the demodulator 1614 may receive a gaussian frequency shift keying (FSK) signal and produce direct current or alternating current logic levels in response.

The omega processing system 1601 includes an omega processor 1622, an omega input/output port 1626 and a zeta input/output port 1620, an omega memory 1628, and a lambda input/output port 1630. The omega processor 1622, the omega input/output port 1636, the zeta input/output port 1620, the omega memory 1628, and the lambda input/output port 1630 are coupled to the omega databus 1636.

The omega processing system 1601 preferably includes, but need not include, a direct memory access processor 1624. The direct memory access processor 1624 is coupled to the omega databus 1636. The direct memory access processor 1624 manages input/output functions substantially independently of the omega processor 1624. The direct memory access processor 1624 conserves valuable processing time so that the omega processor 1622 can process the data at the zeta input/output port 1620 and the omega input/output port 1626 in real time.

The omega processing system 1601 communicates with the array antenna controller 1204 via the lambda input/output port 1630 and the means for communicating 1520. The means for communicating 1520 comprises microwave communications systems, telephone lines, fiber-optic lines, coaxial cables, radio frequency communication systems, and/or modems.

FIG. 17 shows the positioning of a plurality of signal quality determining receivers 1600 throughout the possible coverage area of two cells in a cellular network. In FIG. 15F, signal quality determining receivers are geographically located about the periphery of the coverage area of a cell. Alternatively, the plurality of signal quality determining receivers 1600 are collocated at an antenna site and each signal quality determining receiver 1600 has a directional antenna to cover a different, discrete geographical coverage area (not shown). The signal quality determining receivers 1600 allow the array antenna controller 1204 to roughly estimate the location and distribution of the mobile units 1514. In response to the estimated location of mobile units 1514, the array antenna controller 1204, in conjunction with an array antenna, then generates a corresponding radiation pattern such as the cardioid illustrated in FIG. 17.

The software programming for the signal quality determining receiver 1600 may involve, but need not involve, the following steps. First, the omega processor generally averages instantaneous signal strength values and/or signal-to-noise ratios over a minimum time interval to attain an accurate reading of actual signal quality. Second, the omega processor 1622 associates respective ones of mobile identifiers with corresponding ones of mobile unit signal strength values or signal to noise ratios. Respective ones of mobile unit identifiers appear at the zeta input/output port 1620 substantially simultaneously with the appearance of instantaneous signal strength values or/and signal to noise ratio at the omega input/output port 1626. The omega processor 1622 is optionally instructed to ignore signals below a certain threshold value (i.e. −113 dBm) to conserve processing time of the omega processor 1622. Third, each omega processor 1622 or the direct memory access processor 1624 sends the external input data via the means for communicating 1520 to the array antenna controller 1204. Fourth, the array antenna controller 1204 compares the signal strengths or signal-to-noise ratios and flags the approximate, estimated location of the mobile unit 1514 as the location of the signal quality determining receiver 1600 with the best signal quality. Finally, in response, the array antenna controller 1204 generates a suitable uplink and/or downlink radiation pattern which corresponds to approximate, estimated location of the mobile unit 1514 in accordance with the matching considerations previously discussed.

The foregoing detailed description is provided in sufficient detail to enable one of ordinary skill in the art to make and use the antenna system. The foregoing detailed description is merely illustrative of several physical embodiments of the antenna system. Physical variations of the antenna system, not fully described in the specification, are encompassed within the purview of the claims. Accordingly, the narrow description of the elements in the specification should be used for general guidance rather than to unduly restrict the broader descriptions of the elements in the following claims.

I claim:

1. A communication system equipped with an array antenna for dynamically controlling radiation patterns, the communication system comprising:

an array antenna having means for processing a radio frequency signal, said means for processing a radio frequency signal having a control input and radio frequency signal terminals, the array antenna being located at an antenna site;

an array antenna control system, the array antenna control system having a processor, an alpha input/output port, a chi input/output port, memory, and a databus; the processor, the alpha input/output port, the chi input/output port, and the memory coupled to the databus, the alpha input/output port coupled to said control input; and a mobile radio unit having a transmitter;

a location-determining receiver collocated with the mobile radio unit at a geographic mobile location, the location-determining receiver electromagnetically providing external input data to the chi input/output port regarding the geographic mobile location; and a location database containing a library of radiation patterns producible by said array antenna, the location database being stored in said array antenna control system, the radiation patterns defined in terms of radiation pattern gain versus direction, each of said radiation patterns having at least one main lobe approaching a peak pattern gain in a main lobe direction, the array antenna control system selecting a radiation pattern from the library such that the main lobe direction is substantially directed toward the geographic mobile location, the array antenna control system selecting the most focused radiation pattern, from the library, with a greatest radiation pattern gain aligned toward the geographic mobile location.

2. The communications system according to claim 1 further comprising:

radiation pattern selection means for selecting an appropriate control code for communication with the control input; respective control codes associated with corresponding antenna radiation patterns, said appropriate control code selected to substantially direct the main lobe of the most focused radiation pattern at the geographic mobile location.

3. The communications system according to claim 2 wherein the location database has fields of radiation pattern gains, radiation pattern azimuths, and control codes; respective radiation pattern gains being a function of corresponding radiation pattern azimuths for each radiation pattern, respective ones of the radiation patterns being associated with corresponding ones of radiation pattern control codes; and wherein radiation pattern selection means matches the geographic mobile location with the radiation pattern azimuth having the most focused radiation pattern directed at the geographic mobile location; the most focused radiation pattern being associated with the highest radiation pattern gain, among the library, that pertains to the geographic mobile location.

4. The communication system according to claim 1 further comprising:

location calculating means for calculating the geographic mobile location of the mobile unit with respect to the antenna site based on said external input data, said location calculating means being stored in said first memory.

5. The communication system according to claim 1 further comprising:

an authorization database for a cellular communication system containing a list of authorized radiation patterns, unauthorized radiation patterns, authorized frequencies, and unauthorized frequencies for the antenna control system at the antenna site.

6. The communication system according to claim 1 wherein the location database comprises fields having respective mobile azimuths that are associated with corresponding horizontal plane radiation patterns, the horizontal plane radiation patterns in said location database providing the most focused radiation pattern pertaining to the geographic mobile location.

7. The communication system according to claim 1 wherein the location database comprises fields having respective mobile distances that are associated with corresponding vertical plane radiation patterns, the vertical plane radiation patterns in said location database providing the most focused radiation pattern pertaining to the geographic mobile location.

8. The communication system according to claim 1 wherein the location database is stored as an inverted file.

9. The communication system according to claim 1 wherein the location database includes a dynamic knowledge database for storing recent mobile azimuths relative to the antenna site.

10. The communication system according to claim 1 wherein the location database includes a dynamic knowledge database for storing recent mobile distances of mobile units relative to the antenna site.

11. The communication system according to claim 1 wherein the means for processing a signal comprises a phase shifter.

12. The communication system according to claim 1 wherein the array antenna comprises an array antenna selected from the group consisting of a general array, a simple array system, a complex array, an alternate complex array, a down-tilt array, an array antenna having dipole elements, an array antenna having horn elements, an array antenna having a waveguide with radiating slots, an array antenna having dipole elements and conductive reflectors, and an array consisting of a plurality of corner-reflector antennas.

13. A communication system equipped with an array antenna for dynamically controlling radiation patterns, the communication system comprising:

an array antenna having means for processing a radio frequency signal, said means for processing a radio frequency signal having a control input and radio frequency signal terminals, the array antenna being located at an antenna site;

an array antenna control system, the array antenna control system having a processor, an alpha input/output port, a chi input/output port, memory, and a databus; the processor, the alpha input/output port, the chi input/output port, and the memory coupled to the databus, the alpha input/output port coupled to said control input;

a first mobile radio unit having a first transmitter;

a second mobile radio unit having a second transmitter;

a first location-determining receiver collocated with the first mobile radio unit at a first geographic mobile location, the first location-determining receiver electromagnetically providing external input data to the chi input/output port regarding the first geographic mobile location; and a second location-determining receiver collocated with the second mobile radio unit at a second geographic mobile location, the second location-determining receiver electromagnetically providing external input data to the chi input/output port regarding the second geographic mobile location; and a location database containing a library of radiation patterns producible by said array antenna, the location database being stored in said array antenna control system, the radiation patterns defined in terms of radiation pattern gain versus direction, each radiation pattern having at least one main lobe approaching a peak pattern gain in a main lobe direction, the array antenna control system selecting the most focused radiation pattern, from the library, with a highest group of radiation pattern gains aligned toward said geographic mobile locations.

14. The communication system according to claim 13 wherein the location database has a dynamic knowledge database including voice channel assignment data of the first mobile radio unit and the second mobile radio unit while the first mobile radio unit and the second mobile radio unit utilize the antenna system, the dynamic knowledge database being updated periodically.

15. The communication system according to claim 13 wherein the location database has a dynamic knowledge database including data channel assignment data of the first mobile radio unit and the second mobile radio unit while the first mobile radio unit and the second mobile radio unit utilize the antenna system, the dynamic knowledge database being updated periodically.

16. The communication system according to claim 13 further comprising:

radiation pattern selection means for selecting an appropriate control code for communication with the control input; respective control codes associated with corresponding antenna radiation patterns, said appropriate control code representing the directing of the main lobe or lobes of the most focused radiation pattern toward the first geographic mobile location and the second geographic mobile location.

17. The communication system according to claim 16 wherein radiation pattern selection means further comprises:

range matching means for establishing a range of mobile azimuths of the first mobile unit, in its called mode, and the second mobile unit, in its calling mode, for mobile-to-mobile calls so that both the first mobile unit and the second mobile unit are encompassed within a corresponding radiation pattern directed at said range, said range of mobile azimuths representing the probable or potential geographic mobile locations of the first mobile unit and the second mobile unit.

18. The communication system according to claim 13 further comprising radiation pattern selection means including range matching means for establishing a range of mobile azimuths of the first mobile unit, in its calling mode, for mobile-to-landline calls so that only the first mobile unit is encompassed within a corresponding radiation pattern substantially directed at said range, said range of mobile azimuths representing the probable or potential geographic mobile locations of the first mobile unit.

19. The communication system according to claim 13 further comprising radiation pattern selection means including range matching means for establishing a range of mobile azimuths of the first mobile unit in its called mode for landline-to-mobile calls so that only the first mobile is encompassed within a corresponding radiation pattern substantially directed at said range, said range of mobile azimuths representing the probable or potential geographic mobile locations of the first mobile unit.

20. The communication system according to claim 13 further comprising:

channel assignment means for assigning mobile radio units served by said antenna system to adjacent time slots of a frame in a time division multiplex modulation scheme according to mobile geographic locations of the mobile units such that mobile units with a sufficiently close geographic proximity are assigned to the same radiation pattern and the same frame, so that a radiation pattern of said antenna system is limited to a focused area, said mobile units including the first mobile unit and the second mobile unit.

21. The communication system according to claim 20 wherein the sufficiently close geographic proximity comprises the first mobile unit and the second mobile unit being located within a coverage area of a single cardioid radiation pattern and wherein said radiation pattern of said antenna system is limited to said cardioid covering the first geographic mobile location and the second geographic mobile location.

22. The communication system according to claim 13 further comprising:

channel assignment means for assigning mobile radio units to adjacent time slots of a frame in a time division multiplex modulation scheme according to the location of mobile units such that mobile units with conveniently spaced geographic proximity can be assigned the same radiation pattern and the same frame, so that the selected radiation pattern is limited to a focused area, said mobile units including the first mobile unit and the second mobile unit.

23. The communication system according to claim 22 wherein the conveniently spaced geographic proximity comprises the mobile units being located within a coverage area of a figure-eight radiation pattern and wherein said radiation pattern of said antenna system is limited to said figure-eight radiation pattern.

24. An antenna system for use in a mobile communications system, the antenna system comprising:

an array antenna having means for processing a radio frequency signal, the means for processing a radio frequency signal having a control input;

an antenna control system having an array antenna controller for dynamically assigning radiation patterns to the array antenna, the array antenna controller having a first processor, an alpha input/output port, a chi input/output port, a first memory, a user interface, and a first databus; the first processor coupled to the first databus, the alpha input/output port coupled to the first databus, the chi input/output port coupled to the first databus, the first memory coupled to the first databus, the alpha input/output port being in communication with the control input;

a location database stored in the first memory, the location database containing a library of radiation patterns of the array antenna, each radiation pattern having a respective control code for communication with means for processing a radio frequency signal, the first processor selecting the control code based on the mobile location of a mobile unit or the spatial distribution of mobile units, the array antenna control system selecting the most focused radiation pattern, from the library, with a highest group of radiation pattern gains for the spatial distribution of the mobile units; and a first external input source being coupled to said chi input/output port, the first external input source providing external input data concerning the mobile location of at least one mobile unit, the first processor comparing the external input data with the library of radiation patterns in the first memory to determine the control code.

25. The antenna system according to claim 24 further comprising a communications controller having a second processor, a second memory, a beta input/output port, a gamma input/output port, and a second databus; the second databus coupled to the second processor, the second memory, the beta input/output port, and the gamma input/output port, the beta input/output port connected to the control input, the gamma input/output port being in communication with the alpha input/output port.

26. The antenna system according to claim 25 further comprising a communications interface including a first modem and a second modem, the first modem connected to the alpha input/output port, the second modem connected to the gamma input/output port, the first modem coupled to the second modem.

27. The antenna system according to claim 24 further comprising a communications interface, the communications interface including a digital-to-analog (D/A) converter, a beta transmitter, a beta receiver, an analog-to-digital (A/D) converter, and an A/D controller; the D/A converter coupled to the alpha input/output port and the beta transmitter, the beta transmitter coupled to the beta receiver, the beta receiver coupled to the A/D converter, the A/D converter coupled to the A/D controller and the control input.

28. The antenna system according to claim 24 further comprising:

a base station receiver, the base station receiver connected to the array antenna controller via the chi input/output port;

a mobile transceiver having a mobile transmitter, the mobile transmitter electromagnetically coupled to the base station receiver when the mobile transmitter is activated, the base station receiver receiving external input data from the first external input source via the mobile transmitter; and wherein the first external input source comprises a location-determining receiver, the location-determining receiver having a receiver output coupled to a transmitter input of the mobile transmitter.

29. The antenna system according to claim 18 wherein the location-determining receiver comprises a receiver selected from the group consisting of a Global Positioning System (GPS) receiver, a Long Range Navigation System receiver, a Loran receiver, a Loran C receiver, a Loran D receiver, a tactical air navigation (TACAN) receiver, and a satellite downlink receiver.

30. The antenna system according to claim 24 further comprising:

a plurality of base station receivers;

a base station controller, the base station controller coupled to at least one base station receiver, the base station controller coupled to the array antenna controller;

a mobile transceiver having a mobile transmitter, the mobile transmitter electromagnetically coupled to at least one base station receiver when the mobile transmitter is activated; and wherein said first external input source comprises a location-determining receiver, the location-determining receiver having a receiver output coupled to a transmitter input of the mobile transmitter.

31. The antenna system according to claim 24 wherein the array antenna controller has at least one additional input/output port, each additional input/output port coupled to the first databus; and further comprising:

one or more mobile units, each mobile unit including a mobile transceiver and a location-determining receiver, each mobile transceiver having a mobile transmitter, respective ones of the mobile transmitters coupled to corresponding ones of the location-determining receivers; and base site equipment including an array antenna, said array antenna controller, an uplink receiver, a downlink receiver, and a base station;

said antenna system coupled to the base station at a radio frequency bandwidth of desired operation;

the array antenna controller coupled to the uplink receiver and coupled to the downlink receiver;

the uplink receiver electromagnetically coupled to the mobile transmitter when the mobile transmitter is activated; and the base station having a base station transmitter, the base station transmitter electromagnetically coupled to the downlink receiver when the base station transmitter is activated.

32. The antenna system according to claim 24 wherein the array antenna is located in a primary cell surrounded by a plurality of proximate cells; the antenna system further comprising a second external input source providing external input data concerning the antenna radiation patterns being used in said proximate cell sites, said second external input source being an additional array antenna controller located in one of said proximate cells.

33. The antenna system according to claim 24 wherein the first external input source is selected from the group consisting of a trunking receiver, a cellular receiver, an uplink receiver, a downlink receiver, a base station controller, a cellular base station controller, a trunking base station controller, a mobile switching center, a mobile telecommunications switching office, a location-determining receiver, signal quality determining receivers, a mobile transceiver, and a mobile unit.

34. The antenna system according to claim 31 wherein one of said additional input/output ports is coupled to a second external input source selected from the group consisting of the uplink receiver, the downlink receiver, and a combination of the uplink receiver and the downlink receiver.

35. The antenna system according to claim 24 wherein the array antenna controller has additional input/output ports, each additional input/output port coupled to the first databus; and further comprising:

one or more mobile units, each mobile unit including a mobile transceiver, each mobile transceiver having a mobile transmitter;

base site equipment including said array antenna controller, and said array antenna; and wherein said first external input source comprises a plurality of signal quality determining receivers, each signal quality determining receiver coupled to an additional one of said input/output ports, respective ones of signal quality receivers having corresponding ones of signal quality antennas, each signal quality antenna arranged to receive radio frequency signals in a substantially limited, discrete geographic area, one or more mobile transmitters electromagnetically coupled to one or more signal quality determining receivers when at least one of said mobile transmitters transmits.

36. The antenna system according to claim 24 wherein the array antenna controller has at least one additional input/output port, each additional input/output port coupled to said first databus; and further comprising:

an additional array antenna;

an additional array antenna controller controlling the additional array antenna, said additional array antenna controller providing external input data to said array antenna controller concerning radiation patterns being used by said additional array antenna controller on particular radio frequencies of operation;

communication means for communicating between the array antenna controller and the additional array antenna controller, said additional array antenna controller coupled to said array antenna controller via said communication means.

* * * * *